US012142926B2

(12) United States Patent
Yoscovich et al.

(10) Patent No.: US 12,142,926 B2
(45) Date of Patent: Nov. 12, 2024

(54) SYSTEMS AND METHODS TO INCREASE THE RELIABILITY AND THE SERVICE LIFE TIME OF PHOTOVOLTAIC (PV) MODULES

(71) Applicant: Solaredge Technologies Ltd., Herzeliya (IL)

(72) Inventors: Ilan Yoscovich, Givatayim (IL); Liron Har-Shai, Tel Mond (IL); Amir Grossberg, Tel Aviv (IL); Matan Atias, Tel Aviv (IL); Daniel Zmood, Ness Ziona (IL); David Avraham, Givat Koah (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/451,385

(22) Filed: Aug. 17, 2023

(65) Prior Publication Data
US 2023/0396070 A1 Dec. 7, 2023

Related U.S. Application Data

(63) Continuation of application No. 17/570,861, filed on Jan. 7, 2022, now Pat. No. 11,764,581, which is a
(Continued)

(51) Int. Cl.
*H02J 3/38* (2006.01)
(52) U.S. Cl.
CPC ............ *H02J 3/381* (2013.01); *H02J 3/388* (2020.01); *H02J 2300/24* (2020.01); *H02J 2300/26* (2020.01)
(58) Field of Classification Search
CPC ........ H02J 3/381; H02J 3/388; H02J 2300/26; H02J 2300/24
See application file for complete search history.

(56) References Cited

U.S. PATENT DOCUMENTS

| 5,572,735 A | 11/1996 | Tanikawa |
| 6,605,973 B1 | 8/2003 | Chih |

(Continued)

FOREIGN PATENT DOCUMENTS

| CN | 102967765 A | 3/2013 |
| CN | 104242811 A | 12/2014 |

(Continued)

OTHER PUBLICATIONS

Jul. 15, 2019—European Search Report—EP 19172253.7.
(Continued)

*Primary Examiner* — Rafael O De Leon Domenech
(74) *Attorney, Agent, or Firm* — Banner & Witcoff, Ltd.

(57) ABSTRACT

A method may include: applying a first voltage on at least one first terminal of a first direct current (DC) bus electrically connected to a power source, obtaining at least one indication that discharge of a second voltage related to the first voltage should be performed, and discharging the second voltage by electrically connecting at least one second terminal of a second DC bus to a ground in response to the at least one indication. Another method may include: injecting a current at least one terminal of a direct current (DC) bus that is electrically connected to a power source, simultaneous to injecting the current, measuring an insulation relative to ground, obtaining an electrical parameter related to the power source, and, in response to the electrical parameter, maintaining the current injected at the terminal of the DC bus without ceasing the measuring of the insulation relative to a ground.

20 Claims, 28 Drawing Sheets

Related U.S. Application Data continuation of application No. 16/681,884, filed on Nov. 13, 2019, now Pat. No. 11,258,261, which is a continuation-in-part of application No. 16/405,235, filed on May 7, 2019, now Pat. No. 11,159,016.

(60) Provisional application No. 62/669,499, filed on May 10, 2018.

(56) References Cited

U.S. PATENT DOCUMENTS

| | | |
|---|---|---|
| 7,355,831 B2 | 4/2008 | Raiser |
| 7,518,886 B1 | 4/2009 | Lai et al. |
| 8,416,553 B2 | 4/2013 | Zhan et al. |
| 9,504,105 B2 | 11/2016 | Ekbote et al. |
| 9,912,146 B1 | 3/2018 | Wang et al. |
| 10,090,754 B2 | 10/2018 | Kim |
| 10,153,687 B2 | 12/2018 | Balakrishnan et al. |
| 2006/0194102 A1 | 8/2006 | Keshishian et al. |
| 2010/0286840 A1 | 11/2010 | Powell et al. |
| 2012/0014020 A1 | 1/2012 | Lehmann |
| 2013/0063119 A1 | 3/2013 | Lubomirsky |
| 2013/0194706 A1 | 8/2013 | Har-Shai et al. |
| 2013/0235628 A1 | 9/2013 | Dong et al. |
| 2014/0103939 A1* | 4/2014 | Chatroux ............... G01R 31/52 324/551 |
| 2015/0288296 A1 | 10/2015 | Kidera et al. |
| 2016/0245855 A1* | 8/2016 | Serban ................. H02M 3/156 |
| 2016/0254672 A1 | 9/2016 | Yoscovich et al. |
| 2017/0250540 A1 | 8/2017 | Varma |
| 2018/0011149 A1 | 1/2018 | Tsai et al. |
| 2018/0083570 A1 | 3/2018 | Sella et al. |
| 2020/0177100 A1 | 6/2020 | Wang et al. |

FOREIGN PATENT DOCUMENTS

| | | |
|---|---|---|
| CN | 204131141 U | 1/2015 |
| CN | 104467018 A | 3/2015 |
| CN | 204244167 U | 4/2015 |
| CN | 205304243 U | 6/2016 |
| CN | 106961118 A | 7/2017 |
| CN | 107492907 A | 12/2017 |
| CN | 108011583 A | 5/2018 |
| EP | 2256918 A2 | 12/2010 |
| EP | 2963760 A1 | 1/2016 |
| EP | 3267553 A1 | 1/2018 |
| JP | 2018-143047 A | 9/2018 |
| JP | 2018-153012 A | 9/2018 |
| WO | 2014152458 A2 | 9/2014 |
| WO | 2014203091 A1 | 12/2014 |
| WO | 2018171765 A1 | 9/2018 |
| WO | 2019086917 A1 | 5/2019 |

OTHER PUBLICATIONS

Mar. 15, 2021—EESR—EP 20206916.7.
Nov. 8, 2023—CN Notice of Allowance—CN App. No. 201910386901.1.
Aug. 6, 2024—Japanese Office Action—JP App. No. 2020-185862.
Sep. 17, 2024—European Search Report—EP. App. No. 24175973.7.

* cited by examiner

SYSTEMS AND METHODS TO INCREASE THE RELIABILITY AND THE SERVICE LIFE TIME OF PHOTOVOLTAIC (PV) MODULES

RELATED APPLICATIONS

This application is a continuation of U.S. patent application Ser. No. 17/570,861, filed Jan. 7, 2022, which is a continuation of U.S. patent application Ser. No. 16/681,884, filed Nov. 13, 2019, now U.S. Pat. No. 11,258,261, which is a continuation-in-part of U.S. patent application Ser. No. 16/405,235, filed May 7, 2019, now U.S. Pat. No. 11,159,016, which claims priority to U.S. provisional application No. 62/669,499, filed May 10, 2018, entitled "Systems and methods to increase the reliability and the service life time of photovoltaic (PV) modules." The contents of the foregoing applications are incorporated by reference in their entireties.

BACKGROUND

A possible way of reducing the costs of photovoltaic systems is to increase the reliability and the service lifetime of photovoltaic (PV) modules. A PV module failure may be caused by an effect that degenerates the module power that may or may not be reversed by normal operation and/or creates a safety issue. The underperformance of silicon wafer-based PV systems may be due to an effect termed "polarization" where n-type cells over time developed voltage induced power degeneration at a positive polarity from cells to ground. Conversely, several different module types with p-type cells may degenerate in negative polarity from cells to ground. Power losses in PV modules may be more pronounced the higher the voltage is. In crystalline silicon wafer-based PV modules, a reversible polarization effect may be applied for p-type and n-type cells, at negative and positive voltages, respectively.

SUMMARY

The following summary is a short summary of some of the inventive concepts for illustrative purposes only and is not intended to limit or constrain the features and examples in the detailed description. One skilled in the art will recognize other novel combinations and features from the detailed description.

A requirement of a power system may be to ensure an efficient delivery of power to a load. To enable the efficient delivery, monitoring of the power in terms of sensed voltages, currents and impedance by sensors of interconnected components of the power system may be conveyed to a controller for an analysis. The result of the analysis may be to send control signals responsive to the analysis to the interconnected components of the power system. The interconnected components may include sources of direct current (DC) power such as photovoltaic (PV) generators, wind power turbines, DC generators and/or batteries. DC to DC converters may be connected to the DC sources and the outputs of the DC to DC converters may be connected together to provide multiple strings which may be connected across a load. The load may be a DC to alternating current (AC) inverter which has an output which may be connected to a utility grid or a localized grid which may be separate to the utility grid.

The control signals as a result of the analysis may ensure that the interconnected components of the power system perform in concert to ensure efficient delivery of power to a load for example. The conveying and monitoring of the applied control signals may provide a dynamic way of providing efficient delivery of power to a load by use of control methods (e.g., adaptive and/or robust control methods). The use of control methods (e.g., adaptive and/or robust control methods) may be included in a power system which may include a source of direct current (DC) voltage supplied across a first output terminal and a second output terminal. A DC to AC inverter may include a first input terminal and a second input terminal. The first input terminal and the second input terminal may be connectable to the first output terminal and the second output terminal respectively. The DC to AC inverter may further include a third input terminal. The system may include a converter adaptable to convert a source of power on a third input terminal and a fourth input terminal to a DC output voltage on a third output terminal. The third input terminal and/or the fourth input terminal may be connectable to a ground. The third output terminal may be connectable to the first input terminal and/or the second input terminal. The voltage of the first input terminal and/or the second input terminal may be configurable and/or controllable to be substantially above or below the potential of the ground. The third output terminal may be connectable to the third input terminal. The source of power may be from at least one of a DC voltage and an AC voltage. The source of DC voltage may include a DC to DC converter with an output connected to the first output terminal and the second output terminal and a photovoltaic panel may connect to the input of the DC to DC converter.

The disclosure herein may include a method for a power system to provide a source of DC voltage across a first output terminal and a second output terminal of the source. The DC voltage may be applied to the input of an inverter. The DC voltage may be inverted to an AC voltage by the inverter. An electrical parameter (e.g. voltage, current, power, frequency, etc.) related to the inverting may be sensed on at least one of the first output terminal and the second output terminal. A converter may convert a source of power received on input terminals to a DC output power responsive to the sensed parameter, and one of the input terminals of the converter may be connected to a reference terminal. The DC output power may be added to the source of DC voltage on at least one of the first output terminal and the second output terminal. A voltage potential that may be substantially above or below a reference potential of the reference terminal may be established and maintained at the first output terminal and/or the second output terminal. The reference potential may be a ground potential. The power source may provide power at a DC voltage and/or at an AC voltage.

The disclosure herein may include a power system including a first group of DC power sources, and a first group of power converters with inputs connectable respectively to the power sources on multiple first terminals and second terminals. The outputs of the power converters may be connected in series between first output terminals and second output terminals. Multiple DC to AC inverters with inputs may be connected in parallel across first output terminals and the second output terminals. A second group of power converters may be adapted to convert power from multiple power sources on third input terminals and fourth input terminals to DC output voltages on third output terminals. The power sources may be DC voltages and/or AC voltages. At least one of the third input terminals and/or the fourth input terminals may be connectable to a ground. The third output terminals may be connectable to at least one of the first input terminals and the second input terminals. The voltages of at least one of the first input terminals and the second input terminals are configurable to be above or below the potential of the ground.

Regulating a reference voltage at one or more points in a power system may increase lifetime of components of the power system by alleviating certain voltage-affected degradation effects, for example. Potential Induced Degradation (PID). For example, if a voltage at a DC terminal of a PV string is regulated to be at a non-negative voltage (e.g. 0V, 10V or 50V), the entire string may be of non-negative voltage, and PID (which may be common in systems featuring negative voltages with respect to ground) may be alleviated or reduced. Another benefit of regulating a reference voltage at one or more points in a power system may be to enable extension of photovoltaic strings by referencing certain points in the power system to a voltage within regulatory limits.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures. In the drawings, like numerals reference similar elements.

DETAILED DESCRIPTION

In the following description of various illustrative features, reference is made to the accompanying drawings, which form a part hereof, and in which is shown, by way of illustration, various features in which aspects of the disclosure may be practiced. It is to be understood that other features may be utilized and structural and functional modifications may be made, without departing from the scope of the present disclosure.

By way of introduction, features may be directed to system and methods in an interconnected power system to enable the voltage applied to terminals of an inverter are no longer floating voltages but may instead be established and maintained to be above the potential of a ground and/or earth potential.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

The terms, "substantially", and, "about", used herein include variations that are equivalent for an intended purpose or function (e.g., within a permissible variation range). Certain ranges are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Figure 1A:
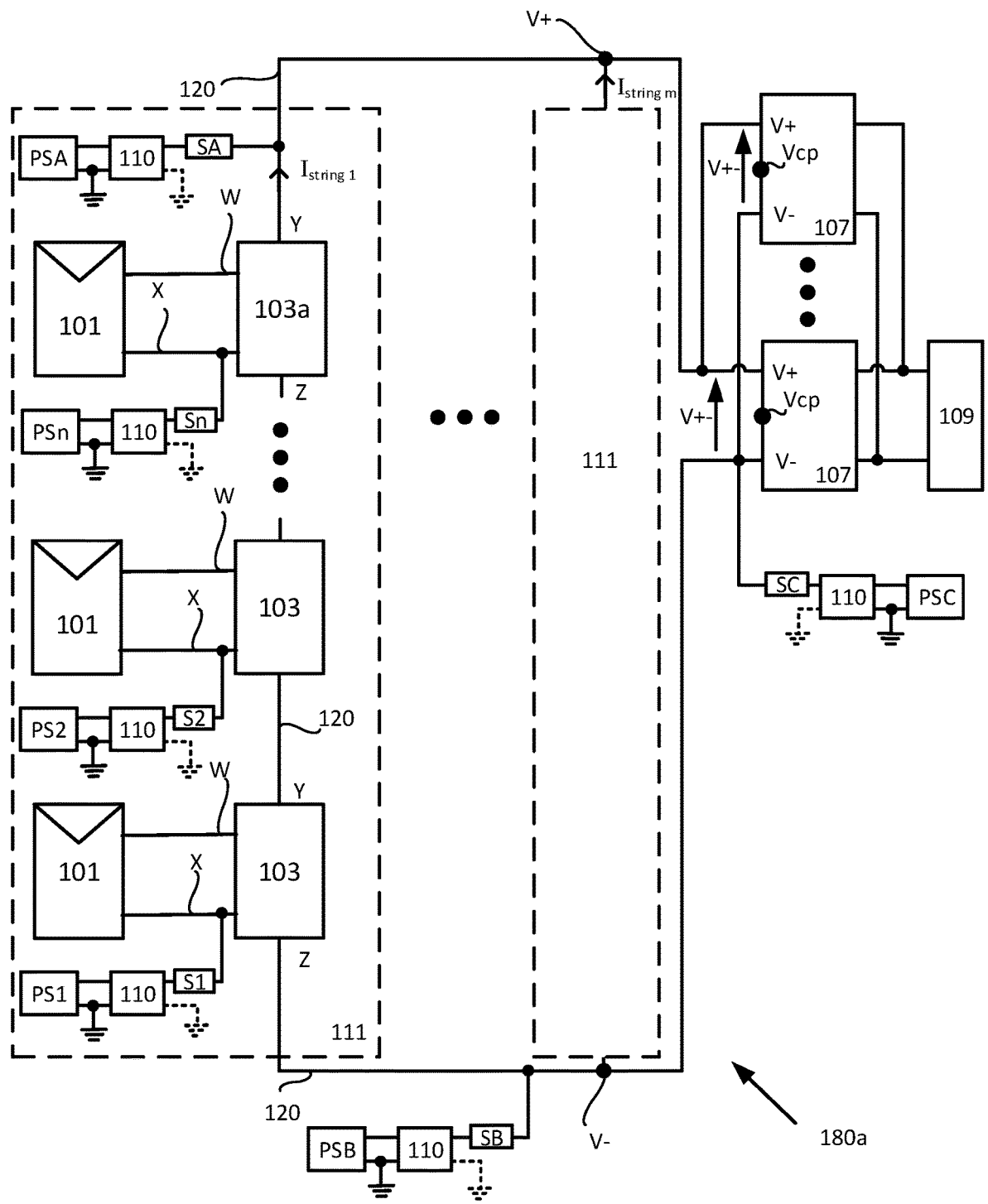
FIG. 1A illustrates a block diagram of a power system, according to illustrative aspects of the disclosure.

Reference is now made to FIG. 1A, which illustrates a power system 180*a* and details of wiring configurations 111 and their connections to system power device 107, according to illustrative aspects of the disclosure. System power device 107 may be a direct current (DC) to alternating current (AC) inverter and load 109 may be a utility grid, a home electrical system or other load such as a single phase and/or three phase AC motor for example. System power devices 107 and system power devices described later may be, for example, a single phase and/or three phase DC to AC converter (also known as an inverter), a DC combiner box, and/or a monitoring, communication and/or control device. Multiple system power devices 107 may be connected in parallel to each other such that the inputs to system power devices 107 are connected in parallel and the outputs of system power devices 107 are also connected in parallel. According to some features, the inputs to system power devices 107 may be connected in parallel, but the outputs of system power devices 107 may be connected to individual, unconnected loads. According to some features, the outputs of system power devices 107 may be connected in parallel, but the inputs of power devices 107 may be connected to individual, unconnected power sources.

System power devices 107 may have an input at terminals designated as terminals V+ and V− and terminal $V_{CP}$. System power device 107 may include connection terminal $V_{CP}$ which may optionally connect to another connection terminal $V_{CP}$ of another system power device 107. According to some features, terminal $V_{CP}$ may be a terminal internal to system power device 107 and not accessible for direct electrical connection to an external device (e.g., a different system power device 107).

Converter 110 may be connected to power supply PSC and may provide a voltage to a terminal of system power device 107. In FIG. 1A, an output of converter 110 is shown connected to DC terminal V− of system power device 107. According to some features, the output may optionally connect to DC terminal V+ of system power device 107 and/or connection terminal $V_{CP}$. An input to converter 110 may be from power supply PSC, where one of the input connections to converter 110 is connected to ground and/or earth. Power supply PSC may provide a source of DC power to be converted by converter 110. The source of DC power may be provided from a power source 101 (e.g., a PV generator) connected to power device 103/103a, from a power device 103/103a, from the string of series connected power devices 103/103a and/or from an auxiliary source of DC power which may be separate from the DC power of power system 180a (e.g. from a storage device such as a battery). The source of DC power may be provided from a conversion of AC power provided from the output of system power device 107, an AC grid supply which may or may not be connected to system power device 107, and/or from an auxiliary source of AC power which may be separate from the AC power of power system 180a. According to some features, PSC may be an AC power source (e.g., a flywheel storage device or a wind turbine) and converter 110 may be an AC-to-DC converter.

Using power supply PSA as an example which may also apply to the other power supplies PS1-PSn, PSB, PSC and their respective converters 110, converter 110 may have a switch SA. Switch SA may be configurable to connect or disconnect the output of converter 110 from terminals Y, V+. Similarly, switches S1-Sn may be configurable to connect or disconnect the output of respective converters 110 from terminals X, and switches SB/SC may be configurable to connect or disconnect the output of respective converters 110 from terminals Z, V−. In the drawings, a ground is shown (as a solid line) with a connection to the point where one of the terminals of power supplies PS1-PSn, PSA, PSB, PSC connects to an input terminal of respective converter 110.

Alternatively, a ground (in dotted line) may connect to one of the output terminals of respective converter 110, and power supplies PS1-PSn, PSA, PSB, PSC connected to the input of converters 110 may be left without a direct connection to ground. In general, switches S1-Sn, SA, SB and SC may be connected separately to their respective converters 110 or may be an integrated/internal part of respective converters 110. For descriptions and drawings that follow, switches on the outputs of converters 110 are not explicitly shown, but may or may not be included on the output of converters 110. Similarly, in the descriptions that follow, ground connections on the outputs of converters 110 (not shown in the descriptions and diagrams that follow) may be used instead of connections to the point where one of the terminals of power supplies PS1-PSn, PSA, PSB, PSC connects to an input terminal of a respective converter 110.

Multiple wiring configurations 111 are shown connected in parallel at terminals V+ and V− which connect to the input of system power device 107 to provide voltage input V+− to the input of system power device 107. The output of system power device 107 may connect to load 109. Each wiring configuration 111 may include one or more power sources 101 which may be connected to a respective power device 103 and/or power device 103a at terminals W, X. The outputs of power devices 103/103a at terminals Y, Z may be connected together to form a serial string which connects between terminals V+ and V−. As such, for 'm' strings, the 'm' strings may provide respective currents $I_{string\ 1}$-$I_{string\ m}$ into power device 107 and voltage V+− across input terminals of power device 107. Connections between power devices 103/103a and strings of power device 103/103a devices connected to system power devices 107 may be by use of power lines 120.

Converters 110 are shown connected to system power device 107 and may also be connected to power devices 103/103a. Converter 110 may be an integrated part of system power devices 107/power devices 103/103a and/or retrofitted to system power devices 107/power devices 103/103a. Multiple converters 110 within wiring configuration 111 are shown where for each converter 110, a number of 'n' power supplies PS1-PSn are connected to the input of each respective converter 110, where one of the inputs to each converter 110 may be connected ground and/or earth. The output of each converter 110 with respective power supplies PS1-PSn may be connected to terminal X of power devices 103a/103. Alternatively, the output of each converter 110 with respective power supplies PS1-PSn may be connected to terminal W of power devices 103a/103. Power supply PSA connected to converter 110 has the output of converter 110 connected to terminal Y of power device 103a but may also connect to terminal Z of power device 103a. In a similar manner, a number of power supplies, similar to power supply PSA, with respective connections to converters 110, may have respective outputs of converters 110 which connect to terminal Y and/or Z of remaining power devices 103 in wiring configurations 111. According to some features described below, converter 110 may be a DC to DC converter such as a Buck, Boost, Buck/Boost, Buck+Boost, Cuk, Flyback, single-ended primary-inductor converter (SEPIC) and/or forward converter, switched auto-transformer or a charge pump. In other descriptions below converters 110 may be AC to DC converters such as uncontrolled diode rectifier circuits, phase-controlled rectifiers and/or switched mode power supply (SMPS).

Power supplies PS1-PSn, PSA may provide a source of DC power to be converted by converters 110. The source of DC power may be provided from a power source 101 connected to power device 103/103a, from a power device 103/103a, from the string of series connected power devices 103/103a and/or from an auxiliary source of DC power which may be separate from the DC power of power system 180a. The source of DC power may be provided from a conversion of AC power provided from the output of system power device 107, an AC grid supply which may or may not be connected to system power device 107, and/or from an auxiliary source of AC power which may be separate from the AC power of power system 180a. Features and operation of converters 110 are described in greater detail below in the descriptions which follow.

According to some features, one or more wiring configurations 111 might not include power devices 103a or 103. For example, a wiring configuration 111 may include multiple power sources 101 directly connected in series or in parallel. For example, a wiring configuration 111 may have ten, twenty or thirty serially-connected photovoltaic panels. According to some features, a wiring configuration 111 may include a first group of one or more directly connected power sources 101, with a second group of one or more power sources 101 connected via power devices 103a or 103 connected to the first group. This arrangement may be useful in power installations where some power sources 101 may be susceptible to factors which reduce power generation (e.g. PV generators which are occasionally shaded by shade, wind turbines which occasionally suffer from a reduction in wind) and where other power sources 101 are less susceptible to power-reducing factors.

Whereas power supplies PS1-PSn, PSA and respective converters 110 may be included in a wiring configuration 111, it may also be possible to connect a power supply and a corresponding converter to an overall parallel connection of wiring configurations 111. An example of the connection to the overall parallel connection may be power supply PSB and its respective converter 110 output is shown connected to terminal Z/V− via switch SB. In a similar way, the connection to the overall parallel connection may be power supply PSA and a corresponding converter 110 may be connected to terminal Y/V+ via switch SA. A power supply and corresponding converter may be electrically terminated in a junction box and located in proximity to power sources 101/power modules 103/103a, at some point in the wiring of power cables 120 between wiring configurations 111 and system power devices 107, and/or at power devices 107 for example.

As shown in FIG. 1A, the power supplies PS1-PSn, PSA, and PSC connected via a converter 110 to a terminal (e.g. any of terminals X, terminal V−, or terminal V+) in wiring configuration 111 may ensure that the voltage at each terminal is maintained at a desirable voltage point with respect to the ground potential, or ensure voltages V+ and V− applied to system power device 107 to be symmetrical at terminals V+ and V− of system power device 107 with respect to terminal $V_{cp}$ which may also be connected to earth potential for example. With respect to FIG. 1A and other figures which follow, multiple power supplies PS1-PSn, PSA, PSB, PSC and respective converters 110/switches S1-Sn, SA, SB, SC are shown to illustrate where use of one or more power supplies and converters 110 may be connected to establish that the voltage at each terminal V+, V− is maintained at a desirable voltage point with respect to the ground potential, or to ensure that voltages applied to terminals V+ and V− of system power device 107 are symmetrical at terminals V+ and V−.

Figure 1B:
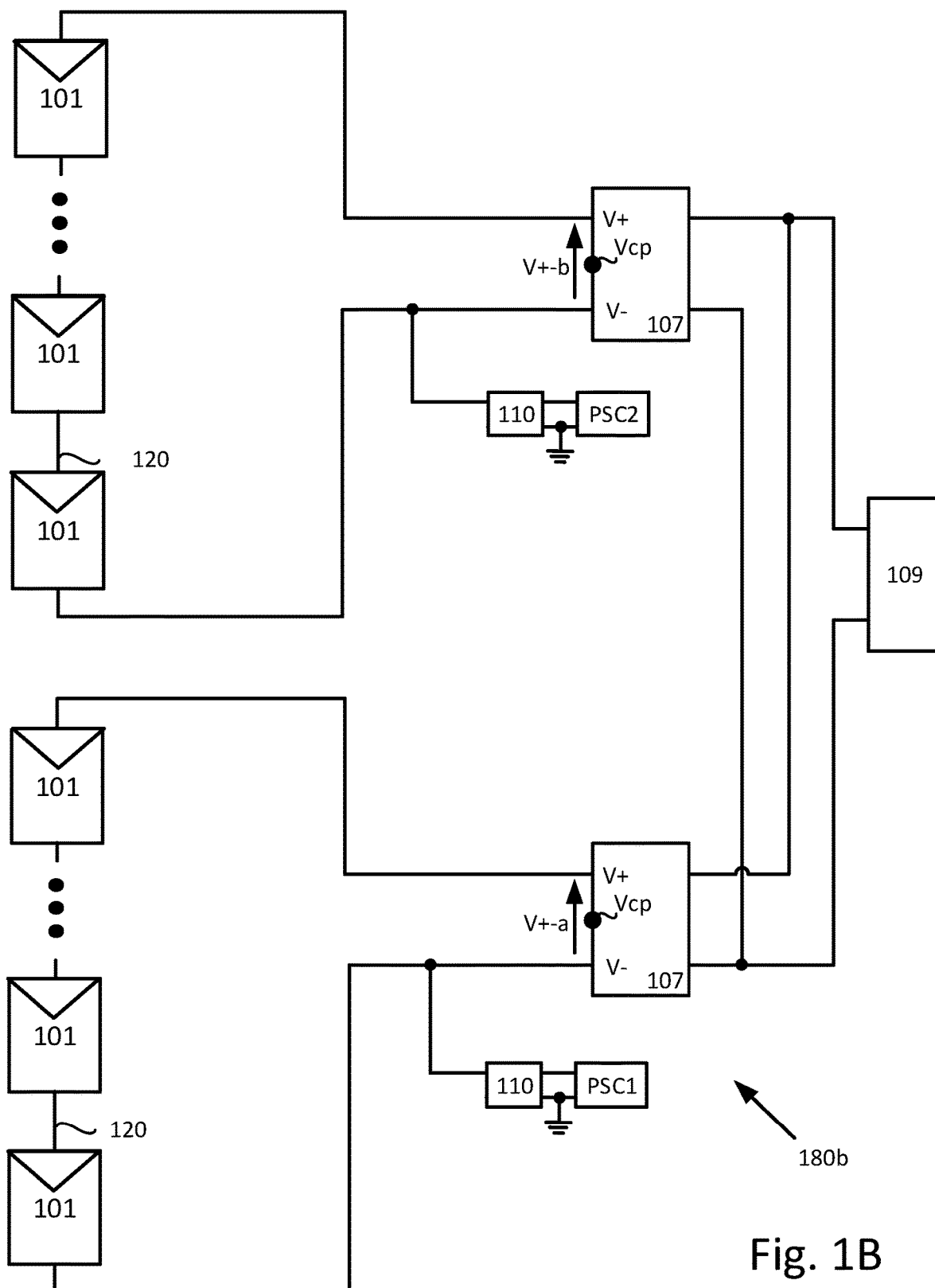
FIG. 1B illustrates a block diagram of a power system, according to illustrative aspects of the disclosure.

Reference is now made to FIG. 1B, which illustrates a power system 180b, according to illustrative aspects of the disclosure. Two or more strings of serially connected power sources 101 may be connected across the respective inputs of system power devices 107 as DC voltages V+− a and V+− b. Power lines 120 connect power sources 101 together in series and the string formed thereby to the input of a system power device 107. The outputs of system power devices 107 may be connected in parallel and to load 109. Power supplies PSC1/PSC2 may provide a respective DC input to respective converters 110. Features included and described in further detail in the descriptions of converters 110 herein may allow both power supplies PSC1/PSC2 via respective converters 110 to be connected to respective system power devices 107 or just one of power supplies PSC1/PSC2 to be connected to a system power device 107. Connection of an output of converter 110 may be to either terminal (V+, V−) of system power device 107. One of the terminals of power supplies PSC1/PSC2 may be referenced to a desirable voltage point with respect to ground and/or a ground potential as shown.

For example, as shown in FIG. 1B, a first string of serially-connected power sources 101 may be connected to the input of a first system power device 107, and a second string of serially-connected power sources 101 may be connected to the input of a second system power device 107. The first and second system power devices might not be connected at input terminals and may be (as shown in FIG. 1B) connected in parallel at the output side of the system power devices 107. According to some features, power sources PSC1 and PSC2 and corresponding converters 110 may both be featured, for example, where power sources PSC1 and PSC2 and corresponding converters 110 are integrated in system power devices 107. According to some features (e.g., where a power source PSC1/PSC2 and a corresponding converter 110 are retrofit to a power system), a single power source and converter may be connected to the first system power device 107, and compensation voltage output by converter 110 may propagate to the second system power device 107 due to the parallel-output-connection of the first and second system power devices 107.

A control feature of power system 180b may be to establish and maintain the voltage applied to a terminal V− to be above the potential of the ground connection provided by a converter 110 or to establish and maintain the voltage applied to terminal V− to be below the potential of the ground connection provided by converter 110 if the polarity of the input to converter 110 from the power supply is reversed for example. Yet further, the control feature may include the feature to ensure voltage V+− applied to system power device 107 to be symmetrical at terminals V+ and V− of system power device 107. In other words, an equal amount of positive DC voltage and negative DC voltage may be applied on respective terminals V+ and V− of system power device 107 to maintain a symmetric string voltage across system power device 107.

Power supplies PSC1/PSC2 may provide sources of DC power to be converted by respective converters 110. The source of DC power may be provided from a power source 101 connected to power device 103/103a, from a power device 103/103a, from the string of series connected power devices 103/103a and/or from an auxiliary source of DC power which may be separate from the DC power of power system 180b (e.g. from a storage device such as a battery). The source of DC power may be provided from a conversion of AC power provided from the output of system power device 107, an AC grid supply which may or may not be connected to system power device 107, and/or from an auxiliary source of AC power which may be separate from the AC power of power system 180*b*. According to some features, power supplies PSC1/PSC2 may be AC power sources (e.g., a flywheel storage device or a wind turbine) and converters 110 may be AC-to-DC converters.

Figure 1C:
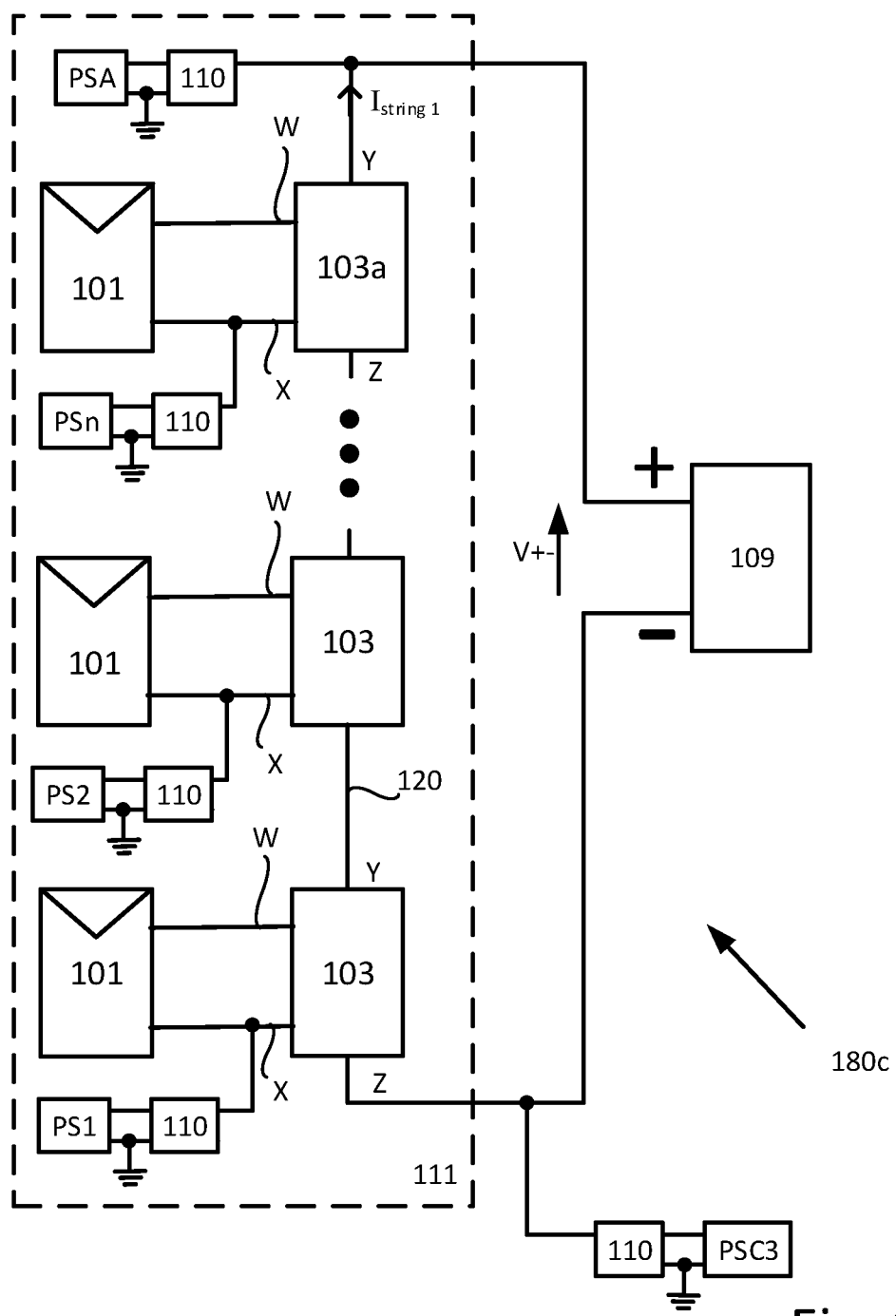
FIG. 1C illustrates a block diagram of a power system, according to illustrative aspects of the disclosure.

Reference is now made to FIG. 1C, which illustrates a power system 180*c*, according to illustrative aspects of the disclosure. Power system 180*c* may be a DC-only system where the DC output of wiring configuration 111, described above with respect to FIG. 1A, is connected to a DC load 109. Even though one wiring configuration 111 is shown in FIG. 1C, it should be understood that multiple wiring configurations 111 may be connected together in various series/parallel and/or parallel interconnections that may be applied to DC load 109. Alternatively, or in addition, power supply PSC3 may be connected to the negative (−) terminal of DC load 109 and/or the positive (+) terminal of DC load 109. One or more power supplies PSn located/connected in wiring configuration 111 (e.g. at inputs to power devices 103 and/or at intermediate points within wiring configuration 111) may enable voltage V+− applied to DC load 109 to be symmetrical at terminals+ and − of DC load 109. In other words, an equal amount of positive DC voltage and negative DC voltage may be applied on respective terminals+ and − of DC load 109 to maintain a symmetric string voltage across load 109. Load 109 may be a DC load such as a DC motor, a battery and/or be the input of a DC to DC converter or the input of a DC to AC inverter. According to some features, one or more power supplies PSn located/connected in the middle of wiring configuration 111 (e.g. at inputs to power devices 103 and/or at intermediate points within wiring configuration 111) may maintain all voltages in wiring configuration 111 at a non-negative or non-positive voltage with respect to ground, which may alleviate potential induced degradation.

Figure 1D:
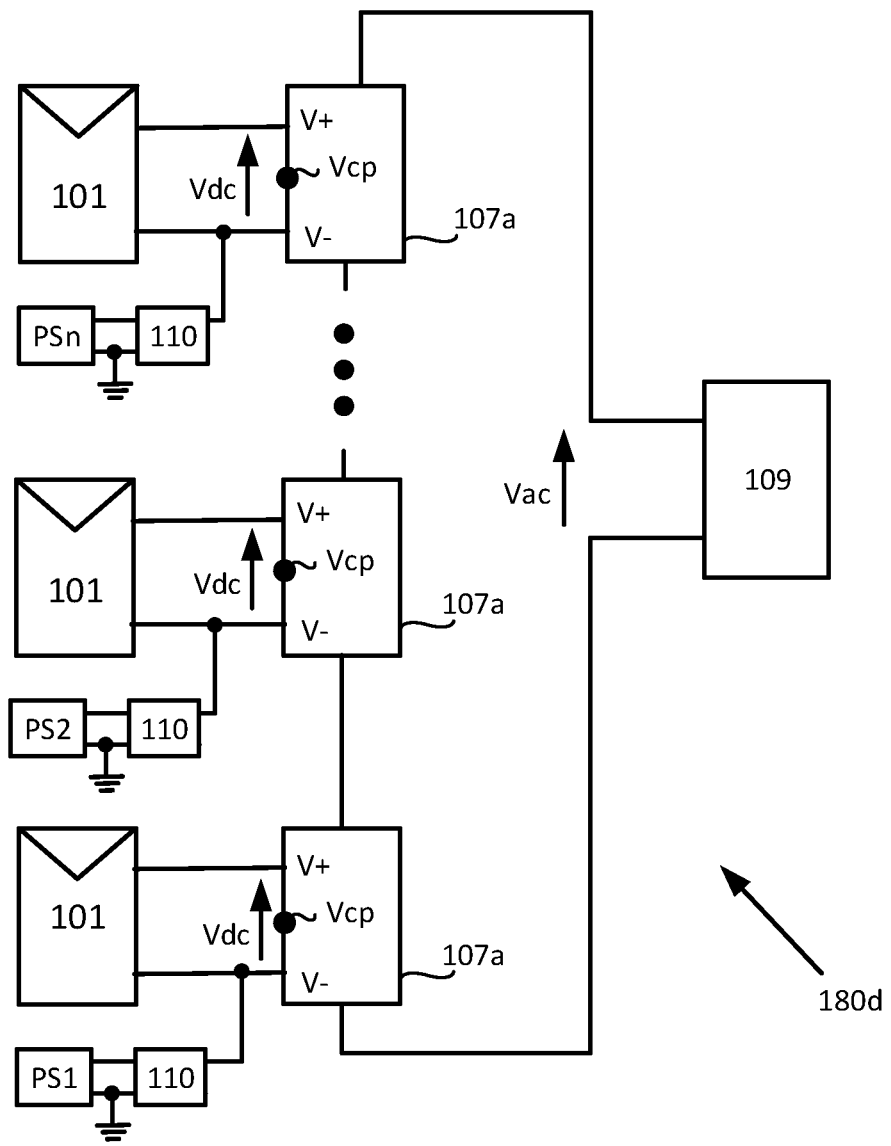
FIG. 1D illustrates a block diagram of a power system, according to illustrative aspects of the disclosure.

Reference is now made to FIG. 1D, which illustrates a power system 180*d*, according to illustrative aspects of the disclosure. Power system 180*d* includes a series string of micro inverter 107*a* AC outputs connected to an AC load 109. The outputs of micro inverter 107*a* may be single phase or three phase. The DC inputs to each of the micro inverters 107*a* may be supplied by a power source 101. Multiple power supplies PS1, PS2-PSn may connect to terminals V− of respective micro inverters 107*a* via the outputs of converters 110. The inputs of converters 110 may connect to respective power supplies PS1, PS2-PSn. The outputs of a converter 110 may connect to either terminal V+ or V− of a microinverter 107*a*.

As a numerical example, the Vac voltage across a string of serially connected inverters may be 110 Vrms. Power source PS1 may be connected to a converter 110 configured to output 150 VDC to an input (as illustrated) or output of inverter 107*a*, ensuring that the voltage at any point in power system 180*d* does not fall below 0V with respect to ground.

Figure 1E:
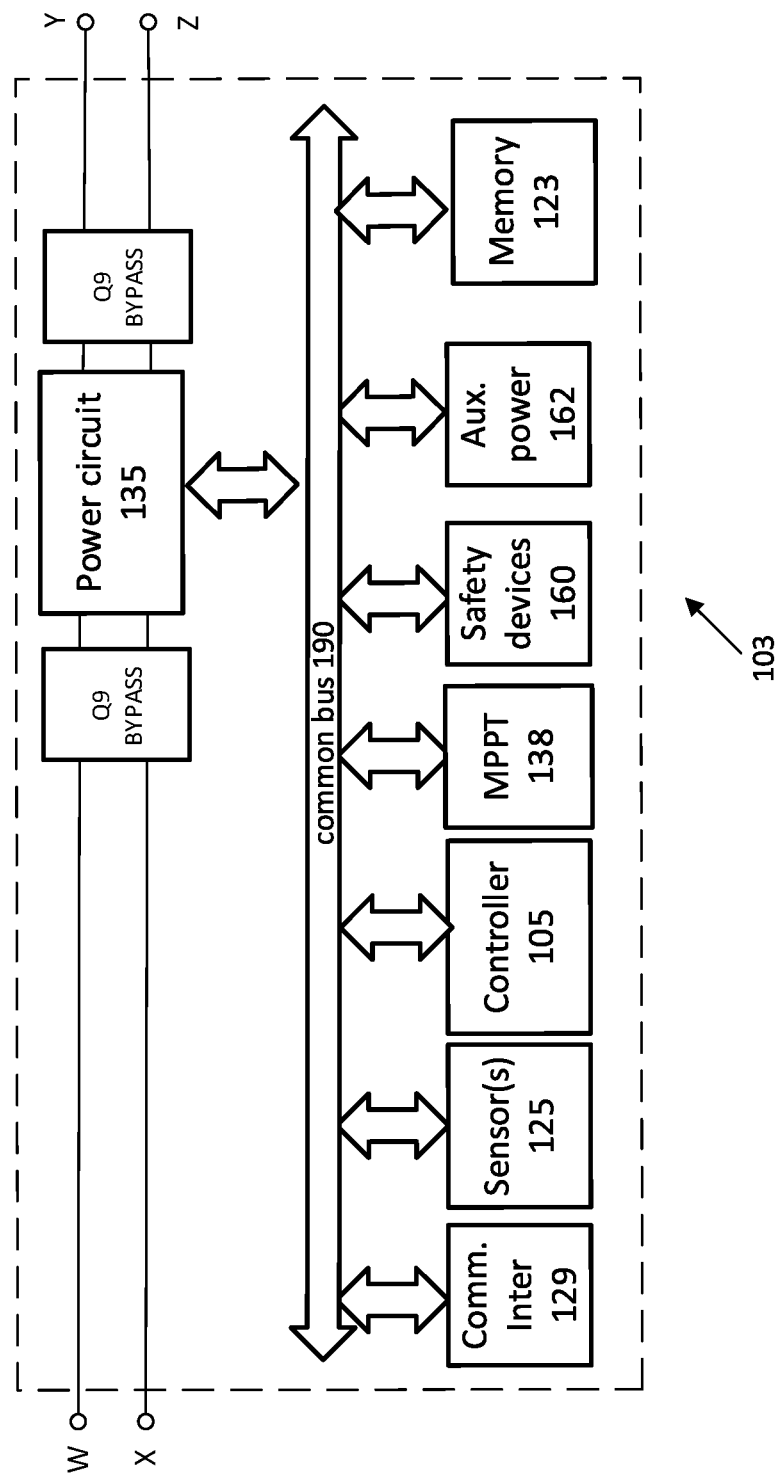
FIG. 1E illustrates circuitry which may be found in a power device such as power devices shown in FIG. 1A, according to illustrative aspects of the disclosure.

Reference is now made to FIG. 1E, which illustrates circuitry that may be found in a power device 103, according to illustrative aspects of the disclosure. Power device 103 may be similar to or the same as power devices 103/103*a* shown in FIG. 1A which may provide respective input and output terminals W, X and Y, Z. Input and output terminals W, X and Y, Z may provide connection to power lines 120 (not shown). According to some features, power device 103/103*a* may include power circuit 135. Power circuit 135 may include a direct current-direct current (DC/DC) converter such as a Buck, Boost, Buck/Boost, Buck+Boost, Cuk, Flyback and/or forward converter, or a charge pump. In some features, power circuit 135 may include a direct current to alternating current (DC/AC) converter (also known as an inverter), such as a micro-inverter. Power circuit 135 may have two input terminals and two output terminals, which may be the same as the input terminals and output terminals of power device 103/103*a*. In some features, Power device 103/103*a* may include Maximum Power Point Tracking (MPPT) circuit 138, configured to extract increased power from a power source.

According to some features, power circuit 135 may include MPPT functionality. In some features, MPPT circuit 138 may implement impedance matching algorithms to extract increased power from a power source the power device may be connected to. Power device 103/103*a* may further include controller 105 such as a microprocessor, Digital Signal Processor (DSP), Application-Specific Integrated Circuit (ASIC) and/or a Field Programmable Gate Array (FPGA).

Still referring to FIG. 1E, controller 105 may control and/or communicate with other elements of power device 103/103*a* over common bus 190. According to some features, power device 103/103*a* may include circuitry and/or sensors/sensor interfaces 125 configured to measure operating power parameters directly or receive measured operating power parameters from connected sensors and/or sensor interfaces 125 configured to measure operating power parameters on or near the power source, such as the voltage and/or current output by the power source and/or the power output by the power source. According to some features, the power source may be a photovoltaic (PV) generator comprising PV cells, and a sensor or sensor interface may directly measure or receive measurements of the irradiance received by the PV cells, and/or the temperature on or near the PV generator.

Still referring to FIG. 1E, according to some features, power device 103/103*a* may include communication interface 129, configured to transmit and/or receive data and/or commands from other devices. Communication interface 129 may communicate using Power Line Communication (PLC) technology, acoustic communications technology, or additional technologies such as ZIGBEE™, Wi-Fi, BLUETOOTH™, cellular communication or other wireless methods. Power Line Communication (PLC) may be performed over power lines 120 between power devices 103/103*a* and system power device (e.g. inverter) 107 which may include a similar communication interface as communication interface 129.

According to some features, power device 103/103*a* may include memory 123, for logging measurements taken by sensor(s)/sensor interfaces 125 to store code, operational protocols or other operating information. Memory 123 may be flash, Electrically Erasable Programmable Read-Only Memory (EEPROM), Random Access Memory (RAM), Solid State Devices (SSD) or other types of appropriate memory devices.

Still referring to FIG. 1E, according to some features, power device 103/103*a* may include safety devices 160 (e.g. fuses, circuit breakers and Residual Current Detectors). Safety devices 160 may be passive or active. For example, safety devices 160 may include one or more passive fuses disposed within power device 103/103*a* where the element of the fuse may be designed to melt and disintegrate when excess current above the rating of the fuse flows through it, to thereby disconnect part of power device 103/103*a* so as to avoid damage. According to some features, safety devices 160 may include active disconnect switches, configured to receive commands from a controller (e.g. controller 105, or an external controller) to short-circuit and/or disconnect portions of power device 103/103a, or configured to short-circuit and/or disconnect portions of power device 103/103a in response to a measurement measured by a sensor (e.g. a measurement measured or obtained by sensors/sensor interfaces 125). According to some features, power device 103/103a may include auxiliary power circuit 162, configured to receive power from a power source connected to power device 103/103a, and output power suitable for operating other circuitry components (e.g. controller 105, communication interface 129, etc.). Communication, electrical connecting and/or data-sharing between the various components of power device 103/103a may be carried out over common bus 190. According to some features, auxiliary power circuit 162 may be connected to an output of a power device 103/103a and designed to receive power from power sources connected to other power devices.

Power device 103/103a may include or be operatively attached to a maximum power point tracking (MPPT) circuit. The MPPT circuit may also be operatively connected to controller 105 or another controller 105 included in power device 103/103a which may be designated as a primary controller. Power device 103a in FIG. 1A may be an example of a power device having primary controller, and in this example power devices 103 are secondary devices having secondary controllers. A primary controller in power device 103a may communicatively control one or more other power devices 103 which may include controllers known as secondary controllers. Once a primary/secondary relationship may be established, a direction of control may be from the primary controller to the secondary controllers. The MPPT circuit under control of a primary and/or secondary controller 105 may be utilized to increase power extraction from power sources 101 and/or to control voltage and/or current supplied to system power device (e.g. an inverter or a load) 107. According to some aspects of the disclosure, a primary power device 103a might not be featured, and wiring configuration 111 may feature power devices 103, without any of power devices 103 featuring a primary controller.

Referring still to FIG. 1E, in some features, power device 103/103a may include bypass unit Q9 coupled between the inputs of power circuit 135 and/or between the outputs of power circuit 135. Bypass unit Q9 and/or power circuit 135 may be a junction box to terminate power lines 120 or to provide a safety feature such as fuses or residual current devices. Bypass unit Q9 may also be an isolation switch for example. Bypass unit Q9 may be a passive device, for example, a diode. Bypass units Q9 may be controlled by controller 105. If an unsafe condition is detected, controller 105 may set bypass unit Q9 to ON, short-circuiting the input and/or output of power circuit 135. In a case in which the pair of power sources 101 are photovoltaic (PV) generators, each PV generator provides an open-circuit voltage at its output terminals. When bypass unit Q9 is ON, a PV generator may be short-circuited, to provide a voltage of about zero to power circuit 135. In both scenarios, a safe voltage may be maintained, and the two scenarios may be staggered to alternate between open-circuiting and short-circuiting PV generators. This mode of operation may allow continuous power supply to system control devices, as well as provide backup mechanisms for maintaining a safe voltage (i.e., operation of bypass unit Q9 may allow continued safe operating conditions).

In some features, a power device 103/103a may comprise a partial group of the elements illustrated in FIG. 1E. For example, a power device 103/103a might not include power circuit 135 (i.e. power circuit 135 may be replaced by a short circuit, and a single bypass unit Q9 may be featured. In a scenario where power circuit 135 is not present, power device 103/103a may be still used to provide safety, monitoring and/or bypass features.

Figure 1F:
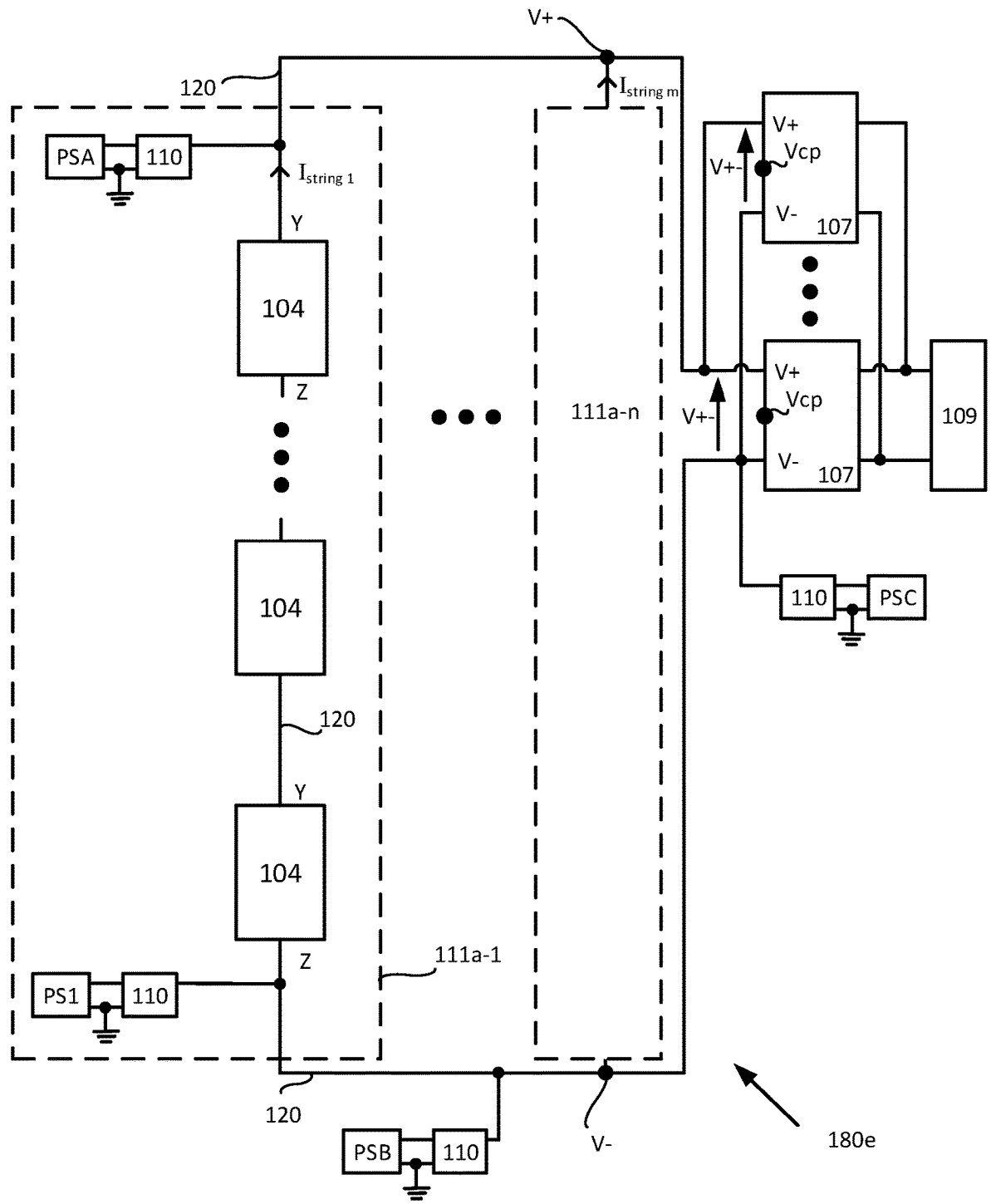
FIG. 1F illustrates a block diagram of a power system, according to illustrative aspects of the disclosure.

Reference is now made to FIG. 1F, which illustrates a power system 180e and details of wiring configurations 111a-1-111a-n connected to system power devices 107, according to illustrative aspects of the disclosure. Wiring configuration 111a-1 may be the same as wiring configuration 111a-n or may be different. For the sake of ease of discussion that follows, wiring configurations are considered the same and referred to as wiring configuration(s) 111a-n. Power system 180e is similar to power system 180a of FIG. 1A in that multiple wiring configurations 111a-n are connected in parallel and provide voltage V+− to system power devices 107 just like multiple wiring configurations 111 are connected in parallel to provide voltage V+ to system power devices 107 at terminals V+ and V− in FIG. 1A. Wiring configuration 111a-n may include a series connection of power sources 104 and/or a single power source 104, where the series connection is connected across terminals V+ and V− of system power devices 107. Alternatively, wiring configuration 111a-n may include various series/parallel connections of power sources 104. Power sources 104 may be similar and/or dissimilar, for example, power sources 104 may similarly be batteries but dissimilar in terms of the battery type (for example Nickel-cadmium (NiCad), Lithium, lead acid), the voltages provided by each battery as well as ratings of each battery in terms of ampere hour (Ah) for example. As such, power sources 104 may be a variety of power sources such as batteries, photovoltaic panels, DC generators and/or a combination of power source 101 and respective power device 103/103a as shown with respect to power system 180a. According to features of the disclosure herein, and as shown in FIG. 1F, power devices 103/103a might not be featured at all, rather, a series string of power sources may be formed by directly serially connecting output terminals of each power source 104.

Connections of power supplies PS1, PSA and PSC to terminals Y/V+ and/or Z/V-via converters 110, according to descriptions which follow, may provide the option of the voltage applied to terminals V− and V+ to be no longer floating. Instead the voltages on terminals V− and V+ may be established above the potential of the ground by virtue of ground connections which may be provided by converters 110. As such by way of non-limiting example, if power sources 104 are photovoltaic panels, during daytime operation terminals V− and V+ may be kept above ground potential and at night below ground potential or vice versa. Such an arrangement for nighttime and/or daytime operation may mitigate voltage induced power degeneration of the photovoltaic panels during daytime operation as well as to affect a repair to the photovoltaic panels at nighttime. Alternatively, or in addition, to mitigate voltage induced power degeneration of the photovoltaic panels for daytime operation, for one day during daytime operation terminals V− and V+ may be kept above ground potential and the next day below ground potential and so on, in an alternating fashion.

According to features of the disclosure herein, a converter 110 may be configured to output a first voltage during the daytime and a second voltage at night. As a non-limiting example, a converter 110 may be integrated into a system power device 107 and may be configured to output a voltage to set the voltage operating point at terminal V−. When substantial input power (e.g., a power level above a first threshold) is measured at the system power device 107 (indicating a daytime condition of substantial production of photovoltaic power), converter 110 may output, for example, 10V, to ensure that all photovoltaic generators connected to the system power device input are referenced to a positive voltage. When an insubstantial input power (e.g., a power level under the first threshold or under a second threshold) is measured at the system power device 107 (indicating a nighttime condition of lack of substantial production of photovoltaic power), converter 110 may output, for example, 100V, to increase the positive voltage bias of terminal V−. Increasing the positive voltage bias of connected PV generators (e.g., by increasing the positive voltage bias of terminal V−) may reverse potential-induced degradation effects that may develop on PV generators during the daytime.

A single power supply connected via a converter 110 to a reference point (e.g. any of terminals X indicated in FIG. 1A, or terminal V−, or terminal V+) in wiring configuration 111 may be sufficient to reference the voltage of wiring configuration 111 to a desirable voltage point and/or ground potential. Multiple power sources PS1 . . . PSn illustrated show various possibilities for implementation and not to indicate that all of the power sources and corresponding converters 110 are required. In descriptions above and those that follow for power systems, power sources (power sources PS1 . . . PSn for example) may be referenced to a desirable voltage point with respect to ground and/or ground potential.

Figure 2A:
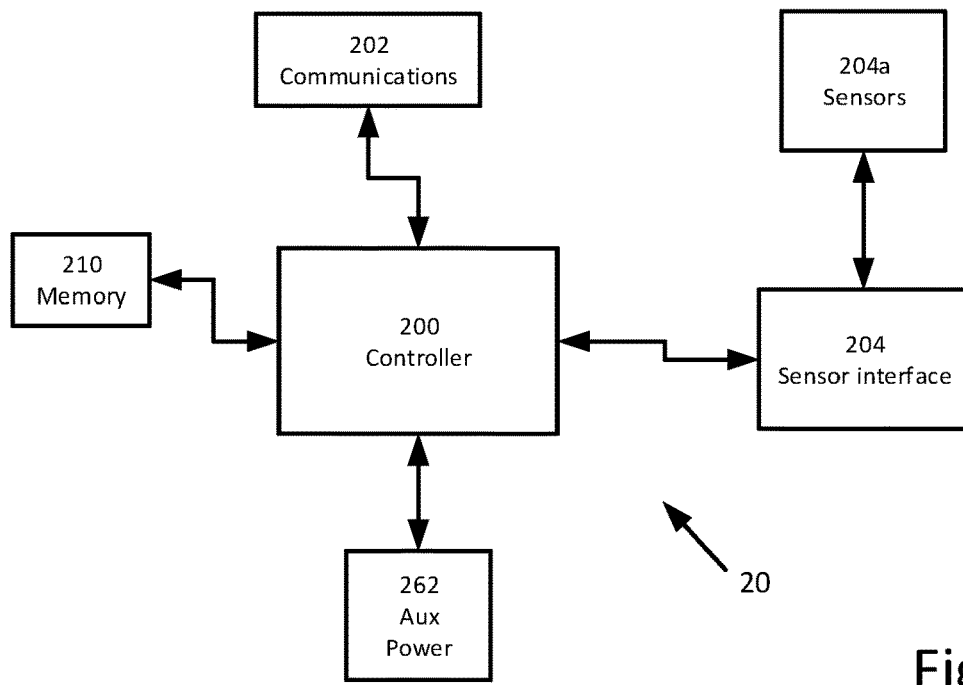
FIG. 2A shows a block diagram of further details of a controller, according to illustrative aspects of the disclosure.

Reference is now made to FIG. 2A which shows a block diagram of further details of control unit 20 which includes a controller 200, according to illustrative aspects of the disclosure. Controller 200 may include a microprocessor, microcontroller and/or digital signal processor (DSP) which may connect to a memory 210. With respect to FIG. 1A, controller 200 in one converter 110 may serve as a primary controller to the other controllers 200 of the other converters 110. As such, communications interface 202 connected to controller 200 may provide communications between controllers 200 and other controllers 200/105 included in power system 180*a* for example. Alternatively, a converter 110 if located in proximity to power devices 103/103*a* and/or system power devices 107 may be controlled by a controller of power devices 103/103*a* and/or system power devices 107 but may still retain the other features included in controller 200.

The communications to and from communications interfaces 202 of converters 110 may be by power line communication (PLC) over power lines 120. Communications in communications interface 202 may also include measured or sensed communication parameters via sensors 204*a*/sensor interface 204. Communications interfaces 202 may communicate with a local area network or cellular network in order to establish an internet connection which for example may provide a feature of remote control, remote monitoring and/or reconfiguration of power devices 103/103*a* and/or system power device 107 for example. Controller 200 may further include auxiliary power circuit 262, configured to receive power from a power source connected to power device 103/103*a*, system power device 107 and output power suitable for operating other circuitry components (e.g. controller 200, communication interface 202, etc.). According to some features, auxiliary power circuit 262 may be connected to an output of a power device 103/103*a*, system power device 107, power supplies PS1-PSn, PSA, Ps4 and designed to receive power from power sources connected to other power devices and/or sources of power independent from power produced by power system 180*a*.

In the descriptions that follow, example method of design and operation for converter 110 are shown where power supplied to the input of converter 110 is an AC power and/or a DC power which may be supplied for example from a power source 101 connected to power device 103/103*a*, from a power device 103/103*a*, from the string of series connected power devices 103/103*a* and/or from an auxiliary source of DC power which may be separate from the DC power of a power system 180*a*.

Figure 2B:
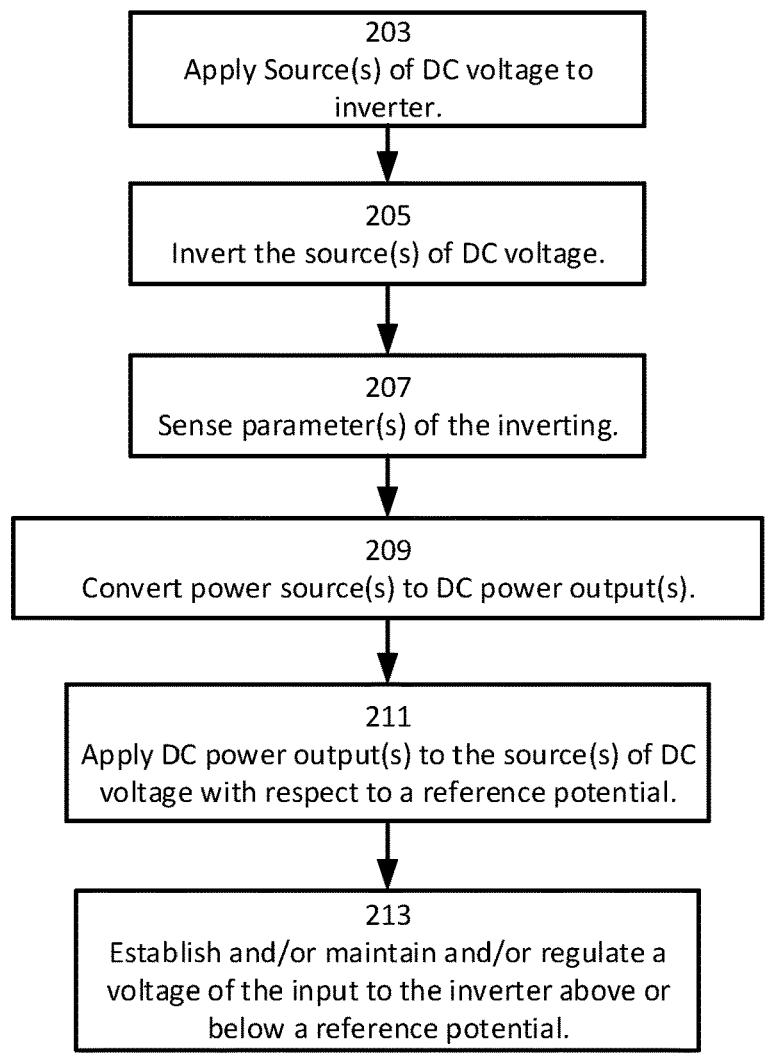
FIG. 2B shows a flowchart of a method, according to illustrative aspects of the disclosure.

Reference is now made to FIG. 2B which shows a flowchart of a method 201 according to illustrative aspects of the disclosure. Method 201 may be applied to power system 180*a* of FIG. 1A in the description that follows. Steps of method 201 may be implemented by one of the controllers of system power devices 107, power devices 103/103*a* and/or converters 110 acting as a primary controller. At step 203, DC power from wiring configurations 111 may be provided and applied to the input of system power devices 107 (e.g., inverters) across terminals V+ and V−. Within a wiring configuration 111, DC power may be provided via a string of serially connected power device 103/103*a* outputs where the inputs to each of the power devices 103/103*a* is connected to a power source 101. Alternatively, in a wiring configuration 111, a string of interconnected (e.g., connected in series or in parallel) power sources 101 may be applied to the inputs of system power devices 107.

At step 205, DC power (power=voltage x current) from the parallel connected wiring configurations 111 may be inverted by system power devices 107 to an AC power (power=voltage x current) output that may be applied to load 109.

At step 207, electrical parameters (e.g. voltage, current, power, resistance) may be sensed on terminals V−, $V_{CP}$ and/or V+ by a sensor of system power device 107. At about the same time, sensors/sensor interfaces 125 of power device 103/103*a* and/or the sensor interface 204/sensors 204*a* of converters 110 may sense electrical parameters on terminals W, X, Y, Z, V− and V+.

By way of non-limiting example, operation of power supply PS1 is referred to where power system 180*a* has one wiring configuration 111, where the input of converter 110 is connected to power supply PS1, and where all other power supplies and converters are not referred to or used for ease of discussion. At about the same time of step 207, in step 209, the source of DC voltage from power supply PS1 may be converted by converter 110 to provide a greater voltage at the output of converter 110 responsive to the electrical parameters sensed on W, X, Y, Z, V− and V+ in step 207. In other words, converter 110 is functioning as a boost converter. The level of the greater voltage produced at the output of converter 110 may be responsive to the electrical parameter sensed in step 207 or may be produced independently of the electrical parameters sensed in step 207. As such, responsive to the electrical parameter sensed, for example voltage of terminals Z and/or V− (but may include also terminals V+ and $V_{CP}$), the application of the output of converter 110 to terminal X and/or Z at step 211 may add the boosted output voltage of converter 110 to terminal V− of system power device 107. As such, in step 213, the voltage applied to terminal V− is no longer floating but is established above the potential of the ground connection provided by converter 110.

Included in step 213 by operation of the other steps of method 201 is maintenance of the voltage applied to terminal V− above the potential of the ground connection provided by converter 110. Moreover, if power supply PSA is used instead of power supply PS1, and if the polarity of power supply PSA is reversed, the output of converter 110 connected to PSA may be applied to terminals W, Y/V+ such that the steps of method 201 may establish and maintain the voltage applied to terminal V+ to be below the potential of the ground connection provided by converter 110. This may be desirable, for example, when power sources 101 are photovoltaic panels having properties where potential induced degradation (PID) may be reduced by maintaining all of the photovoltaic panels at a voltage below zero with respect to ground. Further, when applying the steps of method 201 in wiring configuration 111, it may be possible to make use of a power supplies PSn located/connected in the middle of wiring configuration to enable voltage V+− applied to system power devices to be symmetrical at terminals V+ and V−. In other words, an equal amount of positive DC voltage and negative DC voltage may be applied on respective terminals V+ and V− of system power device 107 to maintain a symmetric string voltage.

By way of another non-limiting example, operation of power supply PSB is referred to where power system 180a has multiple wiring configuration 111, where the input of converter 110 is connected to power supply PSB and, for ease of discussion, all other power supplies and converters are not referred to or used. At about the same time of step 207, at step 209, the source of DC voltage from power supply PSB may be converted by converter 110 to provide an output voltage that is greater than the voltage at the input of converter 110 responsive to the electrical parameters sensed in step 207. In other words, converter 110 is functioning as a boost converter for all of the wiring configurations 111. The level of the voltage produced at the output of converter 110 may be responsive to the electrical parameter sensed in step 207 or may be produced independently of the electrical parameters sensed in step 207. As such, responsive to the electrical parameter sensed, for example voltage of terminals Z and/or V− but may include also terminals V+ and $V_{CP}$, the application of the output of converter 110 to terminal Z and/or V− at step 211 may add the boosted output voltage of converter 110 to terminal V− of system power device 107.

By way of non-limiting numerical example, assume that a desirable voltage on terminal V+ is 510 volts (v) and the voltage on terminal V− is substantially above ground potential (zero volts), +10 v for example. A controller of power device 107 and/or power modules 103/103a may be utilized to maintain a string voltage for each wiring configuration 111 of 500 v (510 v-10 v). The string voltage of 500 v may be a floating voltage but any one of power sources PS1-PSn, PSA, PSB or PSC and respective converter 110 may be used (switches S1-Sn, SA, SB, SC used to select which power supply converter 110 for example) to set the voltage on terminal V− to be +10 volts and 510 v on terminal V+. As such sensors sensors/sensor interfaces 125/204/204a may be used to sense the voltage at terminals Y/V+ and ZN− (step 207). Converter 110 may be used to apply a positive voltage (with respect to ground to terminal) to terminal Z/V− (step 211) via conversion of power from power supply PSB (step 209) so that terminals Y/V+ and ZN− are above earth potential. As such, if the voltage sensed on terminal Y/V+ is +250 v and the voltage sensed on terminal ZN− is −250, so that the differential voltage is 500 v, the output of the boost converter may add 260 v to terminal Z/V− so that by Kirchhoff voltage law the voltage on terminal ZN− is 260 v−250 v=10 v and the voltage on terminal YN+ is 510 v=260 v+250 v.

As such, in step 213, the voltage applied to terminal V− is no longer floating but is established above the potential of the ground connection provided by converter 110 for all wiring configurations 111. Included in step 213 by operation of the other steps of method 201 is maintenance of the voltage applied to terminal V− above the potential of the ground connection provided by converter 110. Moreover, if power supply PSB is used at the top of the wiring configurations 111 and converter 110 connects to terminals Y and/or W, if the polarity of power supply PSB is reversed, the output of converter 110 connected to power supply PSB may be applied to terminals W, Y/V+ such that the steps of method 201 may establish and maintain the voltage applied to terminal V+ to be below the potential of the ground connection provided by converter 110.

Further considerations may also be considered in an application to power system 180a by use of power supply PSC instead of or in addition to power supply PSB. The overall application may use power supply PSC in steps similar to those described with respect to use of power supply PSB to again establish and maintain the voltage applied to terminal V+ to be below the potential of the ground connection provided by converter 110 or to establish and maintain the voltage applied to terminal V+ to be above the potential of the ground connection provided by converter 110. In a similar way, use of power supply PSC may establish and maintain the voltage applied to terminal V− to be below the potential of the ground connection provided by converter 110 or to establish and maintain the voltage applied to terminal V− to be above the potential of the ground connection provided by converter 110. The source of DC power converted by converter 110 may be provided from a conversion of AC power provided from the output of system power devices 107, an AC grid supply which may or may not be connected to system power devices 107, and/or from an auxiliary source of AC power which may be separate from the AC power of power system 180a.

Figure 3A:
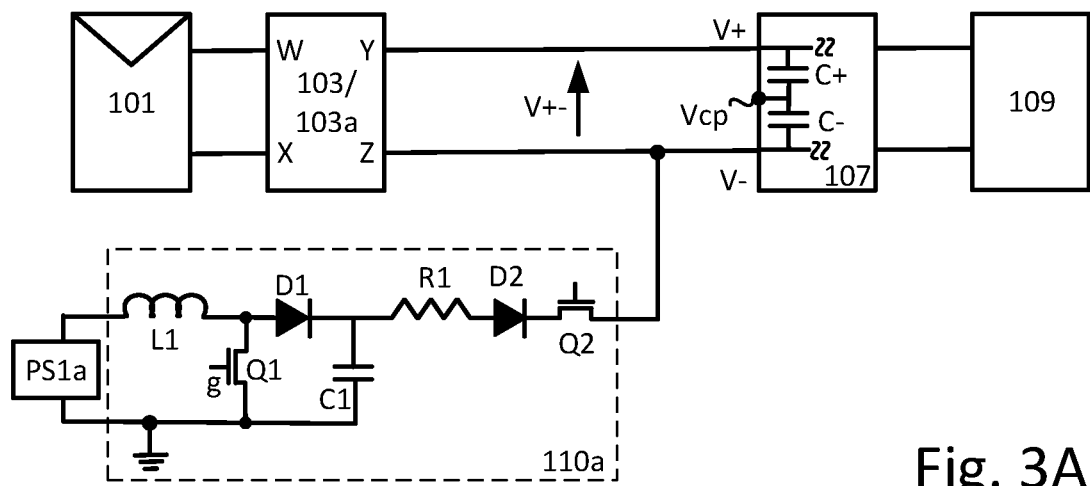
FIG. 3A shows a power system, according to illustrative aspects of the disclosure.

Reference is now made to FIG. 3A which shows a power system 180f, according to illustrative aspects of the disclosure. Power system 180f may be considered to be a simplified version of power system 180a described above and may be referenced as such, for the ease of discussion in the description which follows. A power source 101 may be connected to the input of power device 103/103a at terminals W and X. Power source 101 may be a photovoltaic panel, DC generator and/or battery/storage device. For example, power source 101 may be a string of serially connected PV power sources, or a plurality or parallel-connected strings of PV power sources. As such, since power source 101 is shown as not being grounded, the voltage input to power device 103/103a at terminals Y and Z may be considered a floating voltage. The output voltage (V+−) of power device 103/103a at terminals W and X may also be considered to be a floating output voltage that may be applied to a system power device 107 at terminals V+ and V−.

A partial view of the components of the input of system power device 107 is shown. System power device 107 may provide a further input terminal $V_{CP}$ which may be the midpoint connection in the series connection of two input capacitors C+, C−. The series connection of two input capacitors C+, C− may be, for example, an input of a multi-level inverter topology implementation of system power device 107. However, input terminal $V_{CP}$ might not necessarily be externally provided, since according to some implementations of system power device 107, a single capacitor connected across terminals V+ and V− along with a switched bridge topology (not shown) included, may provide the inverter topology for system power device 107. According to some features, more than two capacitors may be disposed between terminals V+ and V−. For example, 6 capacitors may be disposed between terminals V+ and V−, creating 5 midpoint voltage levels. Load 109 may be connected to the output of system power device 107. Load 109 may be an AC motor, a transformer, a localized grid and/or a utility grid for example.

The output of converter 110a may be connected to terminal V−, the output of converter 110a may be the same as or similar to as discussed previously above with respect to converter 110 and may be similarly connected to terminals $V_{CP}$, V+, W and/or X. Converter 110a is shown in FIG. 3A as a boost converter such that the input DC voltage from power supply PS1a is converted to an increased value of output voltage at the output of converter 110a. Power supply PS1a connects across the input terminals of converter 110a. Power supply PS1a is a source of DC voltage that may be provided from a power source 101 connected to power device 103/103a, from a power device 103/103a, from a string of series connected power devices 103/103a and/or from an auxiliary source of DC power (from auxiliary power circuit 162/262 for example) which may be separate from the DC power of power system 180a. Power supply PS1a may be same as any one of the power supplies PS1 to PSn. The converter 110a may be same as any one of the converters 110 connected to PS1-PSn.

A first input terminal of converter 110a connects to a ground and/or earth. A second input terminal of converter 110a connects to a first end of inductor L1. A second end of inductor L1 connects to the anode of diode D1 and a first end of switch Q1. The cathode of D1 connects to a first end of capacitor C1. A second end of switch Q1 and a second end of capacitor C1 connect to the ground and/or earth. The cathode of D1 also connects to a first end of resistor R1. A second end of resistor R1 connects to the anode of diode D2. The cathode of diode D2 connects to a first end of switch Q2. A second end of switch Q2 connects to terminals Z and V− but may also alternatively be connected to $V_{CP}$, V+, W and/or X. Switch Q2 may be an example of switches S1-Sn, SA, SB and SC described above. An appropriate pulse width modulation signal or other control signal may be applied to the gate (g) of switch Q1 to provide the boost function of converter 110a such that the input DC voltage from power supply PS1a is converted to an increased value of output voltage at the output of converter 110a.

Reference is now made again to method 201 of FIG. 2B as applied to power system 180f of FIG. 3A, according to illustrative aspects of the disclosure. Steps of method 201 may be implemented by one of the controllers of system power device 107, power device 103/103a and/or converter 110a. Power system 180f uses one converter and one power supply, and one converter and one power supply may be used with respect to power systems 180a-180e described above and other powers systems described below. At step 203, DC power from power source 101 may be provided and applied to the input of system power device 107 via power device 103/103a or power source 101 may be provided and applied to the input of system power device 107 directly (e.g., where power device 103/103a is not featured). At step 205, DC power (power=voltage x current) from power source 101 directly and/or from power device 103/103a connected to power source 101 may be inverted by system power device 107 to an AC power (power=voltage x current) output that may be applied to load 109. At step 207, an electrical parameter (e.g., voltage, current, power, resistance) may be sensed on terminal V− by a sensor of system device 107, sensors/sensor interfaces 125 of power device 103/103a on terminal Z and/or sensor interface 204/sensors 204a.

At about the same time of step 207, in step 209, the source of DC voltage from power supply PS1a may be converted by converter 110a to provide a greater voltage at the output of converter 110a which is responsive to the electrical parameter sensed in step 207. As such, responsive to the electrical parameter sensed, control of the switching of switch Q1 may be application of an appropriate pulse width modulation signal to the gate (g) of switch Q1. At step 211, the operation of switch Q2 to be 'ON' may add the boosted output voltage of converter 110a to terminal V− of system power device 107. As such, in step 213, the voltage applied to terminal V− is no longer floating but is established above the potential of the ground connection provided by converter 110a. Included in step 213 by operation of the other steps of method 201 is continuous maintenance of the voltage applied to terminal V− above the potential of the ground connection provided by converter 110a.

Where multiple system power devices are connected in parallel as shown with respect to power system 180a, diode D2 and resistor R1 may be utilized as a current limiting device and/or other current limiting circuit to limit circulating currents between converters 110a. Moreover, if the polarity of power supply PS1a is reversed, the output of converter 110a may be applied to terminal V+ such that the steps of method 201 may establish and maintain the voltage applied to terminal V+ to be below the potential of the ground connection provided by converter 110a. Where multiple system power devices are connected in parallel as shown with respect to power system 180a, a single converter 110a may provide the reference voltage to a single system power device, and by virtue of the parallel connection of system power devices 107, each of the parallel-connected power devices 107 may be referenced to the voltage output by converter 110a.

According to features of the disclosure, a power converter 110a may be integrated into a system power device 107. Where a power converter 110a is integrated into each of multiple parallel-connected system power devices 107, each power converter 110a may be synchronized to output a common reference voltage (e.g., by a single system power device being designated as a primary system device and the primary system power device outputting a reference voltage to be used by the other system power devices), or only a single integrated power converter 110a may be configured to output a reference voltage, and the other integrated power converters 110a may be disabled and/or might not output a reference voltage.

Figure 3B:
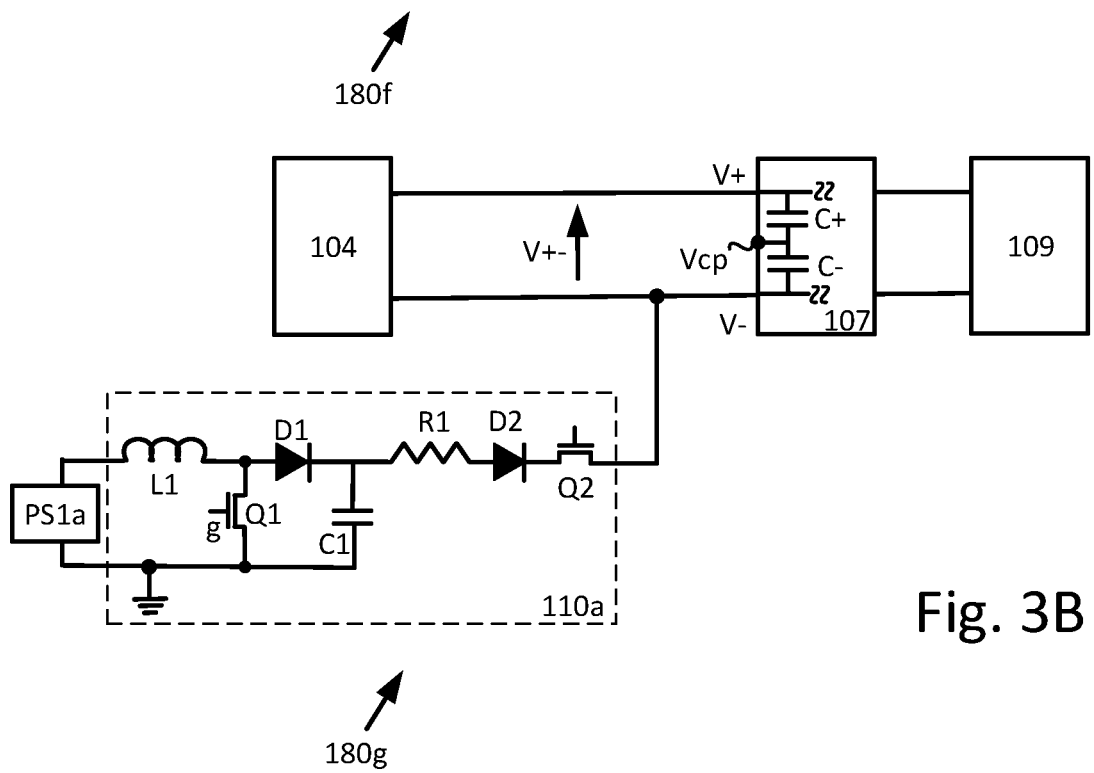
FIG. 3B shows a power system, according to illustrative aspects of the disclosure.

Reference is now made to FIG. 3B which shows a power system 180g, according to illustrative aspects of the disclosure. Power system 180g is similar to power system 180f except that power source 101 and power device 103/103a in power system 180f may be included in power source 104 of power system 180g. Power source 104 may be as described previously with respect to FIG. 1F so that power source 104 may be a variety of power sources such as a battery or batteries, photovoltaic panel(s), DC generator(s) and/or a combination of power source 101 and respective power device 103/103a as shown with respect to power system 180a.

In the description above with respect to step 207 electrical parameters (e.g. voltage, current, power, resistance) may be sensed on terminals V−, $V_{CP}$ and/or V+ by a sensor of system power device 107, by sensors/sensor interfaces 125 of power device 103/103*a* and/or the sensor interface 204/ sensors 204*a* of converters 110 on terminals W, X, Y, Z, V− and V+. Alternatively, or in addition, electrical parameters (e.g. voltage, current, power, resistance) may be sensed on the AC side of system power device(s) 107 on at least one of the phases of the output of system power device(s) 107 and/or the neutral of system power device(s) 107. As such, where the output of system power device(s) 107 is 3 phase, the average voltage of the three phases may be measured (e.g. by direct measurement, or by calculation) and used in step 213, to ensure that the voltage applied to terminal V− is no longer floating but is established above the potential of the ground connection provided by converters 110/110*a*. Included in step 213 by operation of the other steps of method 201 may be continuous maintenance of the voltage applied to terminal V− referenced to a desirable voltage point with respect to ground and/or above the potential of the ground connection provided by converters 111/110*a*.

Figure 4A:
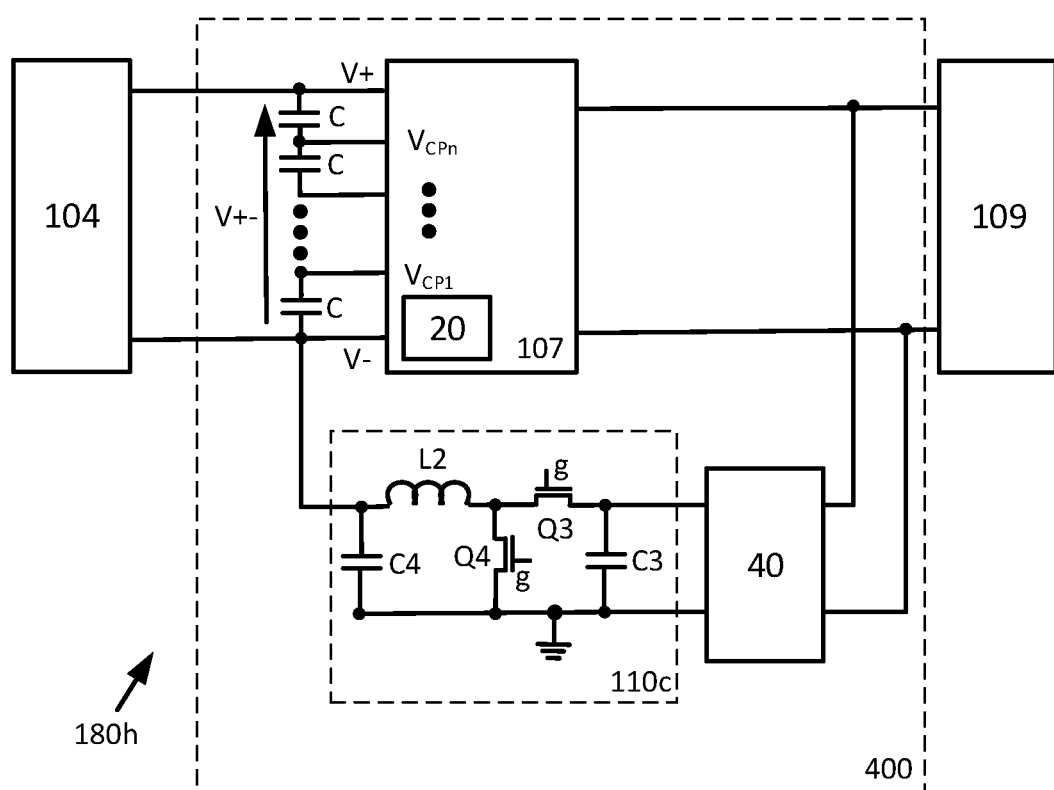
FIG. 4A shows a power system, according to illustrative aspects of the disclosure.

Reference is now made to FIG. 4A which shows a power system 180*h*, according to illustrative aspects of the disclosure. Power source 104 connects to the input of inverter 400. As discussed previously above, power source 104 may be one or more of a variety of power sources such as batteries, photovoltaic panels, DC generators and/or a combination of power source 101 and respective power device 103/103*a* as shown with respect to power system 180*a*. The DC voltage of power source 104 connects to terminals V+ and V− of system power device 107 which may include control unit 20, described above where sensors 204*a*/sensor interface 204 may be utilized to sense the electrical parameter on terminals V+, V− and on 'n' connection terminals $V_{CP1}$-$V_{CPn}$. The electrical parameter may include voltage (V), current (I) and power (V×I). The 'n' connection terminals may be the midpoint connection in the series connection of input capacitors C. The series connection of multiple input capacitors C may be an input of a multi-level inverter topology implementation of inverter 400 for example. However, input terminals to inverter 400 on system power device 107 may provide a single capacitor C connected across terminals V+ and V− along with a switched bridge topology (not shown) included, which may also provide the inverter topology for inverter 400. According to some features, more than two capacitors C may be disposed between terminals V+ and V−. For example, six capacitors may be disposed between terminals V+ and V−, creating five midpoint voltage levels in addition to the end voltage levels of V+ and V−. One or more of the five midpoint voltage levels and the two-end voltage levels may be measured to provide a reference measurement for regulation and control of a voltage level at one of the midpoint voltage and/or one of the end voltage levels.

Load 109 may be connected to the output of system power device 107. Load 109 may be an AC motor, a transformer, a localized grid and/or a utility grid for example. The output of inverter 400 is shown as a single-phase output but may also be a multiple phase output such as a three-phase output for example. The output of inverter 400 is connected to the input of rectifier unit 40. Rectifier unit 40 may be AC to DC converters such as uncontrolled diode rectifier circuits, phase-controlled rectifiers and/or switched mode power supplies (SMPS). Rectifier 40 may also include a transformer which may be used to galvanically isolate between the AC output of inverter 400/load 109 and the DC input of converter 110*b*. The transformer may also either increase and/or decrease the AC input to rectifier unit 40.

The DC output of rectifier unit 40 connects across the input of converter 110*b*. Converter 110*b* is shown as a buck converter circuit topology. As such since one function of a buck converter may be to reduce the voltage at its input to a lower voltage at its output, a transformer may not be required in rectifier unit 40. Capacitor C3 connects across the input of converter 110*b*. One input terminals of converter 110*b* connects to ground and/earth. The other input terminal of converter 110*b* connects to one end of switch Q3, the other end of switch Q3 connects to inductor L2 and one end of switch Q4. The other end of inductor L2 provides the output of converter 110*b* and also connects to one end of capacitor C4. The remaining ends of capacitor C4 and switch Q4 connect to ground and/earth. The output of converter 110*b* is shown connected to terminal V− but may also connect to terminal V+ and/or connection terminals $V_{CP1}$-$V_{CPn}$. The utilization of method 201 for inverter 400 may be to establish and maintain the voltage applied to terminal V− to be above the potential of the ground connection provided by converter 110*b* or establish and maintain the voltage applied to terminal V− to be below the potential of the ground connection provided by converter 110*b* if the polarity of the input to converter 110*b* is reversed for example. In a similar way, inverter 400 may be configured and controlled to establish and maintain the voltage applied to terminal V+ to be above the potential of the ground connection provided by converter 110*b* or to establish and maintain the voltage applied to terminal V+ to be below the potential of the ground connection provided by converter 110*b*, if the polarity of the input to converter 110*b* is reversed for example.

Figure 4B:
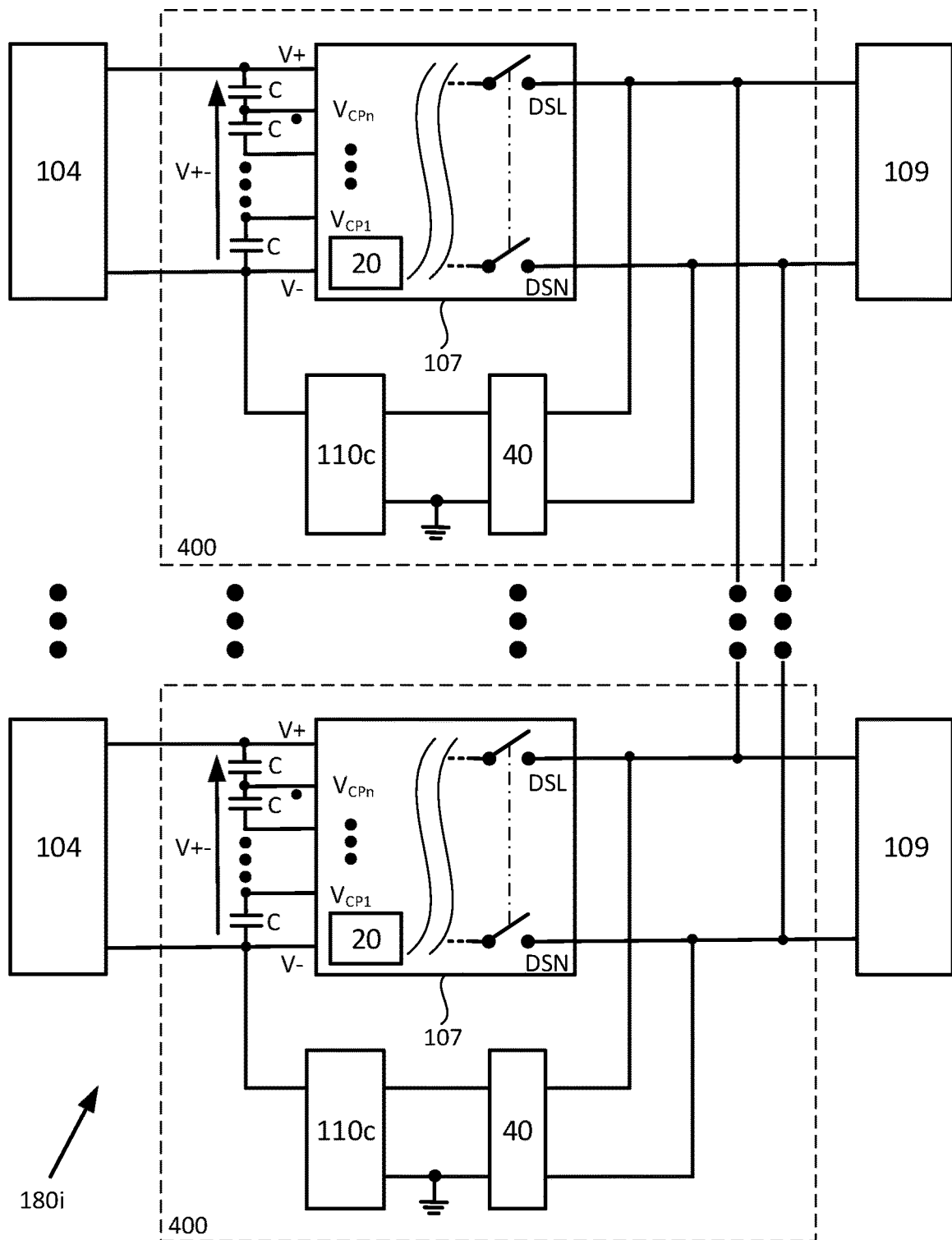
FIG. 4B shows a power system, according to illustrative aspects of the disclosure.

Reference is now made to FIG. 4B, which shows a power system 180*i*, according to illustrative aspects of the disclosure. Power system 180*i* is similar to power system 180*h* but may include multiple inverters 400, each having one or more with multiple inputs from one or more power sources 104 and the output of each inverter 400 connected across a load 109. Further detail of system power device 107 may include control unit 20 and may also include switches DSL and DSN that may disconnect or reconnect respectively the live and neutral outputs of system power device 107 from a load 109. The output of system power device 107 is shown as a single-phase output but may also be a three-phase output. The three-phase output may include at least three switches that may disconnect or reconnect respectively the three live and/or neutral outputs of system power device 107 from load 109. If power sources 104 are photovoltaic generators, switches DSL and DSN may disconnect the live and neutral outputs of system power device 107 from load 109 during nighttime operation of power system 180*i*. Switches DSL and DSN may reconnect the live and neutral outputs of system power device 107 to load 109 during daytime operation of power system 180*i*.

Reference is now made again method 201 and to power system 180*i* when power sources 104 are photovoltaic generators and load 109 is a utility grid. Control units 20 of each inverter 400 may communicate with each other where one control unit 20 may be a primary control unit and other control units 20 are secondary control units. Sensors 204*a*/sensor interface 204 may be utilized to sense electrical parameters on the live and neutral outputs of system power device 107, terminals V−, $V_{CP1}$-$V_{CPn}$ and V+.

During daytime operation switches DSL and DSN may connect the live and neutral outputs of system power device 107 to load 109. At step 203, DC powers from power sources 104 may be provided and applied to the inputs of system power devices 107.

At step 205, DC power (power=voltage x current) from power sources 104 may be inverted by respective system power devices 107 to an AC power (power=voltage x current) output that may be applied to load 109.

At step 207, electrical parameters (e.g., voltage, current, power, resistance) may be sensed for each inverter 400 on the respective terminals of each system device 107 by each of the sensor interfaces 204/sensors 204a provided by each control unit 20.

At about the same time of step 207, in step 209, during daytime operation, the source of DC voltage from each rectifier unit 40 may be converted by converter 110b to provide voltages at the outputs of each converter 110b that is responsive to the electrical parameters sensed in step 207 for each inverter 400. By way of non-limiting example, one of terminals $V_{CP1}$-$V_{CPn}$ may be chosen as the terminal at which the voltage may be sensed for each inverter. As such, if the input to each system power device 107 has a six-capacitor input, terminal $V_{CP3}$ (the midpoint of the input to each system power device 107) of each inverter 400 may be sensed at step 207 and an appropriate control signal sent to each converter 110b and/or also to power device 103/103a that may be included in power source 104 from the primary control unit 20 so that each terminal $V_{CP3}$ is controlled and maintained (step 213) to have the same desired voltage and terminal V− is no longer floating but is established above the potential of the ground connection provided by each converter 110b.

Included in step 213 by operation of the other steps of method 201 may be continuous maintenance of the voltage applied to terminal V− above the potential of the ground connection provided by converter 110b.

By way of non-limiting numerical example, assume that a desirable voltage on terminals V+ is 510 volts (v) and the voltage on terminal V− is substantially above ground (or a "virtual ground") potential (zero volts), +10 v for example. Control unit 20 may be utilized to maintain voltage V+− for each power source 104 of 500 v (510 v−10 v) at step 205 for each inverter 400. Voltage V+− of 500 v is a floating voltage (e.g., voltage V+ might not be directly referenced to ground, rather voltage V+ may be referenced to a "virtual ground", with the "virtual ground" controlled to be at the same voltage as earth but galvanically isolated from earth) but any one of rectifier units 40 and respective converter 110b may be used to set the voltage on terminal V− to be +10 volts and 510 v on terminal V+ by sensing the inverting of each system power device 107 (step 207). Converter 110b for each inverter 400 may be used (step 209) to apply a respective positive voltage (with respect to ground to terminal) to each terminal V− (step 211) via conversion of power from each rectifier unit 40 (step 209) so that each of terminals $V_{CP3}$ may be established and maintained (step 213) at 260 volts. As such, during operation each of the inverters 400, each inverter 400 may have different sensed parameter values needing adjustment from a respective converter 110b to establish and maintain that terminal $V_{CP3}$ of each inverter 400 may be established and maintained (step 213) at the same value (260 volts). For example, for one converter 400, if the voltage on terminal V+ is +250 v and the voltage on terminal V− is −250 v, so that the differential voltage between terminals V− and V+ is 500 v, the output of converter 110b may add 260 v to terminal V− so that by Kirchhoff voltage law the voltage on terminal V− is 260 v−250 v=10 v and the voltage on terminal V+ is 510 v=250 v+260 v.

According to features of the disclosure, each system power device 107 may be controlled to maintain an internal voltage level at a substantially common level. For example, system power devices 107 as shown in FIG. 4B may feature a plurality of input capacitors C, creating a plurality of intermediate voltage levels. One of the intermediate voltage levels may be regulated (e.g. measured at step 207 of method 201 when applied to system power devices 107) to be at a certain voltage level, with the certain voltage level regulated at each system power device 107 substantially the same for all system-connected power devices. This regulation may be useful, for example, to prevent circular current flows between system power devices 107 connected in parallel at input terminal and/or at output terminals. The intermediate voltage point regulated may be an intermediate input voltage (e.g., the voltage Vcp of FIG. 3A) or an intermediate output voltage (e.g., a "virtual neutral" voltage internally created but not output by system power device 107 of FIG. 4B, or, where system power device 107 is designed to output a neutral voltage line, the neutral voltage line may be regulated for each system power device 107 to be at a substantially common voltage level).

Figure 5:
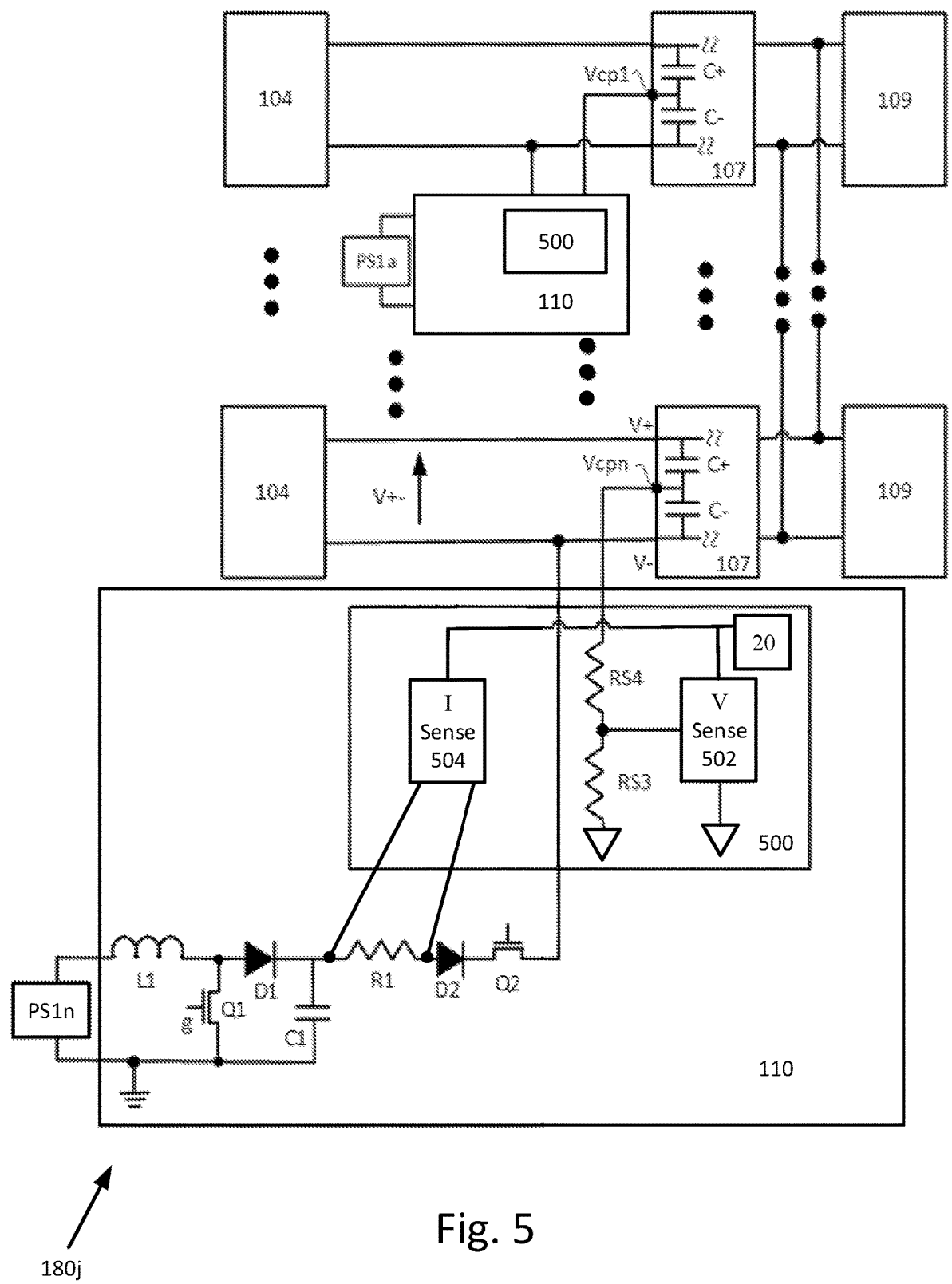
FIG. 5 shows a power system, according to illustrative aspects of the disclosure.

Reference is now made to FIG. 5, which shows a power system 180j, according to illustrative aspects of the disclosure. Converter 110 includes circuitry 500 configured to regulate the output of converter 110. Circuitry 500 may include one or more sensors, for example, current and/or voltage sensors. According to the illustrative circuitry shown in FIG. 5, circuitry 500 includes two resistors RS3, RS4 connected in series between terminal Vcpn and ground and/or earth. A first end of resistor RS4 is connected to terminal Vcpn and a second end of resistor RS4 is connected to a first end of resistor RS3. The second end of resistor RS3 is connected to the ground and/or earth potential. Circuitry 500 also includes a voltage sensor 502. A first end of voltage sensor 502 is connected to the first end of resistor RS3 and a second end of voltage sensor 502 is connected to the ground and/or earth potential. Voltage sensor 502 may also be operatively connected to control unit 20 and/or controller 200. In some examples, voltage sensor 502 may be part of control unit 20. In some examples, control unit 20 may be located in system power device 107 and/or converter 110. As another example, control unit 20 may be a separate unit. Circuitry 500 also includes a current sensor 504 connected in parallel to resistor R1 of converter 101. Current sensor 504 is also operatively connected to control unit 20 and/or controller 200. In some examples, current sensor 504 may derive the current flowing through resistor R1 based on the voltage across resistor R1 and the resistance of resistor R1 (current=voltage÷resistance). In some examples, current sensor 504 may be connected in series with resistor R1 and measure the current flowing through resistor R1 directly.

Circuitry 500 is configured to control the output of converter 110. As mentioned above, in some examples, switch Q1 and/or switch Q2 may be controlled by control unit 20. The control of these switches Q1, Q2 may be based on one or more parameter sensed by the circuitry 500. As an example, the one or more parameter may include: voltage, current, etc. By adjusting control of switches Q1 and/or Q2, control unit 20 may adjust the output of converter 110. For example, increasing a duty cycle of switch Q1 may increase the voltage output by converter 110.

In cases where power system 180j includes a plurality of system power devices 107, it may occur that a voltage at terminal Vcpn for one or more of the system power devices 107 may be greater (e.g., substantially greater) than a target voltage that corresponds to a voltage or a target voltage at terminal Vcpn at one or more other system power devices 107. For example, substantially greater in this context may be within a certain range, e.g., +/−five volts, +/−tens of millivolts, +/−hundreds of millivolts, etc. If the voltage Vcpn is higher at a first system power device than at a second system power device, then the second system power device may be adversely affected, for example, shut down. In such cases, in the absence of circuitry that senses current and regulates the voltage accordingly, then other power devices 107 (e.g., the second system power device which may be operating at or below the desired voltage) may be inadvertently bypassed or deactivated, and only the one or more system power device 107 operating at a voltage greater than the desired voltage may continue to supply power to the load 109. In order to help allay such a scenario, the circuitry 500, in addition to sensing voltage, may also sense current, e.g., the current flowing through the converter 110 at resistor R1. If one or more sensed parameter is indicative of a voltage that is higher than a desired voltage or higher than a voltage operating point of other system power devices 107, then controller 200 may operate in order to decrease the voltage output by the converter 110, which decreases the voltage at terminal Vcpn for that system power device 107.

It will be appreciated that in some examples, a converter 110, which is connected to ground potential, and circuitry 500 may be used to regulate a similar voltage value at a plurality of terminals Vcpn for a plurality of system power devices 107 by regulating and/or directly controlling the voltage at terminal V−, V+, etc. In some cases, for example where terminal Vcpn is a common neutral (or "virtual neutral", i.e., a terminal corresponding to terminals at other system power devices 107 having a similar or identical voltage without directly connecting the Vcpn terminals of the various system power devices 107) for the plurality of system power devices 107, then a single circuit (e.g. circuitry 500) may be used to control the voltage at terminal Vcpn for the plurality of system power devices 107. In some examples, for example, where the power system has a plurality of power supplies PSn and a plurality of system power devices 107 share a common neutral or a common "virtual neutral", in some cases where one or more of the power supplies PSn cease to operate, then the power system may continue to function with one or more of the remaining power supplies PSn providing the required voltage to terminal V−, V+, etc.

Figure 6A:
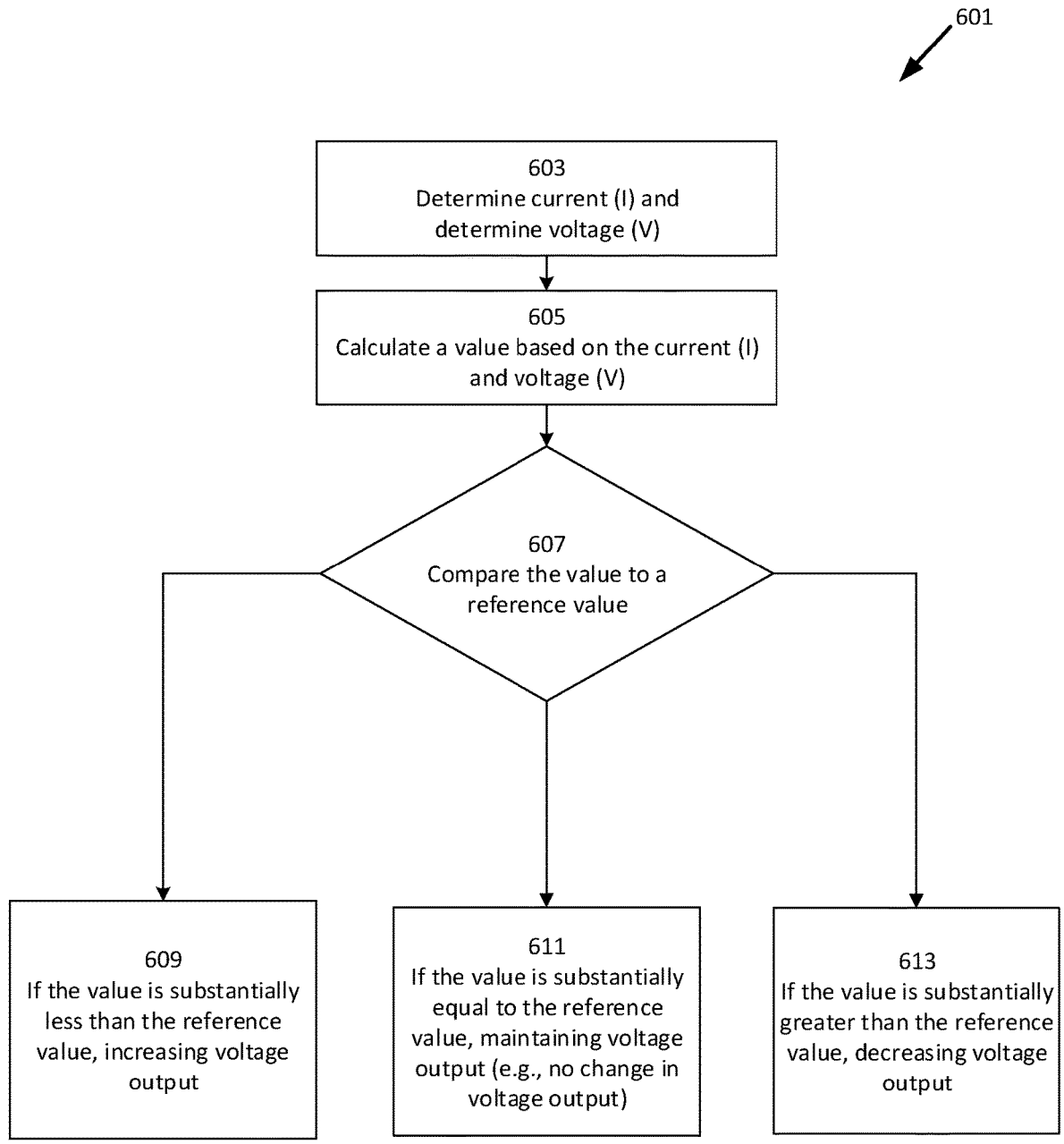
FIG. 6A shows a flowchart of a method, according to illustrative aspects of the disclosure.

Reference is now made to FIG. 6A which shows a flowchart of a method 601 according to illustrative aspects of the disclosure. For example, method 601 may be applied to power system 180*j* of FIG. 5 in the description that follows. As an example, steps of method 601 may be implemented by controllers of system power devices 107, controllers of power devices 103/103*a*, and/or converters 110 acting as a primary controller.

At step 603, a current is determined and a voltage is determined.

For example, at step 603, a current related to the voltage at terminal Vcpn of system power device 107 may be determined, e.g., measured by current sensor 504. As an example, the current flowing through resistor R1 may be measured. In other examples, a different current may be measured or determined, for example, the current through diode D1, the current through diode D2, the current through switch Q2, etc. In some examples, the current may be estimated (e.g., by measuring current through inductor L1 and estimating the current through resistor R1 based on the measured current through inductor L1 and the duty cycle of switch Q1).

For example, at step 603, a voltage related to the voltage at terminal Vcpn of system power device 107 may be determined, e.g., measured by voltage sensor 502. As an example, the voltage of resistor RS3 may be measured. The voltage of resistor RS3 is related to the voltage at terminal Vcpn. In some cases the voltage of resistor RS3 that is measured may be used to derive the voltage at terminal Vcpn. In other examples, a different voltage may be sensed, for example, the voltage at terminal V+, the voltage at terminal V−, etc.

At step 605, a value is calculated based on the determined current and the determined voltage. For example the value may be calculated using a function that depends both on the current and the voltage, e.g., a linear function, a polynomial function, etc.

At step 607 the calculated value is compared to a reference value. For example, if the value calculated at step 605 is a voltage value then the reference value may be a reference voltage value. As an example, the reference value may be a desired voltage value, desired current value, etc.

If at step 607 it is determined that the calculated value is substantially less than the reference value, then at step 609 the voltage output may be increased. For example, the control unit 20, e.g., controller 200, may control the converter 110, e.g., switch Q1 and/or switch Q2, to increase the output voltage of the converter 110 that is output to terminal V−. This may control an increase in voltage at terminal Vcpn.

If at step 607 it is determined that the calculated value is substantially equal to the reference value, or within a permissible range of variation from the reference value, then at step 611 the voltage output may be substantially maintained. For example, the control unit 20, e.g., controller 200, may control the converter 110, e.g., switch Q1 and/or switch Q2, to substantially maintain (e.g., allowing a permissible variation, but without a substantial change in average voltage) the output voltage of the converter 110 that is output to terminal V−. This may maintain the voltage at terminal Vcpn.

If at step 607 it is determined that the calculated value is substantially greater than the reference value, then at step 613 the voltage output may be decreased. For example, the control unit 20, e.g., controller 200, may control the converter 110, e.g., switch Q1 and/or switch Q2, to decrease the voltage of the converter 110 that is output to terminal V−. This may control a decrease in voltage at terminal Vcpn.

According to features of the disclosure herein, the value calculated at step 605 may be inversely proportional or directly proportional to the desirable change in output voltage. In the example shown in FIG. 6A, the value being substantially less than the reference value causes an adjustment to increase voltage output. In another example, the value may be calculated such that the value being substantially less than a reference value causes an adjustment to decrease voltage output.

By way of non-limiting example, assuming that the value calculated at step 605 may be calculated using a linear function that depends both on the current and the voltage, e.g., using the equation: $\alpha=\beta*I+\gamma*V$; where a is the calculated value, $\beta$ and $\gamma$ are coefficients (e.g., coefficients that are related to one or more parameter corresponding to elements of the power system, such as, resistance of one or more of the resistors in the power system), I is the determined current, and V is the determined voltage. In cases where the determined current I is relatively high and/or the determined voltage V is relatively high, then as a result the value of α may be relatively high. If α is relatively high then the calculated value α may be considered substantially greater than the reference value, and there may be a decrease in the voltage output. In cases where the determined current I is relatively low and/or the determined voltage V is relatively low, then as a result the value of α may be relatively low. If α is relatively low then the calculated value α may be considered substantially less than the reference value, and there may be an increase in the voltage output.

By way of non-limiting numerical example, if the reference value is, for example, about 1 v, and the determined current I is relatively high, e.g., about 10 mA, then the calculated value α may be about 1.5 v, which is substantially greater than the reference value. As a result, there may be a decrease in the voltage output, and as a result a decrease in the determined current in the power system. If the determined current I is relatively low, e.g., about 5 mA, then the calculated value α may be about 0.5 v, which is substantially less than the reference value. As a result, there may be an increase in the voltage output, and as a result an increase in the determined current in the power system. In this example, if the determined current I is about 7.5 mA, then the calculated value α may be about 1 v, which is substantially equal (e.g., within a predetermined amount, within a measurable tolerance, etc.) to the reference value. As a result, the voltage output may be substantially maintained.

By way of another non-limiting numerical example, if the reference value is, for example, about 0.75 v, and the determined current V is relatively high, e.g., about 1 v, then the calculated value α may be about 1.25 v, which is substantially greater (e.g., more than a predetermined amount, more than a measurable tolerance, etc.) than the reference value. As a result, there may be a decrease in the voltage output, and as a result a decrease in the determined voltage in the power system. If the determined voltage V is relatively low, e.g., about 0.25 mA, then the calculated value α may be about 0.5 v, which is substantially less (e.g., less than by a predetermined amount, less than by a measurable tolerance, etc.) than the reference value. As a result, there may be an increase in the voltage output, and as a result an increase in the determined voltage in the power system. In this example, if the determined voltage V is about 0.5 v, then the calculated value α may be about 0.75 v, which is substantially equal to the reference value. As a result, the voltage output may be substantially maintained.

Figure 6B:
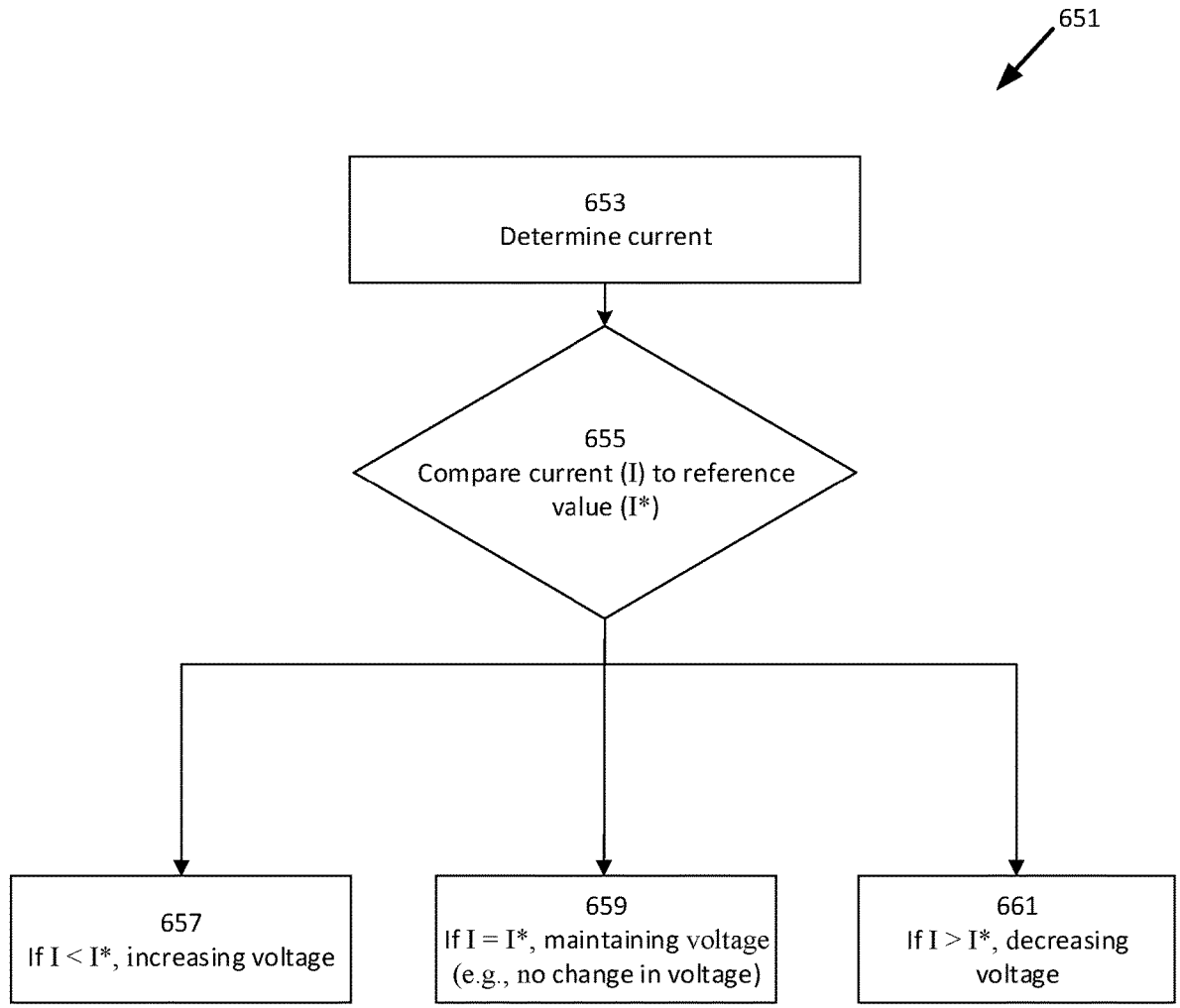
FIG. 6B shows a flowchart of a method, according to illustrative aspects of the disclosure.

Reference is now made to FIG. 6B which shows a flowchart of a method 651 according to illustrative aspects of the disclosure. For example, method 651 may be applied to power system 180*j* of FIG. 5 in the description that follows. As an example, steps of method 651 may be implemented by controllers of system power devices 107, controllers of power devices 103/103*a*, and/or converters 110 acting as a primary controller.

At step 653, a current is determined (e.g., sensed).

For example, a current related to the voltage at terminal Vcpn of system power device 107 may be measured, e.g., by current sensor 504. As an example, the current flowing through resistor R1 may be measured. In other examples, a different current may be measured or determined, for example, the current through diode D1, the current through diode D2, the current through switch Q2, etc. In some examples, the current may be estimated (e.g., by measuring current through inductor L1 and estimating the current through resistor R1 based on the measured current through inductor L1 and the duty cycle of switch Q1).

At step 655, the current is compared to a reference current value.

If at step 655 it is determined that the current is substantially less than the reference current, then at step 657 the voltage output may be increased. For example, the control unit 20, e.g., controller 200, may control the converter 110, e.g., switch Q1 and/or switch Q2, to increase the output voltage of the converter 110 that is output to terminal V−. This may control an increase in voltage at terminal Vcpn.

If at step 655 it is determined that the current is substantially equal to the reference current, then at step 659 the voltage output may be maintained. For example, the control unit 20, e.g., controller 200, may control the converter 110, e.g., switch Q1 and/or switch Q2, to substantially maintain the output voltage of the converter 110 that is output to terminal V−. This may maintain the voltage at terminal Vcpn.

If at step 655 it is determined that the calculated value is substantially greater than the reference current, then at step 661 the voltage output may be decreased. For example, the control unit 20, e.g., controller 200, may control the converter 110, e.g., switch Q1 and/or switch Q2, to decrease the voltage of the converter 110 that is output to terminal V−. This may control a decrease in voltage at terminal Vcpn.

According to the present disclosure, a comparison of a calculated and/or sensed value to a desired and/or reference value may be done in order to determine how to regulate a voltage in the power system, e.g., whether or not the output voltage of a converter should be increased, maintained, or decreased.

As another example, it may be determined whether one or more sensed and/or calculated parameter is in a range of desired values in order to determine how the output voltage should be regulated. For example, this range of desired values may be related to a range of voltage values and/or current values that are desired for operation of one or more system power devices 107.

As an example, this range of values may be represented as a look-up table, e.g., stored in control unit 20, that may be used to help determine a target output voltage for the converter, for example, based on a determined current.

As another example, two separate control methods may be used. A first control method may adjust output voltage based on a determined voltage (e.g., measured at terminal Vcp), and a second control method may adjust output voltage based on a determined current (e.g., measured on resistor R1). A controller may alternate between the two control methods, or may run both methods concurrently, for example, the first method may be run at a first frequency, and the second method may be run at a different (higher or lower) frequency, for example, as to not interfere with the first method.

Figure 7:
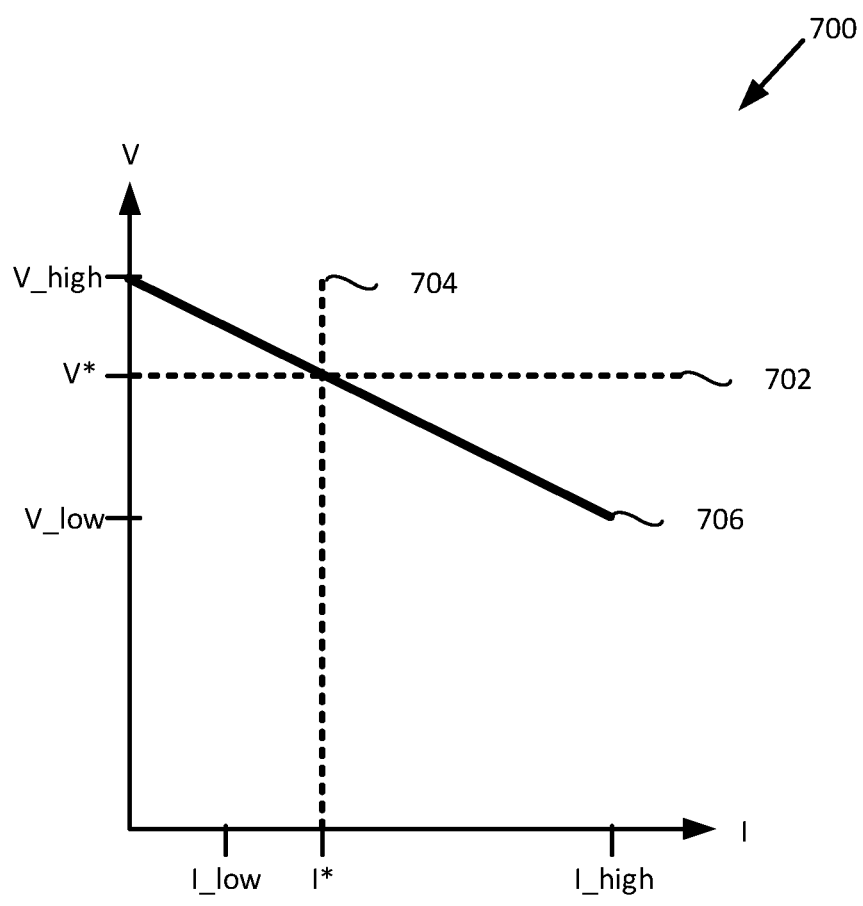
FIG. 7 shows a voltage-current graph, according to illustrative aspects of the disclosure.

Reference is now made to FIG. 7, which shows a voltage-current graph according to illustrative aspects of the disclosure. Graph 700 illustrates a desired voltage value 702 and a desired current value 704. For example, desired voltage value 702 may be a desired voltage at terminal Vcpn, V+, V−, etc. For example, desired current value 704 may be a desired current through resistor R1, or a different current. Graph 700 also illustrates a voltage-current curve 706 indicative of a relationship between current values and voltage values. Voltage-current curve 706, or a section of voltage-current curve 706 may be representative of a range of desired values. As an example, the range of desired values may be determined by a range of desired voltage values, e.g., between a first low voltage, V_low, and a second high voltage, V_high, and/or a range of desired current values, e.g., between a first low current, I_low, and a second high current, I_high. As mentioned above, relationships between current values and voltage values may be included in a look-up table, for example, stored in the control unit 20, e.g., memory 210, and used by the control unit 20, e.g., controller 200, to control the output of the converter 110. For example, the voltage-current curve 706 may be used to help maintain a voltage substantially equal to, or within a certain range of, the desired voltage value 702 at similar terminals, e.g., terminals Vcpn, of a plurality of system power devices 107. For example, based on a current sensed in the converter 110, e.g., a current flowing through resistor R1, the look-up table may be referenced, e.g., by control unit 20 and/or controller 200, and a target output voltage may be determined for regulating the voltage at terminal Vcpn based on the sensed current. This may help ensure that the voltage at one or more of the system power devices 107 does not increase to a point where it would cause one or more other system power devices 107 to be bypassed or deactivated.

By way of non-limiting numerical example, assuming that a desired voltage on terminal Vcpn is 495 volts (v). Circuitry 500 may be utilized to maintain voltage on terminal Vcpn for each system power device 107 of substantially 495 v. If the voltage representative of voltage on terminal Vcpn indicates that the voltage on terminal Vcpn is greater than a desired voltage value and/or range of voltage values, then the voltage that is output by controller 110 may be decreased to a reduced voltage which will decrease the voltage on terminal Vcpn.

Figure 8:
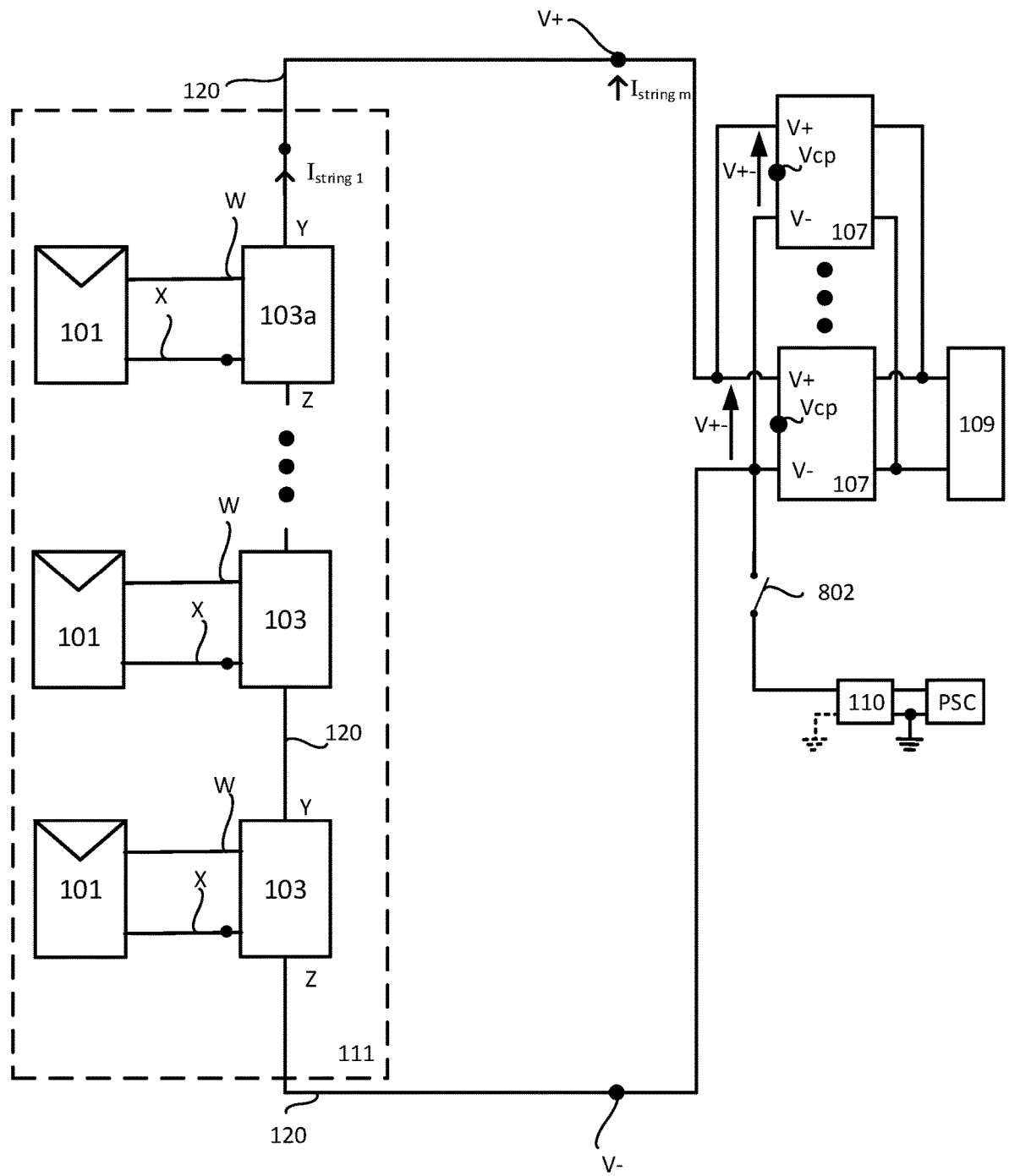
FIG. 8 shows a power system, according to illustrative aspects of the disclosure.

Reference is now made to FIG. 8, which shows a power system 180k, according to illustrative aspects of the disclosure. Power system 180k includes switch 802 which is operable to switch the power system 180k between a daytime mode of operation and a nighttime mode of operation. Switch 802 is connected between converter 110 and terminal V−, with one end of switch 802 connected to an output of converter 110 and a second end of switch 802 connected to terminal V−. In some examples, switch 802 may be switch SC and/or switch Q2 described above. Although illustrated separately, it will be appreciated that switch 802 may be included as part of converter 110 and/or system power device 107. In daytime mode, switch 802 is switched to the OFF position and converter 110 does not provide any output voltage to terminal V−. In nighttime mode, switch 802 is switched to the ON position and a voltage is applied to terminal V− above the potential of the ground connection provided by converter 110. One or more sensors may be used to help determine one or more parameter indicative of whether the switch should be switched to daytime mode or nighttime mode. The one or more sensors may include, for example: a clock, an irradiance sensor, a temperature sensor, a current sensor, a voltage sensor, a power sensor, etc. When one or more parameters from the one or more sensors indicate that the nighttime mode is appropriate, then switch 802 may be activated, e.g., by control unit 20 and/or controller 200. When one or more parameters from the one or more sensors indicate that the daytime mode is appropriate, then switch 802 may be de-activated, e.g., by control unit 20 and/or controller 200. As an example, the one or more parameters can be at least one of: a time value, an irradiance value, a temperature value, a current value, a voltage value, and a power value. Converter 110 may be configured to output a higher voltage when in nighttime mode as compared to daytime mode. For example, converter 110 may be configured to connect to terminal V− of a system power device 107 and to output about 5 v-10 v if operating in daytime operation mode, and to output tens or hundreds of volts if operating in nighttime operation mode, to increase expedite PID reversion (e.g., to expedite discharge of charge stored on solar panels during the daytime).

According to some features, a topology of converter 110 may be selected according to preferred time of operation. For example, a converter 110 designed to operate primarily in daytime mode may be optimized to output a low voltage (e.g., up to tens of volts), and a converter 110 designed to operate primarily in nighttime mode may be optimized to output a higher voltage (e.g., hundreds of volts). Optimization to output a higher voltage may include use of components rated for higher voltages, and/or use of magnetic elements (e.g. a transformer, for example, where converter 110 is a flyback, dual-active bridge, or different type of isolating converter) to increase output voltage. As an example, the voltage applied in a nighttime mode of operation can be in a range of about 100 volts to about 1000 volts, and the voltage applied in a daytime mode of operation can be in a range of about 10 volts to about 150 volts.

In some cases, it might not be possible for power systems to have voltage applied to terminals, e.g., V+, V−, etc., by converter 110 during the day. For example, in some power systems, terminal $V_{cp}$ might be grounded during the daytime, e.g. while system power device 107 is connected to load 109. In such cases, after the load 109 is disconnected from the system power device 107 at nighttime, then the switch 802 may be activated in order to apply a voltage at terminal V− above the potential of the ground connection provided by converter 110. In such cases, the effects of PID might not be prevented during the daytime, but the effects of PID on the system may be alleviated during the nighttime.

It will be appreciated that, in some cases, a relatively low output voltage may be applied at terminal V− in order to raise the potential at V− to above ground potential, e.g. an output voltage of about 5 v-10 v. In comparison, in some cases, a relatively high output voltage may be applied at terminal V+ in order to raise the potential at V− to above ground potential, e.g. an output voltage of hundreds of volts. Accordingly, an advantage of applying the output voltage at terminal V−, as opposed to terminal V+, may be that a substantially lower, relatively low voltage may be applied by converter 110.

Figure 9A:
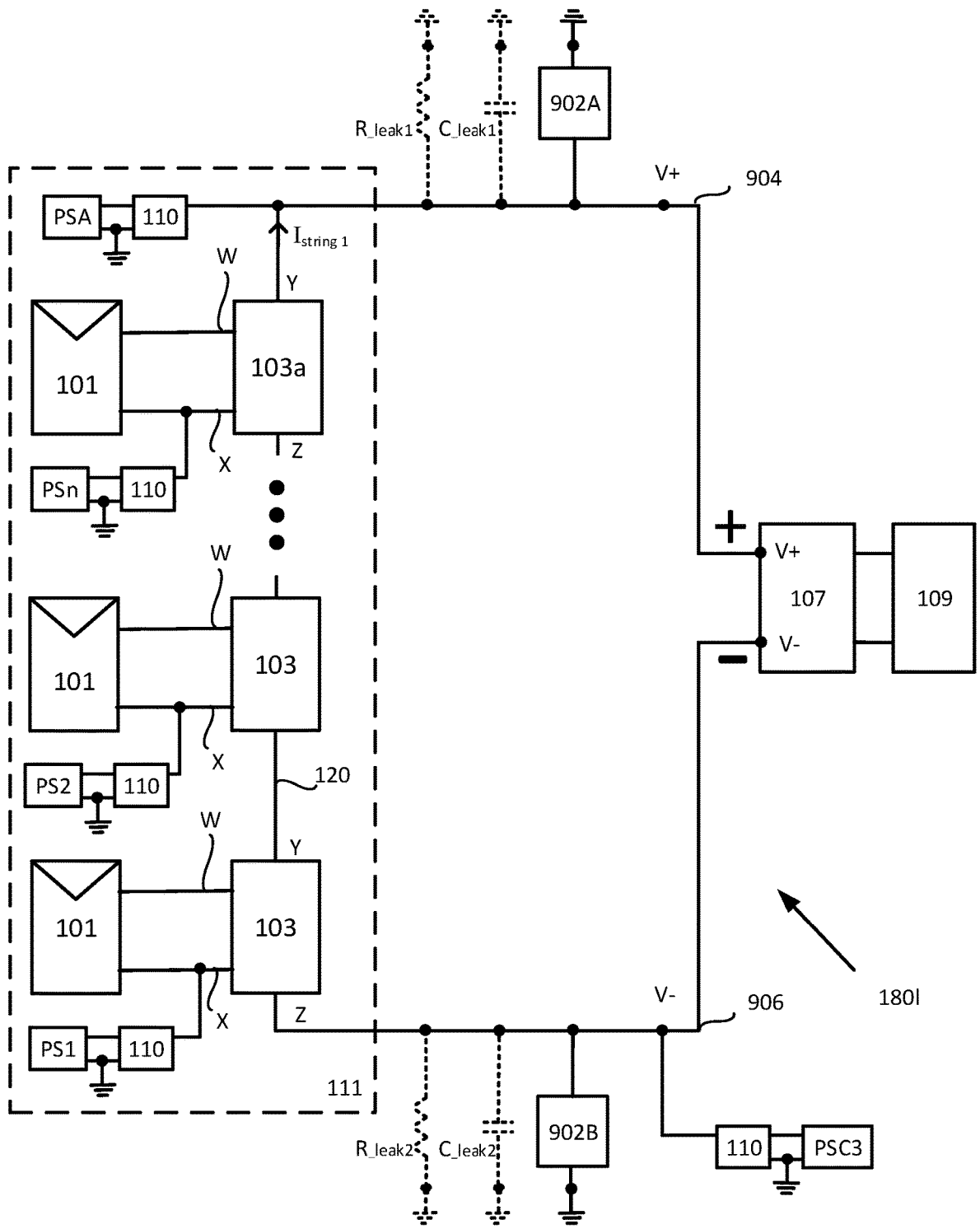
FIG. 9A shows a power system, according to illustrative aspects of the disclosure.

Reference is now made to FIG. 9A, which shows a power system 180l, according to illustrative aspects of the disclosure. Power system 180l may include one or more discharge circuits 902A, 902B for discharging a voltage due to a parasitic capacitance of one or more of power sources 101 and/or other elements of power system 180l (e.g., one or more power devices 103).

Power sources 101 and/or other elements of power system 180l may have a parasitic capacitance with respect to ground, due to one or more factors, for example: a liquid, e.g. water, being on a surface of the power source 101 and/or other elements of power system 180l, the material from which the power sources 101 and/or other elements of power system 180l are made, the proximity of the power sources 101 and/or other elements of power system 180l to the ground, etc. This parasitic capacitance may be charged by a capacitive leakage current due to voltage present across power sources 101 (e.g., voltage imposed across power sources 101 by system power device 107, or by converter 110, or voltage created by irradiance of solar panels used as power sources 101). When converter 110 is applying a voltage on a terminal (e.g. terminal V+, terminal V−, etc.), either during the day or at night, then a capacitive leakage current may create a voltage potential due to the parasitic capacitance, illustrated here as one or more parasitic capacitor(s) C_leak1, C_leak2. The parasitic capacitors C_leak1, C_leak2 may represent total capacitance of parasitic capacitors of one or more power modules 101 and/or other elements of power system 180*l* reflected to capacitance at the input terminals of system power device 107. This charging of parasitic capacitor(s) C_leak1, C_leak2 may be undesirable since it not only redirects a portion of current flowing through series string 111, but also generates a voltage potential across the parasitic capacitors, that may be harmful to someone who comes in contact with the power system 180*l*.

For example, without this voltage potential being discharged by discharge circuitry 902A, 902B, if a person were to come in contact with this voltage potential then it could cause a current to flow through that person, potentially harming that person. The higher the voltage being applied by converter 110 to the terminal/power system, the greater the capacitive leakage current. The greater the capacitive leakage current, the greater the voltage potential due to the parasitic capacitance. The greater the voltage potential due to the parasitic capacitance, the greater the potential danger to a person who comes in contact with that voltage potential. Therefore, discharge circuitry 902A, 902B may be configured to discharge the voltage potential due to the parasitic capacitance, in order to prevent harm that may be caused by that voltage potential. Additionally, discharge circuitry 902A, 902B may be configured to discharge the voltage potential due to the parasitic capacitance relatively quickly, as detailed below.

In some cases, the voltage potential due to the parasitic capacitance may be about the same voltage value as the voltage applied on the DC bus terminal (e.g., terminal V+ on DC+bus 904, terminal V− on DC− bus 906) by converter 110 (for example, about hundreds of volts, e.g., about 700-900 volts).

The discharge circuitry 902A, 902B may be configured to operate based on and/or in response to one or more indications that a discharge is required. Examples of these indications will be described below. Based on and/or in response to the one or more indication(s), the discharge circuitry 902A, 902B may switch/actuate/activate switching circuitry, e.g., including at least one discharge switch, thereby dissipating/discharging the "parasitic capacitor(s)" voltage to the ground/earth potential. Examples of discharge circuitry 902A, 902B including at least one discharge switch are described in detail below.

Although illustrated externally from system power device 107 and/or converter 110, in some cases discharge circuitry 902A, 902B, or at least some particular elements of discharge circuitry 902A, 902B, may be physically and/or functionally part of system power device 107 and/or converter 110.

In some cases, the applying of voltage on the DC bus terminal by converter 110 or by system power device 107 may be stopped based on and/or in response to the one or more indications that discharge should be performed, and vice versa.

In cases where the power system has both a day mode of operation and a night mode of operation, then discharge may be performed in either mode of operation.

In some cases, discharge may be performed automatically based on certain indications. For example, discharge may be performed automatically when the power system switches between different modes of operation (e.g. between day mode to night mode and vice versa). As another example, discharge may be performed automatically periodically after a particular time interval.

In some cases, after an indication related to discharge is received then discharge might not be performed automatically, rather discharge may only be performed after a determination related to discharge is made. In some cases, the determination may be based on one or more subsequent indications. For example, if one or more first indication(s) for discharge is obtained (e.g., an indication that the power system is changing modes of operation and/or an indication that a particular time interval has passed), then power system may obtain one or more second indication(s) (e.g., one or more electrical parameter(s), such as, voltage, differential voltage, current, power, etc.), and a determination related to discharge may be made based on the one or more second indication(s). As an example, if one or more first parameter(s) indicates that the power system is changing between a day mode of operation and a night mode of operation, and one or more second parameter(s) indicates that a voltage is above a particular threshold, then a positive determination related to discharge may be made, and discharge may be performed.

In addition to the parasitic capacitance there may also be parasitic resistance between power sources 101 and/or other elements of power system 180*l* and ground, illustrated here as one or more parasitic resistor(s) reflected to input terminals of system power device 107, R_leak1, R_leak2. The parasitic resistors R_leak1, R_leak2 may contribute to leakage current of the power system. The parasitic resistors R_leak1, R_leak2 may discharge at least some of the voltage potential of the power system. Similar to the parasitic capacitance, the parasitic resistance may be undesirable since it may redirect a portion of current flowing through the power system.

Figure 9B:
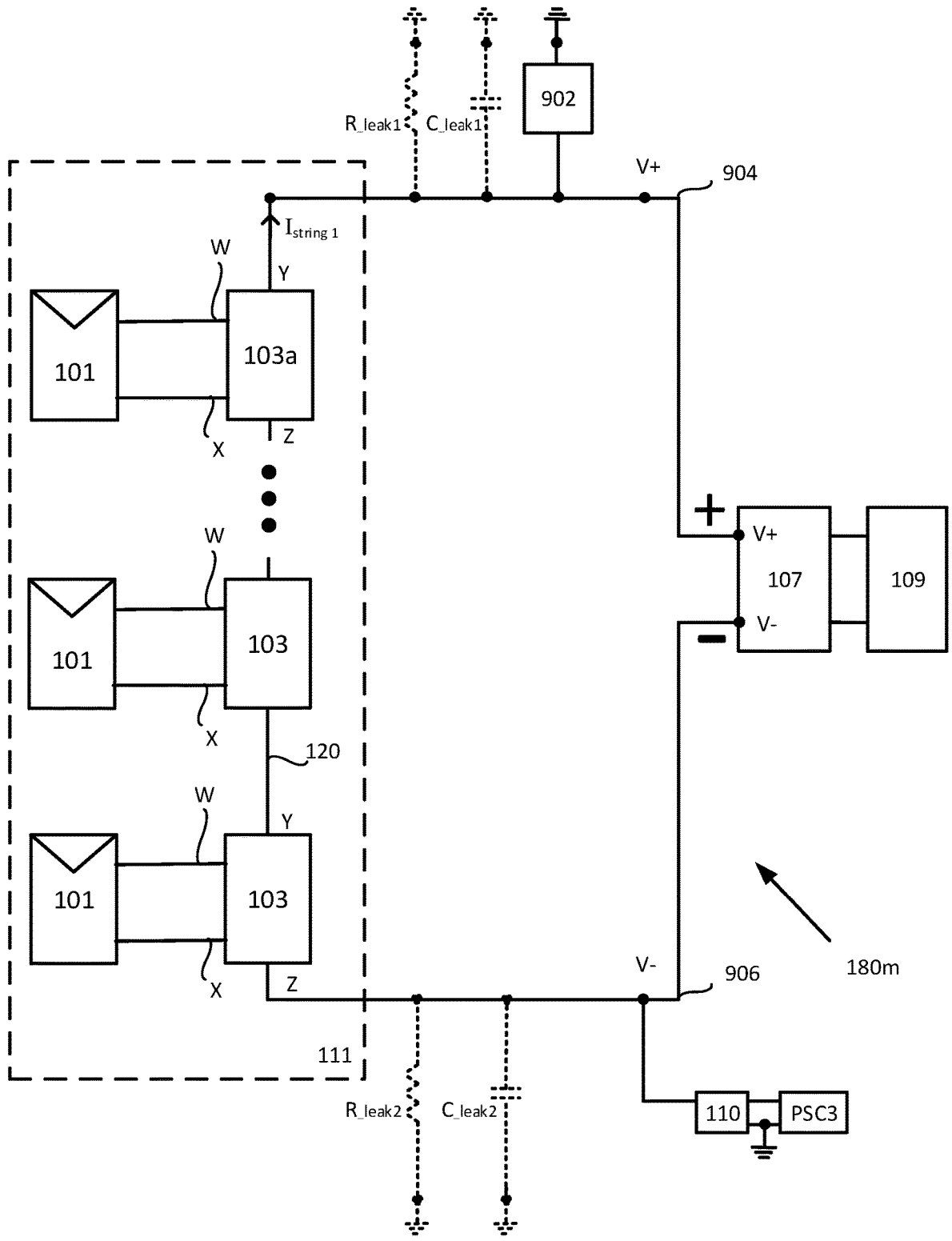
FIG. 9B shows a power system, according to illustrative aspects of the disclosure.

Reference is now made to FIG. 9B, which shows a power system 180*m*, according to illustrative aspects of the disclosure. Power system 180*m* is similar to power system 180*l*, except that the wiring configuration 111 of power system 180*m* does not include a plurality of power supplies PS and converters 110. Rather, in this case, there is a single converter 110 and power supply PSC3 for applying voltage on a terminal of the power system 180*m*, e.g. terminal V− on the DC− bus 906.

As further detailed below, the plurality of converter(s) 110, and optionally the power suppl(ies) PS, of power system 180*l* may be considered voltage-applying circuitry. In the case of power system 180*m* the voltage-applying circuitry may be considered to include the single converter 110, and, optionally, the power supply PSC3.

Also, in this case, there is a single discharge circuit 902 configured to discharge a voltage potential due to parasitic capacitance. Discharge circuit 902 may be connected to a terminal. In some cases, the discharge circuitry 902 may be connected to the DC+bus and/or the DC− bus. If connected to the DC+bus 904 then the discharge circuitry 902 may be configured to discharge the voltage potential of the power system due to parasitic capacitance on the DC+bus and the DC− bus (e.g., due to parasitic capacitors C_leak1, C_leak2). In the example illustrated in FIG. 9B, discharge circuitry 902 may be connected to terminal V+ on the DC+bus 904 between the PV modules and the inverter on the DC+side.

Figure 9C:
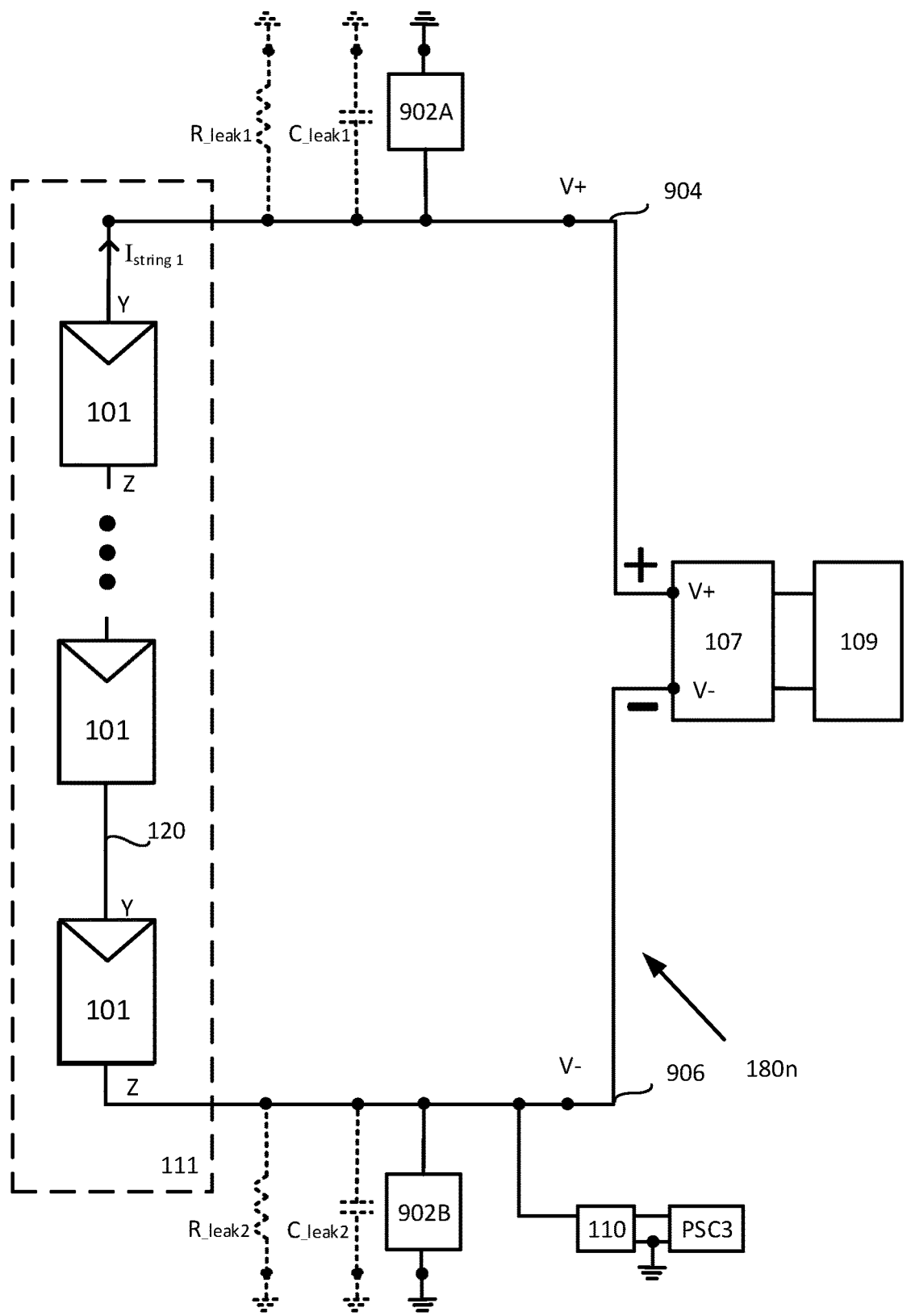
FIG. 9C shows a power system, according to illustrative aspects of the disclosure.

Reference is now made to FIG. 9C, which shows a power system 180*n*, according to illustrative aspects of the disclosure. Power system 180*n* is similar to power systems 180*l*, 180*m*, except that the wiring configuration 111 of power system 180*n* includes a string of power sources 101 that is directly connected to a system power device 107 without each power source 101 also being connected to a respective power device 103. The power sources 101 of the string may be a plurality of PV modules connected to each other in a series connection. In some cases the power system may alternatively or additionally have a plurality of PV modules connected to each other in a parallel connection. In some cases the power system may have a plurality of series strings of power sources 101.

Figure 10A:
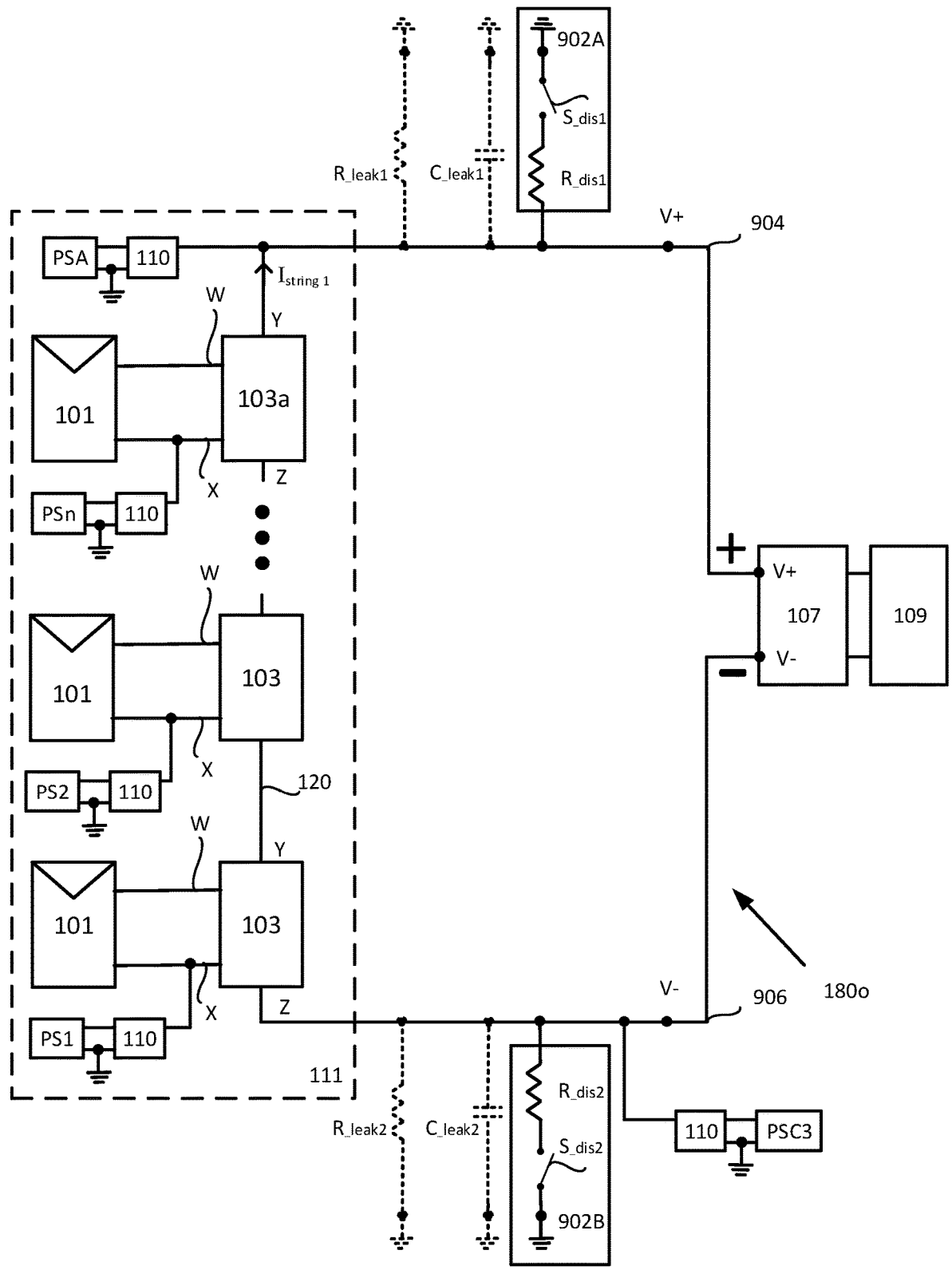
FIG. 10A shows a power system, according to illustrative aspects of the disclosure.

Reference is now made to FIG. 10A, which shows a power system 180*o*, according to illustrative aspects of the disclosure. Power system 180*o* is similar to power system 180*l*, with each discharge circuit 902A, 902B of power system 180*o* illustrated as including at least one discharge switch S_dis1, S_dis2 and at least one discharge resistor R_dis1, R_dis2, configured to discharge the voltage due to parasitic capacitance. According to additional features of the disclosure herein, additional or alternative elements may be used to implement discharge circuits 902A, 902B.

As an example, the at least one discharge switch (e.g., discharge switch S_dis1, S_dis2) may be one or more: FET, MOSFET, reed relay, etc.

In this case, in response to the one or more indication(s) that a discharge is required, one or more of the discharge circuits may switch/actuate/activate (e.g., using a controller, not explicitly depicted, configured to control the discharge circuits) the at least one discharge switch S_dis1, S_dis2 and connect the at least one discharge resistor R_dis1, R_dis2 between the DC+bus 904 and/or the DC− bus 906 and the ground/earth potential, thereby dissipating/discharging the "parasitic capacitor(s)" voltage by causing current to flow through the at least one discharge resistor R_dis1, R_dis2 to the ground/earth potential.

Figure 10B:
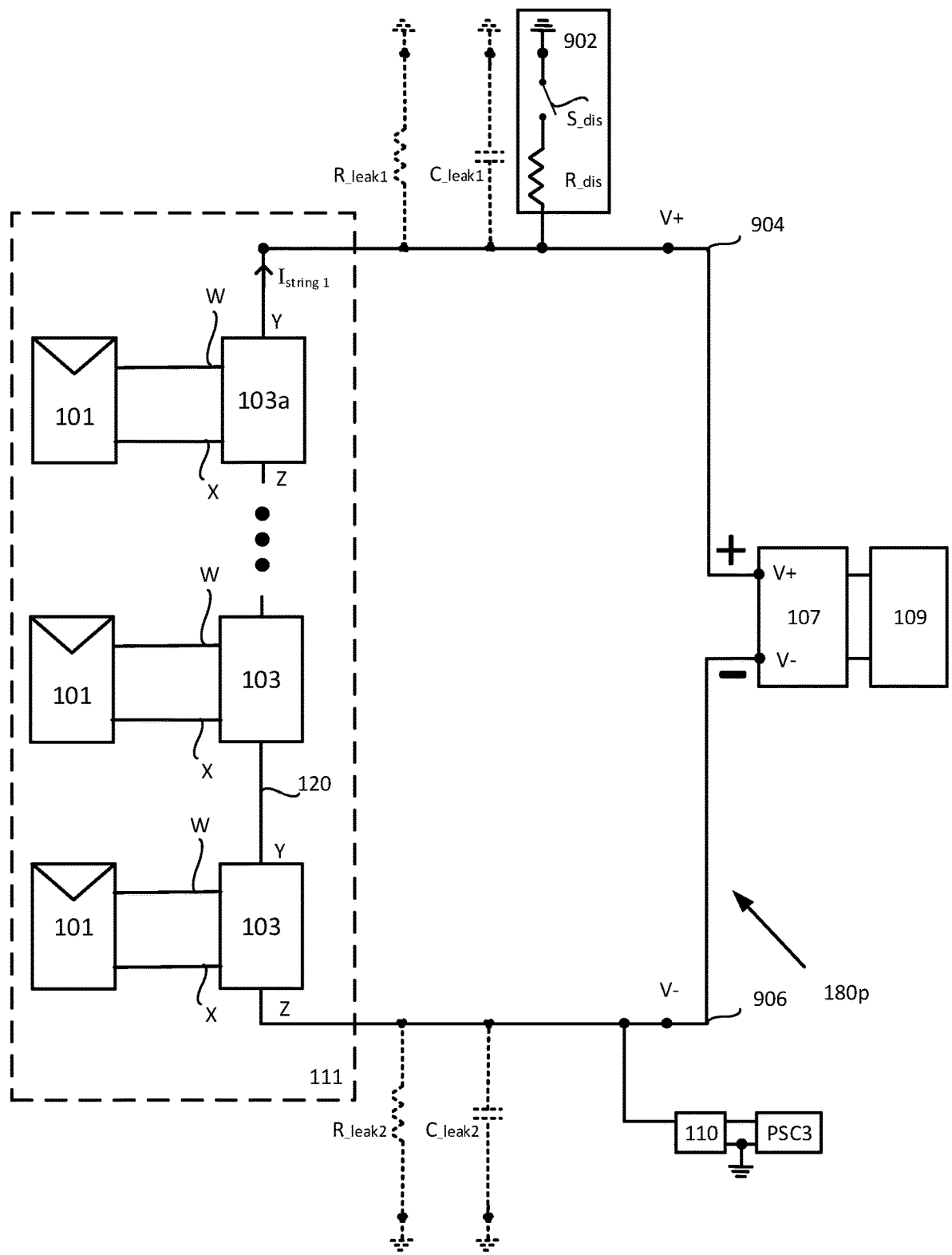
FIG. 10B shows a power system, according to illustrative aspects of the disclosure.

Reference is now made to FIG. 10B, which shows a power system 180*p*, according to illustrative aspects of the disclosure. Power system 180*p* is similar to power system 180*o*, except that the wiring configuration 111 of power system 180*p* does not include a plurality of power supplies PS and converters 110. Rather, in the example system shown in FIG. 10B, the voltage-applying circuitry may include a single converter 110 and power supply PSC3 for applying voltage on a terminal of the power system 180*p*, e.g. terminal V− on the DC− bus. Also, in this case, there is a single discharge circuitry 902 connected to a terminal of the power system 180*p*, e.g. terminal V+.

Figure 10C:
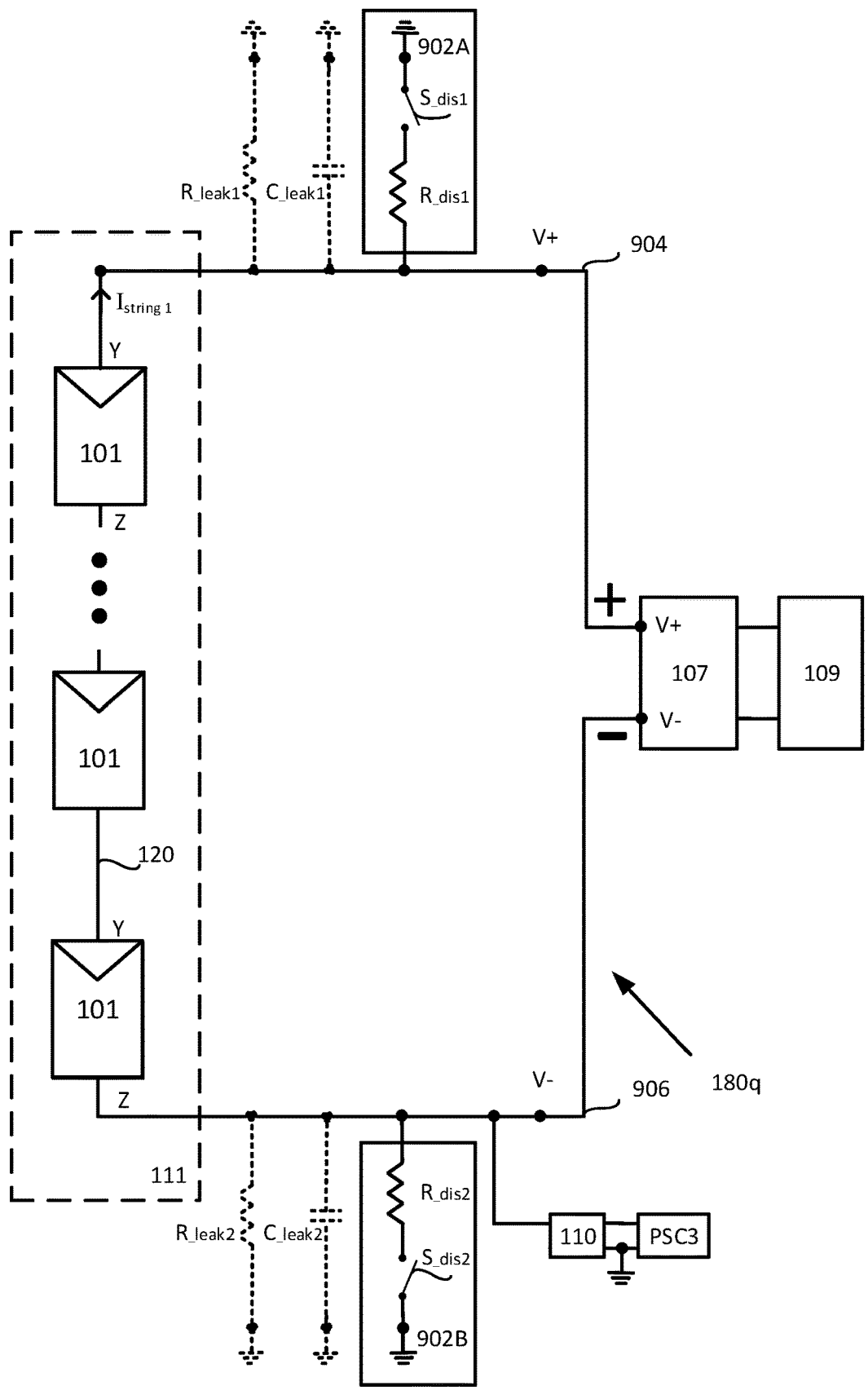
FIG. 10C shows a power system, according to illustrative aspects of the disclosure.

Reference is now made to FIG. 10C, which shows a power system 180*q*, according to illustrative aspects of the disclosure. Power system 180*q* is similar to power systems 180*o*, 180*p*, except that the wiring configuration 111 of power system 180*q* includes a string of power sources 101 that is directly connected to a system power device 107 without also being connected to power devices 103. The power sources 101 of the string may be a plurality of PV modules connected to each other in a series connection. In some cases, the power system may alternatively or additionally have a plurality of PV modules connected to each other in a parallel connection. In some cases the power system may have a plurality of series strings of power sources 101.

Figure 11:
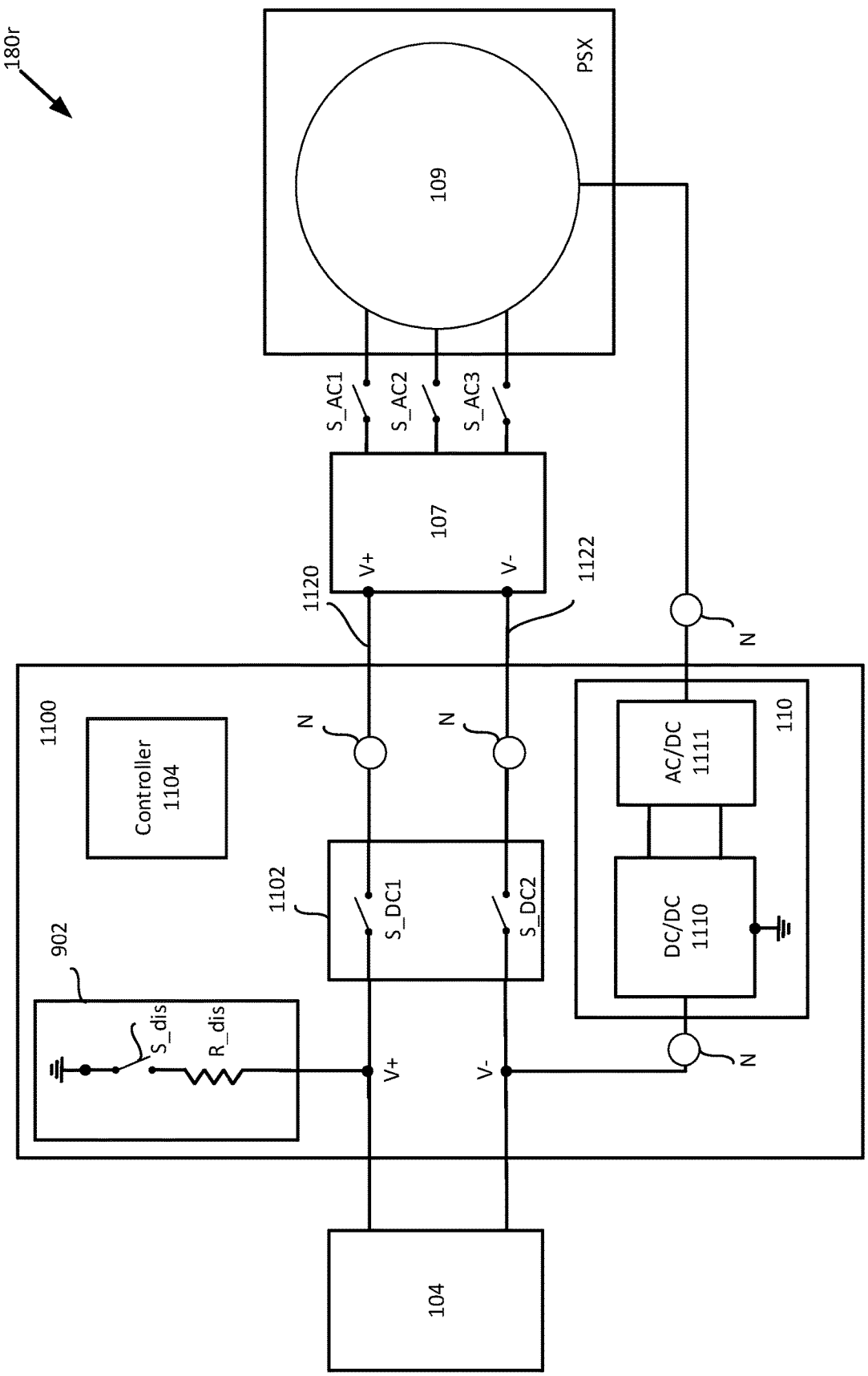
FIG. 11 shows a power system, according to illustrative aspects of the disclosure.

Reference is now made to FIG. 11, which shows a power system 180*r*, according to illustrative aspects of the disclosure. Power system 180*r* may include circuitry 1100 connected between one or more power sources 104 and one or more system power devices 107. Power source 104 may be similar to power source 101, and/or may be a power source 101 together with a system power device 103.

Although illustrated externally from the one or more system power devices 107, in some cases circuitry 1100 or at least some particular elements of circuitry 1100 may be physically and/or functionally part of the one or more system power devices 107.

Circuitry 1100 may include switching circuitry 1102 connected between one or more power sources 104 and one or more system power devices 107. Circuitry 1100 may also include a converter 110 and discharge circuitry 902. System power devices 107 may include a DC/AC converter, and be connected to an electrical grid 109 by one or more switches (e.g., relays) S_AC1, S_AC2, S_AC3. In the example shown in FIG. 11, system power device 107 may include a three-phase DC/AC converter configured to receive a DC voltage input at input terminals, and output a three-phase AC voltage output on three output terminals, that are connected to electrical grid 109 via switches S_AC1, S_AC2, S_AC3.

Switching circuitry 1102 may be configured to disconnect the one or more system power devices 107 from the one or more power sources 104. Switching circuitry 1102 may include one or more switches (e.g., relays) S_DC1, S_DC2. For example, switching circuitry 1102 may include a first switch S_DC1 connected on a positive part of the DC bus between one or more power sources 104 and one or more system power devices 107 (e.g., the DC+bus 1120), and a second switch S_DC2 connected on a negative part of the DC bus between the one or more power sources 104 and the one or more system power devices 107 (e.g., the DC− bus 1122).

Converter 110 is configured to convert an input voltage from a power supply PSX to another output voltage. Converter 110 is configured to apply the converted output voltage to a terminal, in this case terminal V− on the DC− bus. In this case the power supply PSX may be an external AC power supply, such as grid 109. In other cases the power supply PSX may be a separate power source 101/104, and/or a storage device, such as a battery.

Converter 110 may include an AC to DC converter 1111 and a DC to DC converter 1110.

AC to DC converter 1111 may be configured to convert an AC voltage (e.g., received from grid 109) to a DC voltage. AC to DC converter 1111 may be connected between the power supply PSX/grid 109 and the DC to DC converter 1110. AC to DC converter 1111 may be configured to convert an input AC voltage from the power supply PSX/grid 109 to an output DC voltage, and to provide that converted output DC voltage as an input DC voltage to the DC to DC converter 1110.

DC to DC converter 1110 may be configured to convert a first DC voltage to a second DC voltage, and to apply the second DC voltage to a terminal. In some cases, DC to DC converter 1110 may be a boost converter configured to convert a first lower DC voltage to a second higher DC voltage. DC to DC converter 1110 may be connected between the AC to DC converter 1111 and the terminal V−. DC to DC converter 1110 may be configured to convert a first, lower input DC voltage from the AC to DC converter 1111 to a second, higher output DC voltage, and to provide that converted higher output DC voltage to terminal V−, e.g. to help reverse/counteract/alleviate/prevent the effects of potential induced degradation (PID) on the power system 180*r*, either during the day or at night.

In some cases, converter 110 may be configured to apply a relatively lower output voltage to V− during the day, and to apply a relatively higher output voltage to V− during the night.

As a non-limiting numerical example, AC to DC converter 1111 may be configured to convert an AC voltage to a lower DC voltage value of about tens of volts (e.g. about 10-12 volts), and DC to DC 1110 converter may be configured to convert the lower DC voltage value to a higher DC voltage value of about hundreds of volts (e.g. about 800-900 volts).

As another non-limiting numerical example, AC to DC converter 1111 may be configured to convert an AC voltage to a lower DC voltage value of about tens of volts (e.g. about 1-10 volts), and DC to DC converter 1110 may be configured to convert the lower DC voltage value to a higher DC voltage value of about tens of volts to about hundreds volts (e.g. about 10-150 volts).

According to the above examples, the output DC voltage applied by converter 110 to terminal V− may be higher at night (e.g. about 800-900 volts) than during the day (e.g. about 10-150 volts, which may be to ensure that the voltage in the power system does not fall below about 0 volts with respect to ground).

Power system 180*r* may include one or more sensors N. Sensors N may be used to help determine one or more parameter indicative of whether discharge should be performed. Sensors N may include, for example: a clock, a timer, a motion sensor, a magnetic sensor, a proximity sensor, a motion sensor, an irradiance sensor, a temperature sensor, a current sensor, a voltage sensor, a power sensor, etc.

In some examples, power system 180*r* may include one or more controller(s) 1104. In some cases one or more controller(s) 1104 may be part of the discharge circuitry 902. In some cases one or more controller(s) 1104 may be internal to one or more elements of power system 180*r*, for example: circuitry 1100, system power device(s) 107, discharge circuitry 902 etc. In some cases, one or more controller(s) 1104 may be separate elements, external to other elements of power system 180*r*. For the sake of simplicity, the connections between the one or more controller(s) 1104 and other elements of power system 180*r* (e.g. discharge circuitry 902, system power device(s) 107, sensors N, etc.) are not illustrated in FIG. 11. It will be appreciated that in some examples the other elements and/or one or more different controller(s) 1104 of power system 180*r* may be communicatively and/or operably connected to one or more other controller(s) 1104. As an example, sensors N may provide data (including one or more parameter) to one or more controller(s) 1104.

The one or more controller(s) 1104 may be configured to receive and/or transmit instructions as signals/commands to and/or from one or more other elements of the power system. The one or more controller(s) 1104 may include one or more processors/processing circuits and memory configured to access data and make determinations/calculations/computations.

Sensors N may be connected to the one or more controller(s) 1104. The one or more controller(s) 1104 may be configured to use one or more indication(s)/parameter(s), e.g., obtained from the one or more switches and/or the one or more sensor(s), to make a determination regarding discharge. The one or more controller(s) 1104 may also be communicatively and/or operatively connected to the discharge circuitry 902. The one or more controller(s) 1104 may be configured to generate one or more commands relating to discharge.

Discharge circuitry 902 may be configured to discharge an electrical potential that built up due to parasitic capacitance. Discharge circuitry 902 may be connected to a terminal. As mentioned above, in some cases, the discharge circuitry 902 may be connected to the DC+bus and/or the DC− bus. In the example illustrated in FIG. 11, discharge circuitry 902 is connected to terminal V+ on the DC+bus 1120.

Discharge circuitry 902 may include at least one discharge switch S_dis and at least one discharge resistor R_dis. In this case, at least one discharge resistor R_dis may be connected between terminal V+ and at least one discharge switch S_dis. At least one discharge switch S_dis is also connected to a ground/earth potential. In other cases, at least one discharge switch S_dis may be connected between terminal V+ and at least one discharge resistor R_dis, and at least one discharge resistor R_dis may also be connected to a ground/earth potential.

As mentioned above, discharge circuitry 902 may be configured to perform discharge based on and/or in response to one or more indications that discharge should be performed.

For example, the one or more controller(s) 1104 may be configured to generate one or more commands relating to actuating at least one discharge switch S_dis and discharging a voltage potential via the at least one discharge resistor R_dis. The command may be generated based on and/or in response to one or more indications/parameters, and the voltage potential may be a voltage potential due to parasitic capacitance.

In some cases, the one or more indications that discharge should be performed may be determined by the one or more controller(s) 1104 based on and/or in response to one or more parameter(s)/data obtained by one or more sensors.

The one or more indications that discharge should be performed may include, for example: an indication that at least one switch has been turned off, an indication that at least one system power device 107 has been turned off, an indication that voltage-applying circuitry has been turned off, an indication that the voltage applied by voltage-applying circuitry has been increased/decreased, an indication that a cover of a housing has been unlocked/removed, etc.

The housing may be a box, case, casing, etc., configured to house circuitry. The housing may be configured to protect the housed circuit from external elements, and to protect a person from coming in contact with the circuitry. The housing may include a lockable and removable cover that allows at least partial access to the circuitry. The cover of the housing may be unlocked/removed by a person, e.g. by a maintenance worker, who is trying to access the circuitry.

The housing may contain at least one of, for example: circuitry 1100, voltage-applying circuitry, converter 110, switching circuitry 1102, discharge circuitry 902, system power device(s) 107, etc.

Voltage-applying circuitry may include converter 110. Voltage-applying circuitry may also include a power supply for converter 110. In some cases the power supply may be a power source 101/104, and/or a storage device, such as a battery.

An indication that at least one switch has been turned off may be an indication that at least one DC switch has been turned off, and/or an indication that at least one AC switch has been turned off. A DC switch may be a switch connected to a line that is connected to a DC source. In some examples, a DC switch may be a switch configured to connect circuitry (e.g., circuitry 1100) to a DC power source or a DC load. An AC switch may be a switch connected to a line that is connected to an AC source or to an AC load (e.g., an electrical grid).

In some cases one or more switch (or an element for actuating the one or more switch) may be located on an exterior of the housing. In other cases the one or more switch (or an element for actuating the one or more switch) may be located in an interior of the housing.

The indication that a DC switch has been turned off may be related to the actuation of the switches S_DC1, S_DC2 that connect the circuitry 1100 to the system power device(s) 107, e.g., an indication that switches S_DC1, S_DC2 have been turned off, disconnecting the inverter(s) 107 from the power source(s) 104 and converter 110. In such a case, converter 110 may continue to operate. Therefore, in this case, even though the inverter(s) 107 have been disconnected from the power source(s) 104, converter 110 may still be connected to power source(s) 104. Accordingly, a voltage potential in power system 180r, may be relatively high (e.g., about hundreds of volts), and a discharge of the voltage potential using discharge circuitry 902 may be desired/required. In some examples, when the DC switch (e.g., switch S_DC1 or S_DC2) is turned off, the sensor N (e.g., a current sensor) connecting the DC switch to the corresponding terminal (V+ or V−) of the inventor 107 may detect that no current flows between the DC switch and the corresponding terminal (V+ or V−) of the inventor 107. Accordingly, the sensor N may provide an indication that the DC switch has been turned off. In other cases sensor N may be one or more other sensor(s), e.g., voltage sensor, power sensor, proximity sensor, etc., that is configured to detect when the DC switch is turned off (e.g., senses no/less voltage, senses no/less power, senses a part of the switch has been physically moved, etc.) and to provide an indication that the DC switch has been turned off.

The indication that an AC switch has been turned off may be related to the actuation of the switches S_AC1, S_AC2, S_AC3 that connect the system power device(s) 107 to the grid 109, e.g., an indication that switches S_AC1, S_AC2, S_AC3 have been turned off, disconnecting the one or more inverter(s) that may be included in system power device 107 from the grid 109. In such a case, converter 110 may continue to operate. In this case, even though one or more inverter(s) of system power device(s) 107 have been disconnected from the grid 109, inverter(s) of system power device(s) 107 and converter 110 may still be connected to power source(s) 104. Accordingly, a voltage potential in power system 180r, may be relatively high (e.g., about hundreds of volts), and a discharge of the voltage potential using discharge circuitry 902 may be desired/required. In some examples, one or more sensors N may be configured to detect when an AC switch has been turned off and to provide an indication that the AC switch has been turned off.

An indication that a system power device 107 has been turned off may be related to the shutting down of one or more inverter(s) that may be part of system power device 107. For example, this may be related to the actuation of switches S_DC1, S_DC2 and switches S_AC1, S_AC2, S_AC3, e.g., an indication that all of these switches have been turned off, disconnecting the inverter(s) of system power device(s) 107 from both the power source(s) 104 and the grid 109. In some cases, the inverter(s) of system power device(s) 107 may be turned off manually (e.g. using a button, lever, rotary switch mechanism, or other appropriate mechanism on the body of the inverter). In some cases, the inverter(s) of system power device(s) 107 may be turned off remotely (e.g. using an application on a mobile device that enables communicative and operative connection between the mobile device and the inverter). In some examples, one or more sensors N may be configured to detect when a system power device 107 has been turned off and to provide an indication that the system power device 107 has been turned off.

An indication that the voltage-applying circuitry has been turned off may be related to an indication that converter 110 has been turned off/shut down. The indication that the voltage-applying circuitry has been turned off may be related to the connection of the voltage-applying circuitry/converter 110 to the power supply PSX/grid, e.g., an indication that the converter 110 has been disconnected from the power supply PSX/grid 109. In this case, even though the converter 110 has been disconnected from the power supply PSX/grid 109, a voltage potential in power system 180r, may be relatively high (e.g., about hundreds of volts), and a discharge of the voltage potential using discharge circuitry 902 may be desired/required. This relatively high voltage potential may be due to parasitic capacitance. In some examples, one or more sensors N may be configured to detect when the voltage-applying circuitry has been turned off and to provide an indication that the voltage-applying circuitry has been turned off.

An indication that the voltage applied by voltage-applying circuitry has been increased/decreased may be related to an indication that the output voltage of converter 110 has been increased/decreased. The indication that the voltage-applying circuitry has been increased/decreased may be related to the changing of a mode of the voltage-applying circuitry (e.g. from night mode to day mode or vice versa). In this case, even though the voltage being applied by converter 110 has been decreased, a voltage potential in power system 180r, may be relatively high (e.g., about hundreds of volts), and a discharge of the voltage potential using discharge circuitry 902 may be desired/required. This relatively high voltage potential may be due to parasitic capacitance. Aside from the possible danger of this voltage potential, this relatively high voltage potential may also affect the operation of the power system when it changes modes of operation, e.g. from night mode to day mode, as detailed below. In some examples, one or more sensors N may be configured to detect when the voltage applied by voltage-applying circuitry has been increased/decreased and to provide an indication that the voltage applied by voltage-applying circuitry has been increased/decreased.

In some cases, the discharge circuitry 902 may be tested before the power system changes between modes of operation (e.g. between night mode and day mode, and vice versa, or between production mode and non-production mode, and vice versa) to help ensure that the discharge circuitry 902 is capable of performing discharge properly.

An indication that the voltage-applying circuitry has been turned off/the applied voltage has been increased/decreased may be based on and/or in response to one or more parameter. The parameter may indicate that the PV module is producing power above a particular threshold, e.g., since the sun is up and out (i.e., the PV modules are exposed to sunlight). The parameter may indicate that the PV module is not producing power above a particular threshold, e.g., since the sun is down and away (i.e., the PV modules are no longer exposed to sunlight). The one or more parameter may be, for example, at least one of: an electrical parameter indicating that the power source 101/104 is producing power, an electrical parameter indicating that the power source 101/104 is not producing power, a time based parameter indicating a particular time of day (e.g. morning/daytime), etc.

The electrical parameter may be one or more of, for example: voltage, current, power, etc. In some examples, the electrical parameter may be sensed by a voltage sensor, a current sensor, or a power sensor that detects voltage, current, or power produced by the power source 101/104.

The time based parameter may be one or more of, for example: a time of day, hours, minutes, seconds, etc. In some examples, the time based parameter may be sensed by a timer or a clock.

In some examples, an irradiance sensor may detect the amount of sunlight to which a PV module is exposed. Based on the detected amount of sunlight, the irradiance sensor may provide a parameter indicating whether the PV module is producing power above or below a particular threshold. In other examples, a determination related to the time of day (e.g., morning or night) may be made based on the amount of sunlight to which a PV module is exposed. In either case, the mode of operation of the power system may be maintained or changed based on the detected amount of sunlight (e.g., change from day mode to night mode, or vice versa).

The indication that a cover of a housing of the voltage-applying circuitry has been unlocked/removed may be related to the unlocking and/or removal of a cover that houses circuitry. The housing may include a locking mechanism that secures the cover to the housing. The locking mechanism that secures the cover to the housing may be mechanical and/or magnetic. The locking mechanism may include one or more securing element(s), such as, a latch, spring, magnet, etc., for securing the cover of the housing in a particular position and/or orientation when locked to the housing.

One or more sensors, e.g., of sensors N, may sense one or more parameter(s) and/or provide one or more indication(s) that the cover has been unlocked and/or removed from the housing. The sensors may include at least one of, for example: a magnetic sensor, a motion sensor, a proximity sensor, etc.

An indication that a cover of a housing of the voltage-applying circuitry has been unlocked/removed may be particularly useful for example in a case where power system 180r/circuitry 1100 does not include one or more of the elements illustrated in the example of FIG. 11. For example, in a case where power system 180r/circuitry 1100 does not include DC switches, S_SDC1, S_DC2, then sensors and/or a mechanical lock mechanism may help indicate that the housing was unlocked/opened and that discharge should be performed.

The one or more indications related to discharge may indicate that a person (e.g., an installer, system owner or system maintainer) is intending to perform maintenance on the power system, and therefore may come into contact with an element of the power system that is connected to the voltage potential due to the parasitic capacitance. That person might assume that there is no danger to themselves since they performed a shutdown of one or more elements of the power system (e.g., they turned off a DC switch, and/or an AC switch of the inverter, thereby possibly disconnecting the system power device from the AC grid and/or a high DC voltage connected between input terminals on the system power device). That person might not realize there may be additional voltage between each input terminal and ground, due to the parasitic capacitance, that needs to be discharged. The present subject matter addresses this additional voltage due to the parasitic capacitance, and the danger that it presents, by discharging this additional voltage using the discharge circuitry.

The one or more indications related to discharge may indicate that the power system is going to change/is changing from one mode of operation to another mode of operation. When the power system is going to change/is changing from one mode of operation to another, it may be helpful to discharge the additional voltage due to the parasitic capacitance so that that additional voltage does not affect the performance of the power system in the subsequent mode of operation.

As an example, if a relatively high voltage (e.g. about hundreds of volts) is applied in a nighttime mode of operation to counter/reverse the effects of PID on the power system that occurred during the day, then this applied voltage may cause a relatively high voltage potential (e.g. also about hundreds of volts) between terminals of system power device 107 and ground, due to the parasitic capacitance. Besides posing a potential safety risk, this relatively high voltage potential due to the parasitic capacitance may affect the operation of the power system if the power system switches to a daytime mode of operation and the voltage potential due to the parasitic capacitance is not discharged.

For example, in the case above, if about 800-900 volts were applied during a nighttime mode of operation, then there may be a relatively high voltage potential of about 800-900 volts due to the parasitic capacitance. In the daytime mode of operation about 10-150 volts will be applied by the voltage-applying circuitry/converter. However, if the power system switches to the daytime mode of operation before discharge is performed, then there may be a total voltage of about 810-1050 volts (the about 10-150 volts applied by the voltage-applying circuitry/converter+the voltage potential of about 800-900 volts due to the parasitic capacitance=about 810-1050 volts). Not only does this additional voltage present a potential danger, but it may also adversely affect the operation of the power system in the daytime mode of operation (e.g., since the power system expects to see an increase of about 10-150 volts, and not an increase of about 810-1050 volts, which may adversely affect one or more control systems/controllers/control loops of the power system, and may lead to damage to components and/or a shut-down of the system).

The discharge circuitry may be configured to perform discharge of a relatively high voltage in a relatively short period of time. The discharge circuitry may be configured to perform discharge in about a particular range of time or less than about a particular threshold of time (for example, about tens of seconds, e.g., about 30 seconds).

The discharge being relatively rapid may reduce the danger to someone who may need to perform maintenance on the system, thereby increasing the safety of someone who may need to work on the system.

Figure 12:
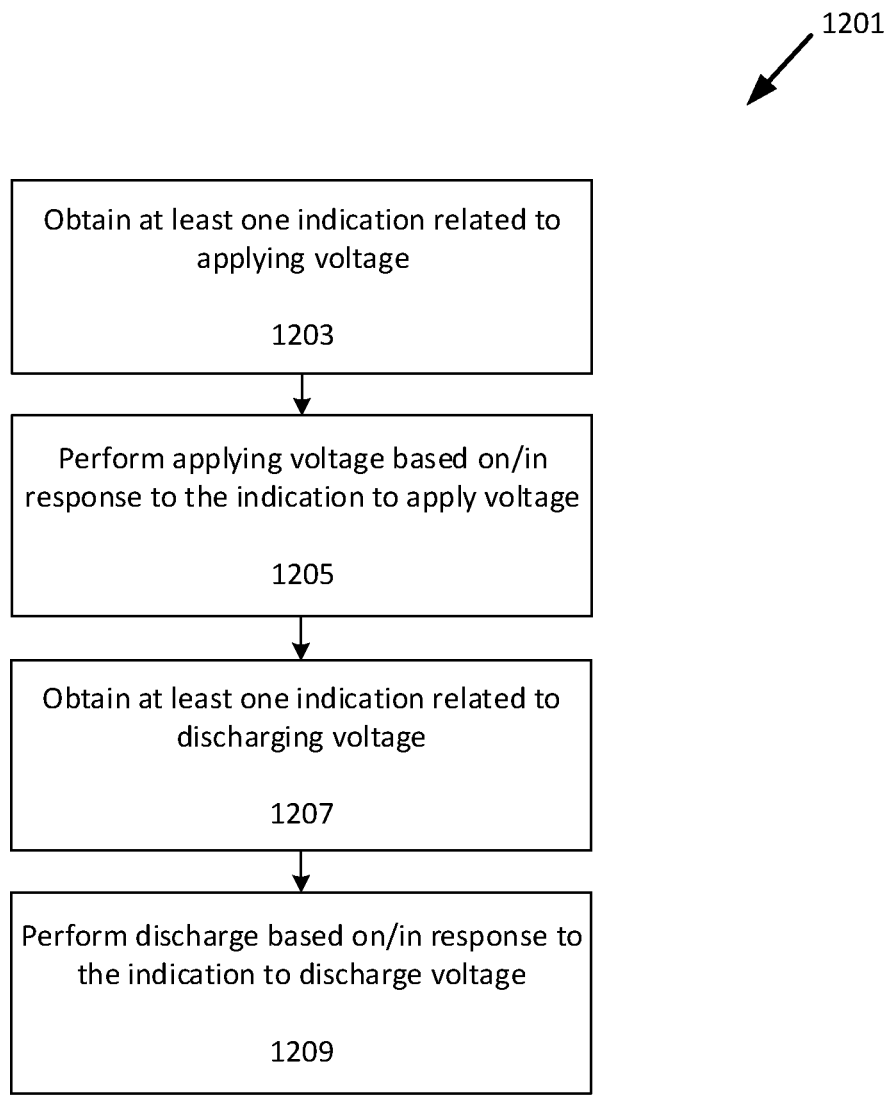
FIG. 12 shows a flowchart of a method, according to illustrative aspects of the disclosure.

Reference is now made to FIG. 12, which shows a flowchart of a method 1201 according to illustrative aspects of the disclosure. For example, method 1201 may be applied to one or more of power systems 180m, 180n, 180p 180q, 180r of FIGS. 9A-11 in the description that follows. As an example, steps of method 1201 may be implemented by one or more controller(s) 1104 of system power devices 107 and/or converters 110. For example, one or more of the controller(s) 1104 may be acting as a primary controller.

At step 1203, at least one indication related to applying voltage may be obtained.

For example, at step 1203, an indication may be obtained by one or more controller(s) 1104/converter 110. The indication may be related to a parameter related to the power system. The parameter may be, for example: an electrical parameter, an irradiance parameter, a time parameter, etc.

In some cases the indication may be related to starting to apply voltage using the voltage-applying circuitry/converter 110. For example, the voltage-applying circuitry/converter 110 might not operate at all in the daytime (e.g. while the sun is out and/or the power source(s) are producing power greater than a particular threshold), and the indication may be indicative that it is nighttime (e.g. the sun is not out and/or the power source(s) are not producing power greater than a particular threshold), and the voltage-applying circuitry/converter 110 should begin operating to help alleviate/counteract/reverse the effects of PID that may have affected the one or more power source(s) 101/104 during the day.

In some cases the indication may be related to increasing the voltage applied by the voltage-applying circuitry/converter 110. For example, the voltage-applying circuitry/converter 110 may operate in a daytime mode of operation where a relatively lower voltage (e.g. about 10-150 volts) is applied at a terminal of the power system during the daytime to help prevent/alleviate/counteract the effects of PID, and the indication may be indicative that it is nighttime and the voltage-applying circuitry/converter 110 should switch to a nighttime mode of operation where a relatively higher voltage (e.g. about 800-900 volts) is applied at a terminal of the power system during the nighttime to help alleviate/counteract/reverse the effects of PID.

At step 1205, the voltage may be applied.

For example, at step 1205, one or more controller(s) 1104 may generate and send an instruction/signal to voltage-applying circuitry/converter 110 based on and/or in response to the indication related to applying voltage. The instruction/signal may be related to applying voltage at a terminal of the power system, e.g. terminal V−. Based on and/or in response to the instruction/signal related to applying voltage, the voltage-applying circuitry/converter 110 may apply voltage accordingly.

For example, if the instruction/signal is to begin applying voltage, then the voltage-applying circuitry/converter 110 may start to apply voltage at the terminal accordingly.

As another example, if the instruction/signal is to apply a greater voltage (e.g. to operate in a nighttime mode of operation), then the voltage-applying circuitry/converter 110 may begin to apply a greater voltage at the terminal accordingly (e.g. greater than the voltage applied in a daytime mode of operation).

At step 1207, at least one indication related to discharging voltage may be obtained.

For example, at step 1207, an indication may be obtained by one or more controller(s) 1104/converter 110. The indication may be related to a parameter related to the power system. The parameter may be, for example: an electrical parameter, an irradiance parameter, a time parameter, etc.

As mentioned above, the one or more indications that discharge should be performed may include, for example: an indication that at least one switch has been turned off, an indication that at least one system power device 107 has been turned off, an indication that voltage-applying circuitry has been turned off, an indication that the voltage applied by voltage-applying circuitry has been increased/decreased, an indication that a cover of a housing has been unlocked/removed, etc. These indications were also described in greater detail above.

At step 1209, the voltage may be discharged.

For example, at step 1209, one or more controller(s) 1104 may generate and send an instruction/signal to discharge circuitry 902A, 902B, 902 based on and/or in response to the indication related to discharging voltage. The instruction/signal may be related to discharging voltage at at least one terminal of the power system, e.g. terminal V+ and/or terminal V−. Based on and/or in response to the instruction/signal related to applying voltage the voltage-applying circuitry/converter 110 may apply discharge voltage accordingly.

For example, based on and/or in response to the instruction/signal to discharge voltage, then the discharge circuitry 902A, 902B, 902 may switch/actuate/activate switching circuitry, e.g. at least one discharge switch and at least one discharge resistor, thereby dissipating/discharging the "parasitic capacitors" voltage to the ground/earth potential, and reducing the potential danger to a person coming in contact with the power system.

As also mentioned above, performing discharge may also facilitate desired operation of the system after the switching of the power system between different modes of operation, e.g. from a nighttime mode of operation to a daytime mode of operation.

Figure 13A:
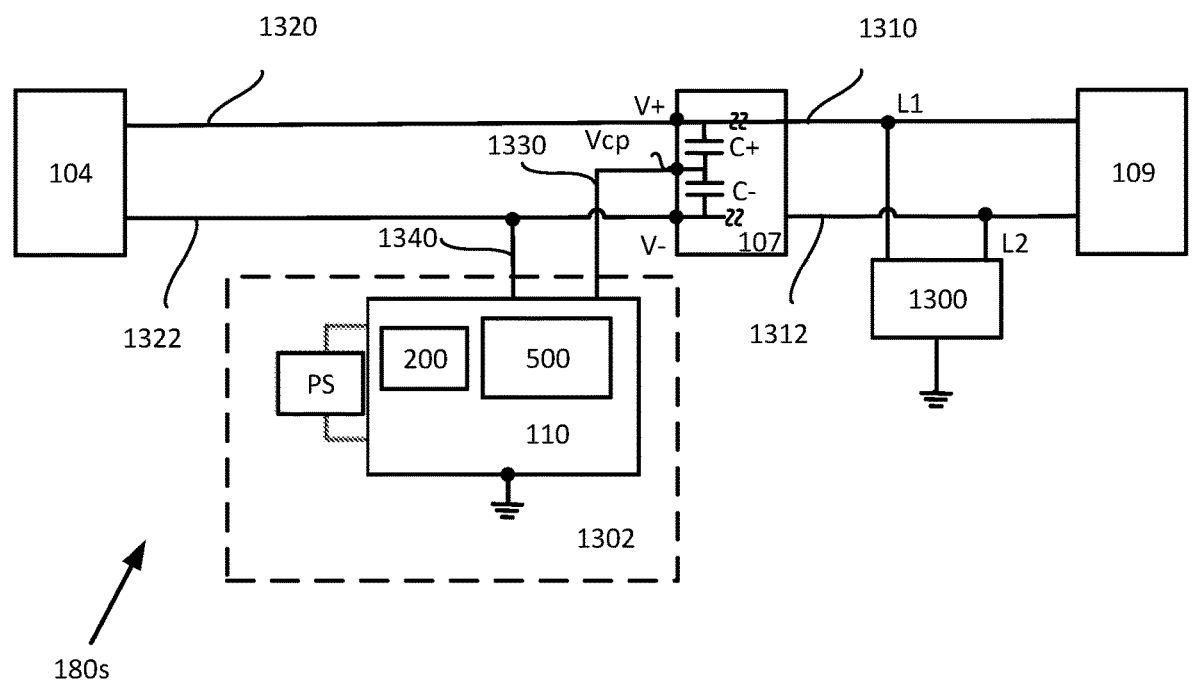
FIG. 13A shows a power system, according to illustrative aspects of the disclosure.

Reference is now made to FIG. 13A, which shows a power system 180s, according to illustrative aspects of the disclosure. Power system 180s may include at least one insulation monitoring device (IMD) or isometer 1300. The IMD/isometer 1300 may be configured to measure the insulation/insulation resistance between one or more system power device(s) 107 and a ground/earth potential. IMD/isometer 1300 may be configured to generate an alert (including a visual and/or audio indication, e.g., light and/or sound) and/or to disconnect the system power device(s) 107 from the grid 109 when the insulation/insulation resistance between the system power device(s) 107 and the ground/earth potential is within about a particular range or less than about a particular threshold (for example, about tens of kilo-ohms or about hundreds of kilo-ohms, e.g. about 50 kΩ or about 100 kΩ).

IMD/isometer 1300 may be connected in parallel between one or more system power device(s) 107 and the grid 109. IMD/isometer 1300 may be connected to a first terminal, e.g., terminal L1 on a first bus/line 1310 between system power device(s) 107 and the grid 109, and to a second terminal, e.g., terminal L2 on a second bus/line 1312 between system power device(s) 107 and the grid 109. IMD/isometer 1300 is also connected to a ground/earth potential. In some examples, there may be additional lines (not shown) between the one or more system power device(s) 107 and the grid 109. Power system 180s may include additional connections between IMD/isometer 1300 and the additional lines, and/or one or more additional IMD(s)/isometer(s) 1300, for measuring insulation/insulation resistance of these lines (e.g. relative to ground/earth potential and/or relative to each other).

Power system 180s also includes current injecting circuitry 1302. Current injecting circuitry 1302 may include a power supply PS connected to a converter 110. Power supply PS may be configured to provide power to converter 110. Current injecting circuitry 1302 may include circuitry 500 configured to regulate the output of converter 110. Circuitry 500 may include one or more sensors configured to sense/obtain one or more parameters. Converter 110 may be connected to a first terminal, e.g., a midpoint terminal Vcp in a system power device 107, and to a second terminal, e.g., terminal V− on the DC− bus between power source(s) 104 and system power device(s) 107.

Current injecting circuitry 1302/converter 110 may be configured to convert an input current provided by power supply PS to an output current. Current injecting circuitry 1302/converter 110 may also be configured to inject an output current/converted current at a terminal, e.g., terminal V−. Current injecting circuitry 1302/converter 110 may also be configured to detect/determine a parameter related to the midpoint Vcp and to adjust/regulate/maintain the output current that is injected to terminal V− based on and/or in response to the parameter related to the midpoint Vcp. For example, if current injecting circuitry 1302 determines that a lower current is required/desired, then the output current may be decreased to a lower output current accordingly. Alternatively, if current injecting circuitry 1302 determines that a higher current is required/desired, then the output current may be increased to a greater output current accordingly.

Current injecting circuitry 1302 may be similar to the voltage-applying circuitry, described in detail above.

In some cases the voltage-applying circuitry/current injecting circuitry may be the same circuitry with different modes of operation. The voltage-applying circuitry/current injecting circuitry may have a voltage control mode and a current control mode. In some cases the voltage-applying circuitry/current injecting circuitry may have one or more modes of operation that are a combination of a plurality of different modes of operation (e.g., a mode with both a voltage control mode and a current control mode operating together). For example, voltage-applying circuitry/current injecting circuitry may have a cascade mode with both voltage control mode and current control mode included in a cascaded control loop structure with an inner loop and an outer loop, which will be described as follows with reference to FIG. 16.

Figure 16:
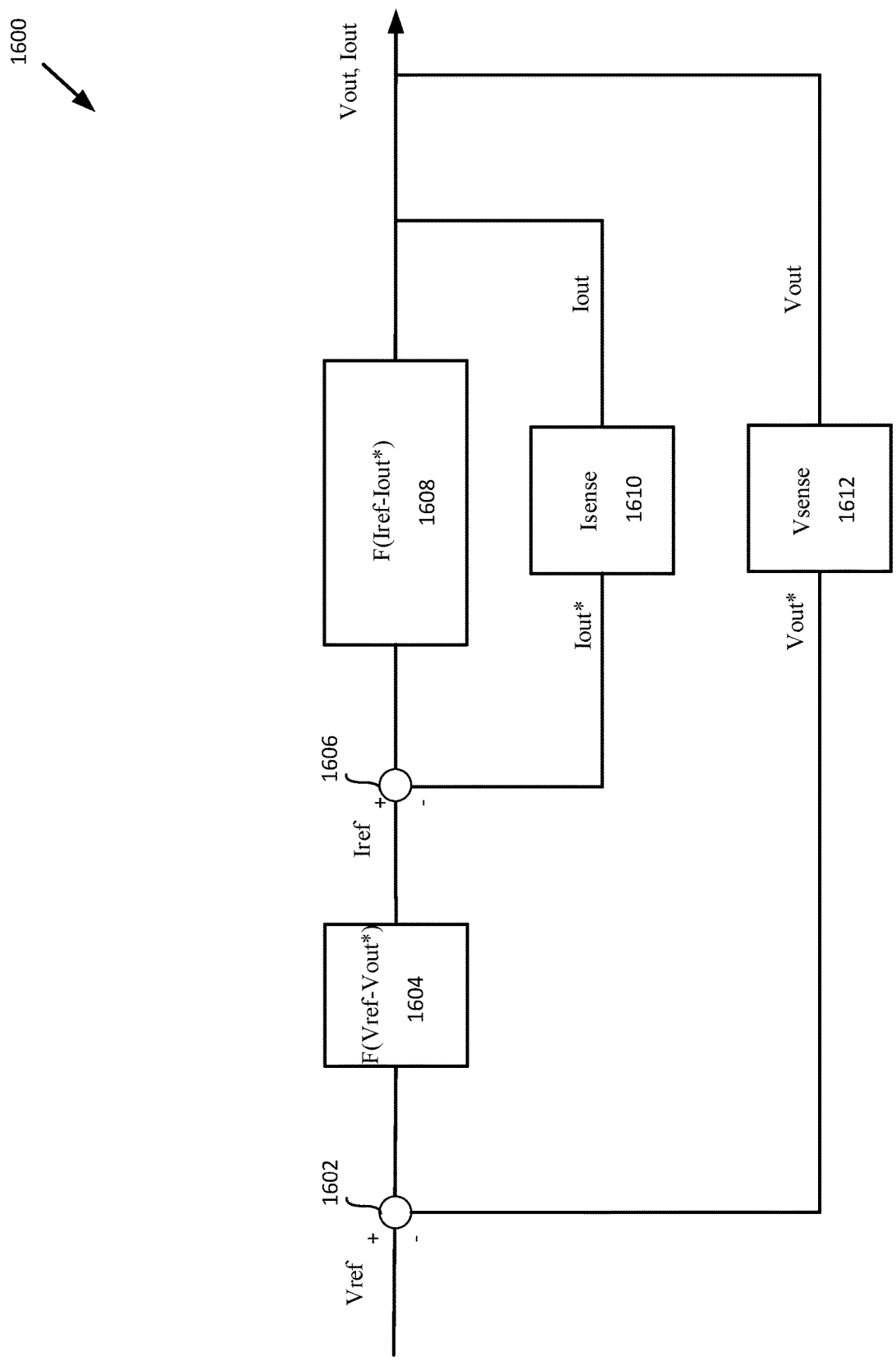
FIG. 16 shows a control loop structure, according to illustrative aspects of the disclosure.

Referring to FIG. 16, an example control loop structure 1600 is shown, according to illustrative aspects of the disclosure. For example, control loop structure 1600 may be implemented by one or more elements of the power systems described herein (e.g., by one or more controllers, sensors, and/or voltage-applying circuitry/current injecting circuitry, etc.). In control loop structure 1600, a summing point 1602 may subtract an obtained reference voltage Vref (and/or a value representing/related to Vref) from an obtained sensed output voltage Vout* (and/or a value representing/related to Vout*). Control operation 1604 may control the output voltage Vout and/or one or more operation related to Vout based on and/or in response to the result of Vout* subtracted from Vref (i.e., Vref-Vout*). Control operation 1604 may also output a reference current Iref (and/or a value representing/related to Iref). Summing point 1606 may subtract an obtained reference current Iref (and/or a value representing/related to Iref) from an obtained sensed output current Iout* (and/or a value representing/related to Iout*). Control operation 1608 may control the output current Iout and/or one or more operation related to Iout based on and/or in response to the result of Iout* subtracted from Iref (i.e., Iref-Iout*). The resulting output current Iout may be sensed by a current sensor 1610 and the sensed output current Iout* (and/or a value representing/related to Iout*) may be provided to summing point 1606. The resulting output voltage Vout may be sensed by a voltage sensor 1612 and the sensed output voltage Vout* (and/or a value representing/related to Vout*) may be provided to summing point 1602.

In control loop structure 1600 the inner loop is a current control loop and the outer loop is a voltage control loop. For example, the voltage control loop and the current control loop may operate at different frequencies/speed of change. For example, the current control loop may operate at a relatively high frequency of change relative to the frequency of the voltage control loop. If the current control loop is operating at a greater frequency than the frequency of the voltage control loop, then the control loop structure 1600 may enable the power system to relatively quickly respond to changes in current (relative to the response to changes in voltage). If the current control loop is operating at a greater frequency than the frequency of the voltage control loop, then the output current may be maintained as a relatively constant current (relative to the output voltage, which may have relatively greater changes due to the lesser speed/lower frequency of the voltage control loop relative to the current control loop).

When in a voltage control mode the voltage-applying circuitry/current injecting circuitry may behave similar to a voltage source. When in current control mode the voltage-applying circuitry/current injecting circuitry may behave similar to a current source.

In voltage control mode the voltage may be locked/controlled to be maintained about a particular value or within a range of about particular values, e.g. about 100 volts or in a range of about 50-150 volts.

In current control mode the current may be locked/controlled to be maintained about a particular value or within a range of about particular values, e.g. about 5 mA or in a range of about 0-10 mA.

In a combined mode (e.g., cascade mode with both current control and voltage control) the current may be locked/controlled to be maintained about a particular value or within a range of about particular values, e.g. about 5 mA or in a range of about 0-10 mA, and the voltage may be locked/controlled to be maintained about a particular value or within a range of about particular values, e.g. about 100 volts or in a range of about 50-150 volts. As described above, in cascade mode the current control mode/current control loop may be the dominant loop operating at a higher frequency/speed of change than the voltage control mode/voltage control loop. For example, the output current may be maintained as about a certain value, e.g. about 6 mA, without drifting too greatly from that value, whereas the output voltage may be maintained within a particular range of values, e.g., about 75-115 volts or about 50-150 volts, while drifting between the particular range of values since deviations in the output voltage are dealt with less frequently/at a lesser speed (relative to deviations in the output current).

Referring back to FIG. 13A, the connection path (e.g., line 1330) between the midpoint terminal Vcp and current injecting circuitry 1302 may be a relatively high impedance path. The connection path 1330 between the midpoint terminal Vcp and current injecting circuitry 1302 may be used to measure one or more parameter related to the midpoint terminal Vcp.

The connection path (e.g., line 1340) between the current injecting circuitry 1302 and terminal V− may be used to inject current at terminal V−. The connection path (e.g., line 1340) between the current injecting circuitry 1302 and terminal V− may be a relatively high impedance path. In some cases, the connection path 1340 between the current injecting circuitry 1302 and terminal V− may have a physically passive, relatively low (e.g., a resistor of relatively low resistance) impedance path (e.g., when current injecting circuitry 1302 is not operating in current control mode current may relatively easily flow along connection path 1340). However, in operation (e.g. when current injecting circuitry 1302 is operating in current control mode), then the connection path 1340 between the current injecting circuitry 1302 and terminal V− may present a relatively high impedance, in order to not interfere with the operation of IMD/isometer 1300 which is measuring insulation/insulation resistance and to prevent reverse current flow into current injecting circuitry 1302.

In some examples, power system 180s may include one or more control unit(s)/controller(s) 200. In some cases, the one or more control unit(s)/controller(s) 200 may be part of the current injecting circuitry 1302/circuitry 500. In some cases one or more control unit(s)/controller(s) 200 may be internal to one or more elements of power system 180*s*, for example: circuitry 500, system power device(s) 107, etc. In some cases, one or more control unit(s)/controller(s) 200 may be separate elements, external to other elements of power system 180*s*. For the sake of simplicity, the connections between the one or more control unit(s)/controller(s) 200 and other elements of power system 180*s* (e.g. system power device(s) 107, sensors, etc.) are not illustrated in FIG. 13A. It will be appreciated that in some examples the other elements of power system 180*s* and/or one or more different control unit(s)/controller(s) 200 of power system 180*r* may be communicatively and/or operably connected to one or more control unit(s)/controller(s) 200. As an example, sensors may provide data (including one or more parameter) to one or more control unit(s)/controller(s) 200.

The one or more control unit(s)/controller(s) 200 may be configured to receive and/or transmit instructions as signals/commands to and/or from one or more other elements of the power system. The one or more control unit(s)/controller(s) 200 may include one or more processors/processing circuits and memory configured to access data and make determinations/calculations/computations.

Sensors (not illustrated in FIG. 13A) may be connected to the one or more control unit/controller(s) 200. The one or more control unit(s)/controller(s) 200 may be configured to use one or more indication(s)/parameter(s), e.g., obtained from the one or more sensor(s), to make a determination regarding adjusting/maintaining the injected current. The one or more control unit(s)/controller(s) 200 may be configured to generate one or more commands relating to adjusting/maintaining the injected current.

In general, there may be an issue with having the IMD/isometer 1300 operating simultaneously while applying voltage to/injecting current at the DC bus (DC+bus 1320 and/or DC− bus 1322).

Since voltage-applying circuitry/current injecting circuitry may provide a resistance relative to the ground/earth potential, then while voltage-applying circuitry/current injecting circuitry is operating, IMD/isometer 1300 might not be able to properly/accurately measure the insulation/insulation resistance between the one or more system power device(s) 107 and the ground/earth potential. This may cause a situation where part of the power system is not properly protected by the IMD/isometer 1300.

For example, power system 180*s* may have an IT (isold-terre) earthing system/grounding system with only relatively high impedance connection(s) (e.g. about tens to hundreds of kilo-ohms) to the ground/earth potential, in order to insulate power system 180*s* from the ground/earth potential. Providing a relatively high impedance connection to the ground/earth potential may lower the potential currents that may flow through the connection to the ground/earth potential, relative to potentially higher currents that would flow through the connection if the impedance of the connection was relatively lower (Ohm's law dictates an inverse relationship between impedance and current). This arrangement causes the power system to "float" above ground/earth potential. Such an arrangement allows ground faults where the power system is leaking current to a ground/earth potential via a relatively lower impedance to be detected by the IMD/isometer 1300.

However, if the voltage-applying circuitry/current injecting circuitry presents itself as a relatively low impedance connection to the ground/earth potential, then the IMD/isometer 1300 may incorrectly identify this connection as a ground fault and operate accordingly, e.g. providing an alert and/or disconnecting the power source(s) 104 from the system power device(s) 107, potentially causing a loss in the power produced by the power source(s) 104 that is provided to/utilized by the grid 109.

One solution would be to operate the voltage-applying circuitry/current injecting circuitry and the IMD/isometer 1300 by having them operate in separate turns. However, such a solution presents other issues, for example, the synchronization of the switching between operating the voltage-applying circuitry/current injecting circuitry and the IMD/isometer 1300.

In the present subject matter, the voltage-applying circuitry/current injecting circuitry may be configured to operate simultaneously with the IMD/isometer 1300, since the voltage-applying circuitry/current injecting circuitry is configured to operate in a current control mode as current injecting circuitry 1302 while the IMD/isometer 1300 is operating. In the current control mode, the desired/target output current or range of output currents of the current injecting circuitry 1302 may be "locked" so that the output current remains relatively consistent (e.g. about 5 mA). On the other hand, in current control mode, the output voltage or range of output voltages of the current injecting circuitry 1302 may be allowed to fluctuate (e.g., within a particular range—about 80-100 volts).

For example, while in current control mode, the current injecting circuitry 1302 may be configured so that any sensed deviations to the actual output current from a desired output current are adjusted relatively quickly to maintain an actual output current that is about the desired output current.

In this case, while in current control mode, the current injecting circuitry 1302 may be configured so that any sensed deviations to the actual output voltage from the desired output voltage are adjusted relatively slowly, allowing the actual output voltage to drift within a particular range.

When operating voltage-applying circuitry/current injecting circuitry in current control mode, similar to a current source, the current injecting circuitry 1302 may be configured to maintain a relatively high impedance (e.g. about tens to hundreds of kilo-ohms [for example, greater than the particular threshold of the IMD/isometer 1300, e.g., greater than about 50 kΩ or greater than about 100 kΩ ]) between a terminal (e.g., terminal V−) of the DC bus 1322 and the ground. By configuring current injecting circuitry 1302 to have/maintain a relatively high impedance, then injecting circuitry 1302 may be able to operate and inject current at a terminal (e.g., terminal V−) of the DC bus 1322 to prevent/counteract the effects of PID while not interfering with the operation of the IMD/isometer 1300 which is configured to measure insulation/insulation resistance of the power system at substantially the same time as the injecting.

This relatively high impedance may prevent a testing/measuring current from IMD/isometer 1300 from flowing via voltage-applying circuitry/current injecting circuitry 1302 to the earth/ground potential. Accordingly, the relatively high impedance may prevent a false determination by IMD/isometer 1300 that there is a ground fault.

In this case, operating voltage-applying circuitry/current injecting circuitry 1302 in current control mode, similar to a current source, allows voltage-applying circuitry/current injecting circuitry 1302 to operate simultaneously with IMD/isometer 1300. Meaning, in this case, the current injecting circuitry 1302 may operate to protect the power system from PID while at the same time the IMD/isometer 1300 may operate to protect the system from actual ground faults. Accordingly, in the present subject matter there may be no need to cease measuring in order to inject current and vice versa.

Figure 13B:
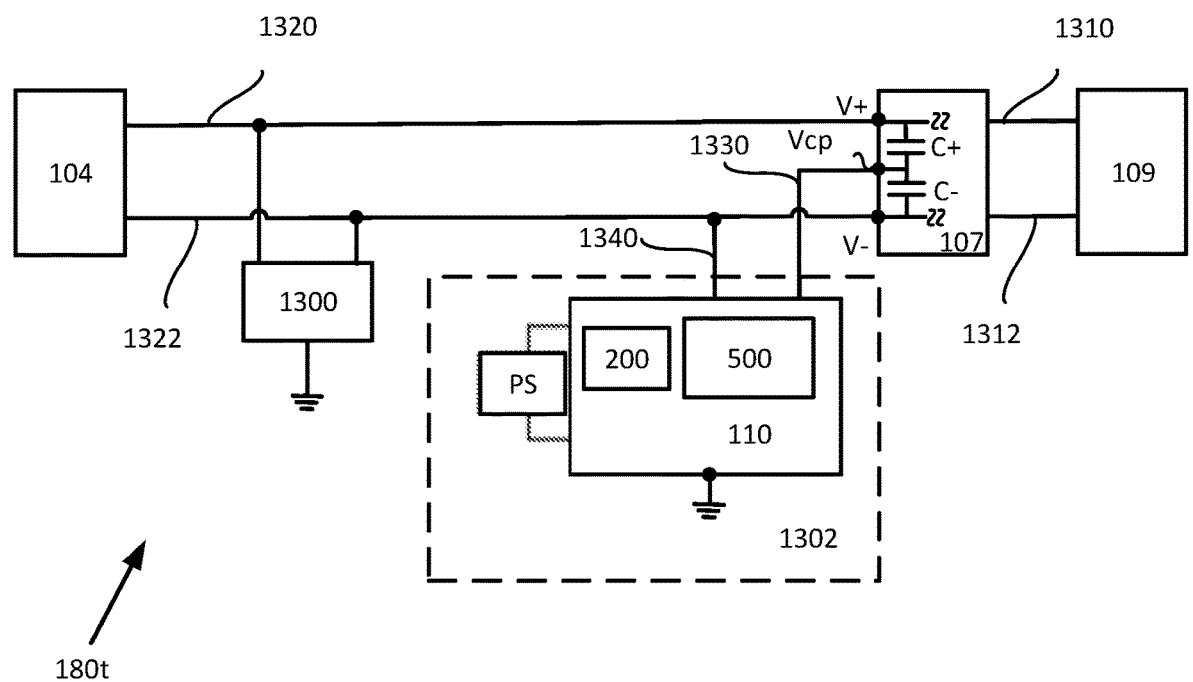
FIG. 13B shows a power system, according to illustrative aspects of the disclosure.

Reference is now made to FIG. 13B, which shows a power system 180*t*, according to illustrative aspects of the disclosure. Power system 180*t* is similar to power system 180*s*, except that power system 180*t* includes at least one IMD/isometer 1300 connected in parallel between one or more power source(s) 104 and one or more system power device(s) 107. IMD/isometer 1300 may be connected to a first terminal, e.g., terminal V+ on the DC+bus 1320 between power source(s) 104 and system power device(s) 107, and to a second terminal, e.g., terminal V− on the DC− bus 1322 between power source(s) 104 and system power device(s) 107. IMD/isometer 1300 is also connected to a ground/earth potential.

The IMD/isometer 1300 may be configured to measure the insulation/insulation resistance between one or more power source(s) 104 and a ground/earth potential. IMD/isometer 1300 may be configured to generate an alert (including a visual and/or audio indication, e.g., light and/or sound) and/or to disconnect the power source(s) 104 from the system power device(s) 107 when the insulation/insulation resistance between the power source(s) 104 and the ground/earth potential is within about a particular range or less than about a particular threshold (for example, about tens of kilo ohms or about hundreds of kilo-ohms, e.g. about 50 kΩ or about 100 kΩ).

In the example of FIG. 13B in cases where the system power device(s) 107 are DC to AC inverter(s), then the IMD/isometer 1300 may be connected on the "DC side" of the inverter(s). In the example of FIG. 13A, where the case is that the system power device(s) 107 are DC to AC inverter(s), then the IMD/isometer 1300 may be connected on the "AC side" of the inverter(s).

Figure 14:
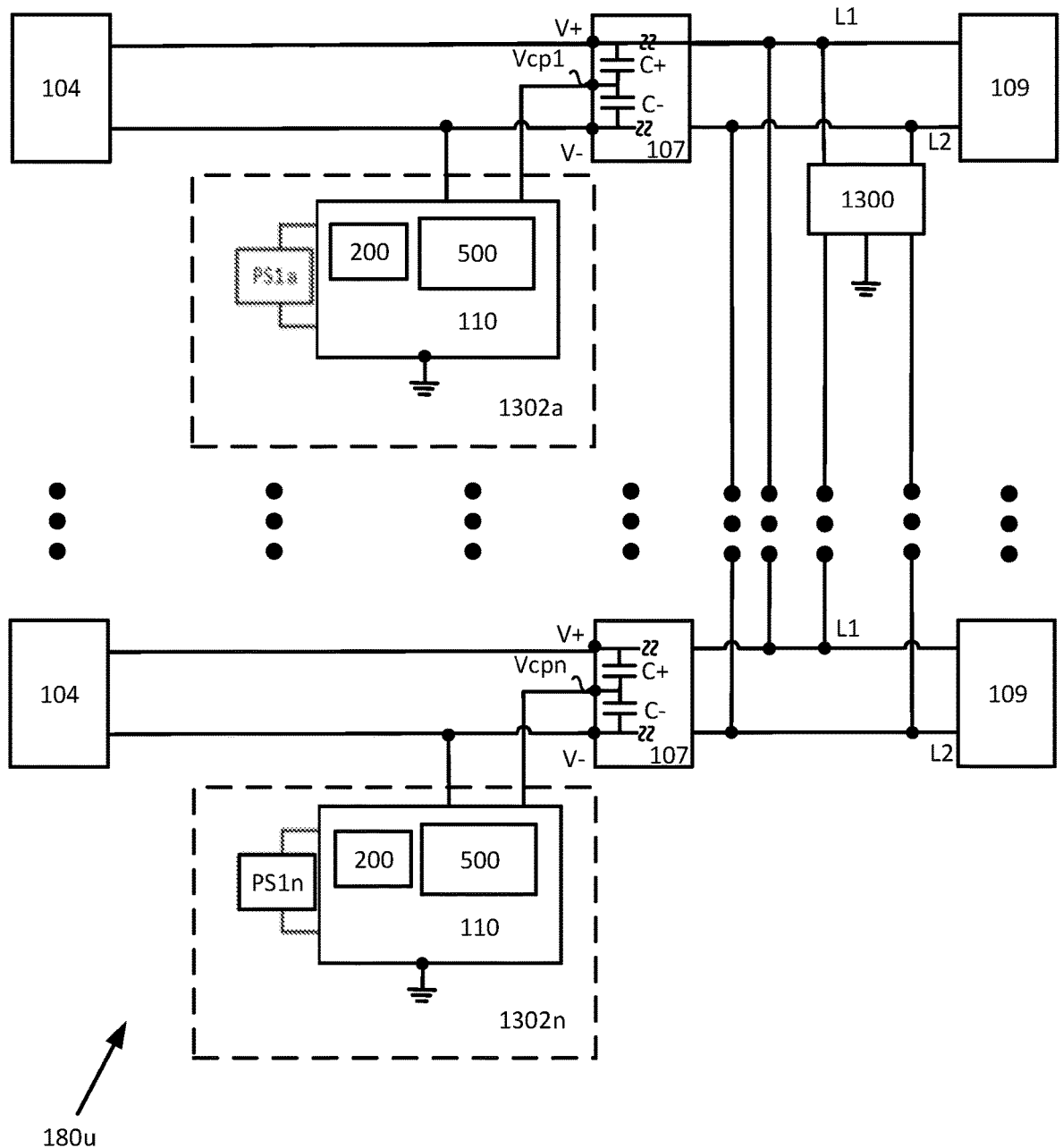
FIG. 14 shows a power system, according to illustrative aspects of the disclosure.

Reference is now made to FIG. 14, which shows a power system 180*u*, according to illustrative aspects of the disclosure. Power system 180*u* is similar to power system 180*s*, except that power system 180*u* illustrates multiple system power devices 107. Each system power device 107 may be connected to at least one current injecting circuitry 1302/converter 110 and at least one ISM/isometer 1300. The multiple system power devices 107 may be connected to one another in parallel.

Figure 15:
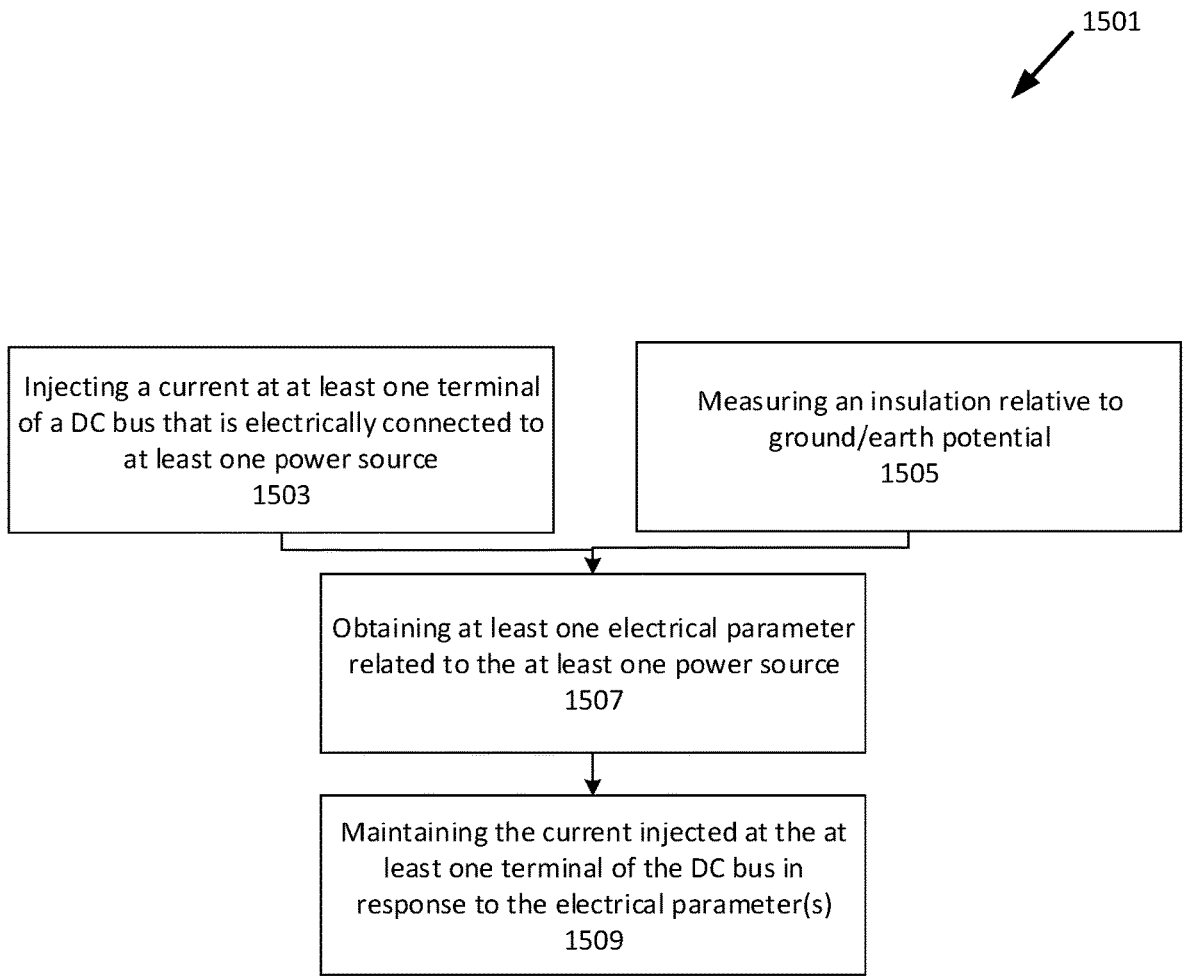
FIG. 15 shows a flowchart of a method, according to illustrative aspects of the disclosure.

Reference is now made to FIG. 15, which shows a flowchart of a method 1501 according to illustrative aspects of the disclosure. For example, method 1501 may be applied to one or more of power systems 180*s*, 180*t*, 180*u* of FIGS. 13A-14 in the description that follows. As an example, steps of method 1501 may be implemented by one or more control unit(s)/controller(s) 200 of system power devices 107 and/or converters 110. For example, one or more of the control unit(s)/controller(s) 200 may be acting as a primary controller.

At step 1503, a current may be injected at at least one terminal of a DC bus that is electrically connected to at least one power source.

For example, at step 1503, a current may be injected by current injecting circuitry 1302/converter 110 at terminal V− of the DC− bus that is electrically connected to at least one power source 104. Current may be injected by current injecting circuitry 1302 while maintaining an impedance with a relatively high impedance value, e.g. the impedance of current injecting circuitry 1302 may be configured to be relatively high while current injecting circuitry 1302 is in a current control mode.

At step 1505, an insulation/insulation resistance of the at least one power source and/or system power device relative to ground/earth potential may be measured. Step 1505 may occur simultaneously with step 1503.

For example, at step 1505, IMD/isometer 1300 may measure the insulation/insulation resistance of the at least one power source 104 relative to ground/earth potential and/or the insulation/insulation resistance of the at least one system power device(s) 107 relative to ground/earth potential. If the insulation/insulation resistance is below a particular threshold, then IMD/isometer 1300 may generate an alert or perform some other appropriate action (e.g., disconnecting the at least one power source 104 from the system power device(s) 107). This measuring may occur simultaneously with current injecting circuitry 1302/converter 110 injecting a current at terminal V− of the DC− bus. The relatively high impedance of current injecting circuitry 1302 while current injecting circuitry 1302 is in current control mode, may prevent IMD/isometer 1300 from measuring the impedance of current injecting circuitry 1302 and falsely identifying current injecting circuitry 1302 as a ground fault.

At step 1507, at least one electrical parameter related to the at least one power source may be obtained.

For example, at step 1507, at least one electrical parameter (e.g. current) related to the midpoint terminal $V_{CP}$ of at least one power device 107 electrically connected to the at least one power source 104 may be obtained.

As an example the at least one electrical parameter related to the at least one power source may be obtained by circuitry 500/one or more control unit(s)/controller(s) 200, e.g., with the help of one or more sensors.

At step 1509, the current injected at the at least one terminal of the DC bus may be adjusted/maintained based on and/or in response to the electrical parameter.

For example, at step 1509, circuitry 500/one or more control unit(s)/controller(s) 200 may instruct/control current injecting circuitry 1302/converter 110 to adjust (increase, decrease)/maintain the current that is injected at terminal V−, e.g. so that the current will remain within a particular threshold and operation of the current injecting circuitry 1302/converter 110 will not interfere with the operation of IMD/isometer 1300.

In some cases, a control parameter (for example, a control parameter related to a duty cycle of current injecting circuitry 1302/converter 110) may be controlled in order to adjust/maintain the current injected at the at least one terminal of the DC bus in response to the electrical parameter(s).

Current may be adjusted/maintained by current injecting circuitry 1302 while maintaining the impedance with a relatively high impedance value, e.g., the impedance of current injecting circuitry 1302 may be configured to be relatively high while current injecting circuitry 1302 is still in current control mode.

Accordingly, current injecting circuitry 1302/converter 110 may be able to operate to prevent/alleviate/counteract the effects of PID simultaneously with the operation of IMD/isometer 1300 which is measuring/monitoring the insulation/insulation resistance between the one or more power source(s) 104 and a ground/earth potential and/or the insulation/insulation resistance between the one or more system power device(s) 107 and a ground/earth potential. Meaning, current injecting circuitry 1302/converter 110 may operate to help mitigate the effects PID on the power system, without ceasing the operation of IMD/isometer 1300 which is measuring the insulation/insulation resistance of the at least one power source and/or system power device relative to ground/earth potential.

When compared to a system that operates voltage-applying circuitry/current injecting circuitry in turns with IMD/isometer 1300 (e.g. not at the same time), then the present subject matter may have the following advantages, for example:

A. The present subject matter does not require synchronization between voltage-applying circuitry/current injecting circuitry 1302 and IMD/isometer 1300, in order to ensure that they are taking separate turns and that there is no interference in the operation of the IMD/isometer 1300 from the operation of the voltage-applying circuitry/current injecting circuitry 1302.

B. The present subject matter allows for continuous monitoring of the system by IMD/isometer 1300, and for continuous operation of voltage-applying circuitry/current injecting circuitry 1302 without having to take breaks in their operation in order to facilitate taking turns between the two.

C. The present subject matter may also enable the IMD/isometer 1300 to identify a loss of function or actual short to ground of the voltage-applying circuitry/current injecting circuitry 1302 as a ground fault, without the IMD/isometer 1300 identifying the voltage-applying circuitry/current injecting circuitry 1302 in normal operation as a ground fault falsely/incorrectly.

It should be understood that the steps in the flow charts of FIGS. 2B, 6A, 6B, 12, and 15 need not all be performed in the order specified and some steps may be omitted, changed in order, or performed simultaneously.

According to one aspect of the presently disclosed subject matter there is provided a method including:
determining a parameter related to a voltage value at a midpoint terminal of a system power device; and
adjusting a voltage applied to a second terminal of the system power device based on the parameter and a reference value, wherein the second terminal is different from the midpoint terminal.

In addition to the above features, the method according to this aspect of the presently disclosed subject matter can include one or more of features (i) to (xxiii) listed below, in any desired combination or permutation which is technically possible:

(i) wherein the midpoint terminal is one of a plurality of midpoint terminals of the system power device.
(ii) wherein the midpoint terminal is a terminal inside the system power device.
(iii) wherein the system power device is a direct current (DC) to alternating current (AC) converter comprising a plurality of capacitors connected in series between input terminals of the DC to AC converter; and the midpoint terminal is located between two of the plurality of capacitors.
(iv) wherein the second terminal is an input terminal of the system power device.
(v) wherein the input terminal is a negative voltage input terminal.
(vi) wherein the parameter is a voltage value.
(vii) wherein the parameter is a current value.
(viii) wherein the reference value is a voltage value.
(ix) determining a second parameter related to the voltage value at the midpoint terminal of the system power device; and adjusting the voltage applied to the second terminal of the system power device based on the second parameter.
(x) wherein the second parameter is a current value.
(xi) wherein the second parameter is a voltage value.
(xii) wherein the current value is related to a current in the converter.
(xiii) determining a third value based on the parameter and the second parameter, and comparing the third value to the reference value.
(xiv) decreasing the voltage applied to the second terminal of the system power device when the parameter is substantially greater than a value related to the reference value.
(xv) increasing the voltage applied to the second terminal of the system power device when the parameter is substantially less than a value related to the reference value.
(xvi) substantially maintaining the voltage applied to the second terminal of the system power device when the parameter is substantially equal to a value related to the reference value.
(xvii) determining a parameter related to a nighttime mode of operation; and applying the voltage to the second terminal of the system power device based on the parameter related to the nighttime mode of operation
(xviii) a sensor configured to determine a parameter related to a nighttime mode of operation; and the converter is configured to apply the voltage to the second terminal of the system power device based on the parameter related to the nighttime mode of operation.
(xix) wherein the voltage applied to the second terminal of the system power device in the nighttime mode of operation is greater than a voltage applied to the second terminal of the system power device in a daytime mode of operation.
(xx) switching between the nighttime mode of operation and the daytime mode of operation based on the parameter related to the nighttime mode of operation.
(xxi) wherein the parameter is at least one of: a time value, an irradiance value, a temperature value, a current value, a voltage value, and a power value.
(xxii) wherein the voltage applied in the nighttime mode is in a range of about 100 volts to about 1000 volts.
(xxiii) wherein the voltage applied in the daytime mode is in a range of about 10 volts to about 150 volts.

According to another aspect of the presently disclosed subject matter there is provided a device (e.g., an apparatus) including:
a sensor configured to determine a parameter related to a voltage value at a midpoint terminal of a system power device; and
a converter configured to adjust a voltage applied to a second terminal of the system power device based on the parameter and a reference value, wherein the second terminal is different from the midpoint terminal.

This aspect of the disclosed subject matter can optionally include one or more of features (i) to (xxiii) listed above, mutatis mutandis, in any desired combination or permutation which is technically possible According to another aspect of the presently disclosed subject matter there is provided a system including:
a sensor configured to determine a parameter related to a voltage value at a midpoint terminal of a system power device; and
a converter configured to adjust a voltage applied to a second terminal of the system power device based on the parameter and a reference value, wherein the second terminal is different from the midpoint terminal.

This aspect of the disclosed subject matter can optionally include one or more of features (i) to (xxiii) listed above, mutatis mutandis, in any desired combination or permutation which is technically possible According to another aspect of the presently disclosed subject matter there is provided a method including:
  determining a parameter related to a nighttime mode of operation; and applying a voltage to a terminal of a system power device based on the parameter related to the nighttime mode of operation.

According to another aspect of the presently disclosed subject matter there is provided a device including:
  a converter configured to apply a voltage to a terminal of a system power device when the device is in a nighttime mode of operation;
  a sensor configured to determine a parameter related to the nighttime mode of operation; and
  a switch configured to switch between the nighttime mode of operation and a daytime mode of operation based on the parameter related to the nighttime mode of operation.

According to another aspect of the presently disclosed subject matter there is provided a system including:
  a converter configured to apply a voltage to a terminal of a system power device when the system is in a nighttime mode of operation;
  a sensor configured to determine a parameter related to the nighttime mode of operation; and
  a switch configured to switch between the nighttime mode of operation and a daytime mode of operation based on the parameter related to the nighttime mode of operation.

According to another aspect of the presently disclosed subject matter there is provided a method including:
  applying a first voltage on at least one first terminal of a first direct current (DC) bus electrically connected to at least one power source;
  obtaining at least one indication that discharge of a second voltage related to the first voltage should be performed; and
  discharging the second voltage by electrically connecting at least one second terminal of a second DC bus to a ground in response to the at least one indication.

In addition to the above features, the method according to this aspect of the presently disclosed subject matter can include one or more of features (xxiv) to (xlvi) listed below, in any desired combination or permutation which is technically possible:

(xxiv) wherein the second voltage is a voltage related to a parasitic capacitance.
(xxv) wherein the at least one power source is a photovoltaic (PV) module.
(xxvi) wherein the at least one power source is a plurality of PV modules.
(xxvii) wherein the plurality of PV modules are connected in series connection.
(xxviii) wherein the plurality of PV modules are connected in parallel connection.
(xxix) wherein the first voltage is a relatively high voltage applied in order to reverse effects of potential induced degradation (PID).
(xxx) wherein a value of the first voltage is about the same as a value of the second voltage.
(xxxi) stopping the applying of the first voltage based on the at least one indication that discharge of the second voltage should be performed.
(xxxii) wherein the at least one indication that discharge should be performed is an indication that a switch has been turned off.
(xxxiii) wherein the switch is a DC switch.
(xxxiv) wherein the switch is an alternating current (AC) switch.
(xxxv) wherein the at least one indication that discharge should be performed is an indication that a voltage applying circuitry applying the first voltage has been turned off.
(xxxvi) wherein the indication that the voltage applying circuitry has been turned off is based on one or more parameter, the one or more parameter being at least one of: a parameter indicating that the power source is producing power, and a parameter related to time.
(xxxvii) wherein the at least one indication that discharge should be performed is an indication that a cover of a housing of a voltage applying circuitry applying the first voltage has been removed.
(xxxviii) wherein the discharging is configured to happen in a relatively short time.
(xxxix) wherein the discharging includes electrically connecting a resistor between the second terminal and the ground.
(xl) wherein the discharging includes switching a switch.
(xli) wherein the second voltage is a voltage stored by a parasitic capacitance between the power source and the ground.
(xlii) wherein the first terminal is on a negative DC bus.
(xliii) wherein the second terminal is on a positive DC bus.
(xliv) wherein the second terminal is on a negative DC bus.
(xlv) wherein applying includes converting a third, relatively low, voltage from at least one external power source to the first voltage.
(xlvi) wherein the applying is begun based on one or more parameter, the one or more parameter being at least one of: a parameter indicating that the power source is not producing power and a parameter related to time.

According to another aspect of the presently disclosed subject matter there is provided a device (e.g., an apparatus) including:
  a voltage applying circuitry configured to apply a first voltage on at least one first terminal of a first direct current (DC) bus electrically connected to at least one power source; and at least one controller configured to obtain at least one indication that discharge of a second voltage related to the first voltage should be performed;
  wherein the at least one controller is configured to generate at least one signal to discharge a second voltage by electrically connecting at least one second terminal of a second DC bus to a ground in response to the at least one indication.

This aspect of the disclosed subject matter can optionally include one or more of features (xxiv) to (xlvi) listed above, mutatis mutandis, as well as feature (xlvii) listed below, in any desired combination or permutation which is technically possible.

(xlvii) at least one sensor for sensing one or more parameter, the parameter being one or more of: an electrical parameter, a time parameter, and a motion parameter, wherein the at least one indication is generated based on one or more obtained parameter.

According to another aspect of the presently disclosed subject matter there is provided a method including:
  injecting a current at at least one terminal of a direct current (DC) bus that is electrically connected to at least one power source;
  simultaneous to injecting the current, measuring an insulation relative to ground; and obtaining an electrical parameter related to the at least one power source; and
  in response to the electrical parameter, maintaining the current injected at the at least one terminal of the DC bus without ceasing the measuring of the insulation relative to a ground.

In addition to the above features, the method according to this aspect of the presently disclosed subject matter can include one or more of features (xlviii) to (lix) listed below, in any desired combination or permutation which is technically possible:
  (xlviii) wherein the at least one terminal is on a negative DC bus.
  (xlix) wherein the electrical parameter related to the at least one power source is related to a current at a terminal of at least one power device electrically connected to the at least one power source.
  (l) wherein the electrical parameter is related to the midpoint terminal of the at least one power device.
  (li) wherein the at least one power device is a DC to alternating current (AC) inverter.
  (lii) wherein the at least one power source is a photovoltaic (PV) module.
  (liii) wherein the current is injected by at least one second power source.
  (liv) wherein the at least one second power source is electrically connected to at least one second power device.
  (lv) wherein the at least one second power device is a DC to DC converter.
  (lvi) wherein the at least one second power source is different than the at least one first power source.
  (lvii) wherein the injected current is to counter effects of potential induced degradation (PID) on the at least one first power source.
  (lviii) wherein the injected current is within a range of currents.
  (lix) maintaining a relatively high impedance between the at least one terminal of a DC bus and the ground.

According to another aspect of the presently disclosed subject matter there is provided a device including:
  current injecting circuitry configured to inject a current at at least one terminal of a direct current (DC) bus that is electrically connected to at least one power source;
  insulation measuring circuitry configured to measure an insulation relative to ground simultaneous to the current injecting circuitry injecting the current; and
  wherein the current injecting circuitry is further configured to:
    obtain an electrical parameter related to the at least one power source; and in response to the electrical parameter, maintain the current injected at the at least one terminal of the DC bus without ceasing the measuring of the insulation relative to ground.

This aspect of the disclosed subject matter can optionally include one or more of features (xlviii) to (lix) listed above, mutatis mutandis, in any desired combination or permutation which is technically possible.

It may be noted that various connections are set forth between elements herein. These connections are described in general and, unless specified otherwise, may be direct or indirect; this specification may be not intended to be limiting in this respect. Further, elements of one feature may be combined with elements from other features in appropriate combinations or sub-combinations.

All optional and preferred features and modifications of the described features and dependent claims are usable in all aspects taught herein. Furthermore, the individual features of the dependent claims, as well as all optional and preferred features and modifications of the described features are combinable and interchangeable with one another.

The invention claimed is:

1. A system comprising:
  first converter circuitry connected across two terminals of a direct current (DC) bus;
  second converter circuitry connected to:
    one terminal of the two terminals of the DC bus via an electrical connection path, and
    ground reference;
  measuring circuitry configured to measure insulation between the first converter circuitry and the ground reference; and
  control circuitry configured to:
    control current from the second converter circuitry to the one terminal of the two terminals of the DC bus; and
    adjust, based on measuring insulation by the measuring circuitry, an impedance of the electrical connection path.

2. The system according to claim 1, wherein the second converter circuitry is configured to obtain an electrical parameter related to a terminal of the first converter circuitry.

3. The system according to claim 2, wherein the terminal of the first converter circuitry is between a plurality of capacitors.

4. The system according to claim 2, wherein the control circuitry is configured to control, based on the electrical parameter, the current from the second converter circuitry to the one terminal of the two terminals of the DC bus.

5. The system according to claim 3, wherein the control circuitry is configured to control based on the electrical parameter, the current from the second converter circuitry to the one terminal of the two terminals of the DC bus.

6. The system according to claim 1, wherein the second converter circuitry is connected, via a second electrical connection path, to a terminal of the first converter circuitry.

7. The system according to claim 6, wherein the terminal of the first converter circuitry is between a plurality of capacitors.

8. The system according to claim 6, wherein the second electrical connection path has a higher impedance than the electrical connection path.

9. The system according to claim 6, wherein the second converter circuitry is configured to obtain, via the second electrical connection path, an electrical parameter related to the terminal of the first converter circuitry.

10. The system according to claim 1, wherein the two terminals comprise at least a positive terminal and a negative terminal.

11. The system according to claim 1, wherein the one terminal is a negative terminal.

12. The system according to claim 1, wherein the first converter circuitry is a DC to alternating current (AC) inverter.

13. The system according to claim 1, wherein the second converter circuitry is a DC to DC converter.

14. The system according to claim 1, further comprising a power source connected across the two terminals of the DC bus.

15. The system according to claim 14, wherein the power source is a photovoltaic (PV) module.

16. The system according to claim 14, wherein the control circuitry is configured to counter, based on the controlled current, effects of potential induced degradation (PID) on the power source.

17. The system according to claim 1, further comprising a power source connected to the second converter circuitry.

18. The system according to claim 1, wherein the current is 5 mA.

19. The system according to claim 1, wherein the control circuitry is configured to prevent, based on increasing the impedance of the electrical connection path, current flow from the one terminal to the second converter circuitry.

20. A method comprising:
converting, by first converter circuitry across two terminals of a direct current (DC) bus, a DC to alternating current;
providing current by second converter circuitry connected to:
one terminal of the two terminals of the DC bus via an electrical connection path, and
ground reference;
measuring insulation between the first converter circuitry and the ground reference; and
controlling current from the second converter circuitry to the one terminal of the two terminals of the DC bus; and
adjusting, based on the measuring insulation, an impedance of the electrical connection path.

* * * * *